United States Patent
Ninose

(10) Patent No.: US 7,330,861 B2
(45) Date of Patent: Feb. 12, 2008

(54) REMOTE COPYING SYSTEM AND METHOD OF CONTROLLING REMOTE COPYING

(75) Inventor: Kenta Ninose, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/546,782

(22) Filed: Oct. 11, 2006

(65) Prior Publication Data

US 2007/0043870 A1 Feb. 22, 2007

Related U.S. Application Data

(63) Continuation-in-part of application No. 10/937,731, filed on Sep. 10, 2004.

(30) Foreign Application Priority Data

Mar. 28, 2006 (JP) ............................. 2006-087983
Aug. 1, 2006 (JP) ............................. 2006-209897

(51) Int. Cl.
G06F 17/30 (2006.01)
(52) U.S. Cl. ...................................... 707/204; 201/203
(58) Field of Classification Search ............. 707/1–10, 707/200–204; 711/112–114, 147–154
See application file for complete search history.

(56) References Cited

U.S. PATENT DOCUMENTS

| 5,404,548 | A | 4/1995 | Nishioka |
| 5,603,003 | A | 2/1997 | Akizawa et al. |
| 5,623,599 | A | 4/1997 | Shomler |
| 5,926,816 | A * | 7/1999 | Bauer et al. .................... 707/8 |
| 5,937,414 | A * | 8/1999 | Souder et al. ............... 707/203 |
| 5,996,054 | A | 11/1999 | Ledain et al. |
| 6,092,066 | A | 7/2000 | Ofek |
| 6,157,991 | A | 12/2000 | Arnon |
| 6,209,002 | B1 | 3/2001 | Gagne et al. |
| 6,260,124 | B1 | 7/2001 | Crockett et al. |
| 6,353,878 | B1 | 3/2002 | Dunham |
| 6,366,987 | B1 | 4/2002 | Tzelnic et al. |
| 6,408,370 | B2 | 6/2002 | Yamamoto et al. |
| 6,449,622 | B1 * | 9/2002 | LaRue et al. ................ 707/201 |

(Continued)

FOREIGN PATENT DOCUMENTS

EP 671686 9/1995

(Continued)

OTHER PUBLICATIONS

"The Role of Backup in Data Recovery", pp. 1-3, Storage.com (unknown author, unknown date).

(Continued)

*Primary Examiner*—Yicun Wu
(74) *Attorney, Agent, or Firm*—Townsend and Townsend and Crew LLP

(57) ABSTRACT

A secondary storage system comprises received marker information in which all received markers are recorded. A master secondary storage system collects marker numbers in received marker information from all of the secondary storage systems, and, from these collected marker numbers, selects the maximum marker number of marker numbers that are received by all the secondary storage systems, and instructs all of the secondary storage systems to store data as far as this marker number.

20 Claims, 32 Drawing Sheets

U.S. PATENT DOCUMENTS

| | | |
|---|---|---|
| 6,463,501 B1 | 10/2002 | Kern et al. |
| 6,516,327 B1 * | 2/2003 | Zondervan et al. ......... 707/200 |
| 6,581,143 B2 | 6/2003 | Gagne et al. |
| 6,647,474 B2 | 11/2003 | Yanai et al. |
| 6,658,434 B1 | 12/2003 | Watanabe et al. |
| 6,658,542 B2 | 12/2003 | Beardsley et al. |
| 6,665,781 B2 | 12/2003 | Suzuki et al. |
| 6,816,951 B2 | 11/2004 | Kimura et al. |
| 6,898,685 B2 | 5/2005 | Meiri et al. |
| 2002/0078296 A1 | 6/2002 | Nakamura et al. |
| 2003/0050930 A1 | 3/2003 | Mosher et al. |
| 2003/0051111 A1 | 3/2003 | Nakano et al. |
| 2003/0078903 A1 | 4/2003 | Kimura et al. |
| 2003/0177321 A1 | 9/2003 | Watanabe |
| 2003/0188116 A1 | 10/2003 | Suzuki et al. |
| 2004/0024975 A1 | 2/2004 | Morishita et al. |
| 2004/0078399 A1 | 4/2004 | Tabuchi et al. |
| 2004/0128442 A1 | 7/2004 | Hinshaw et al. |
| 2004/0148477 A1 | 7/2004 | Cochran |
| 2004/0193802 A1 | 9/2004 | Meiri et al. |
| 2004/0193816 A1 | 9/2004 | Meiri et al. |
| 2004/0250030 A1 | 12/2004 | Ji et al. |
| 2004/0250031 A1 | 12/2004 | Ji et al. |
| 2004/0260972 A1 | 12/2004 | Ji et al. |
| 2004/0267829 A1 | 12/2004 | Hirakawa et al. |
| 2004/0268177 A1 | 12/2004 | Ji et al. |
| 2005/0033828 A1 | 2/2005 | Watanabe |
| 2005/0066122 A1 | 3/2005 | Longinov et al. |
| 2005/0091415 A1 | 4/2005 | Armitano |
| 2005/0102554 A1 | 5/2005 | Zohar et al. |
| 2005/0120058 A1 | 6/2005 | Meiri et al. |
| 2005/0120092 A1 | 6/2005 | Nakano et al. |
| 2005/0122817 A1 | 6/2005 | Arakawa et al. |
| 2005/0125617 A1 | 6/2005 | Ninose et al. |
| 2005/0132248 A1 | 6/2005 | Lecrone et al. |
| 2005/0149666 A1 | 7/2005 | Meirl et al. |
| 2005/0149817 A1 | 7/2005 | Biran et al. |
| 2005/0198454 A1 | 9/2005 | Yoder et al. |
| 2006/0023527 A1 | 2/2006 | Arakawa et al. |

FOREIGN PATENT DOCUMENTS

| | | |
|---|---|---|
| EP | 0672985 | 9/1995 |
| EP | 0674263 | 9/1995 |
| EP | 1150210 | 10/2001 |
| EP | 1217523 | 6/2002 |
| EP | 1538527 | 6/2005 |
| JP | 06-149485 | 5/1994 |
| JP | 2004-13367 | 1/2004 |
| JP | 2005-190456 | 7/2005 |
| WO | WO2001/016748 | 3/2001 |
| WO | WO2005/031578 | 4/2005 |

OTHER PUBLICATIONS

"SDRF/Asynchronous: A Technical Description," EMC White Paper, EMC Corporation, pp. 1-13 (Feb. 2004).

* cited by examiner

900: WRITE REQUEST

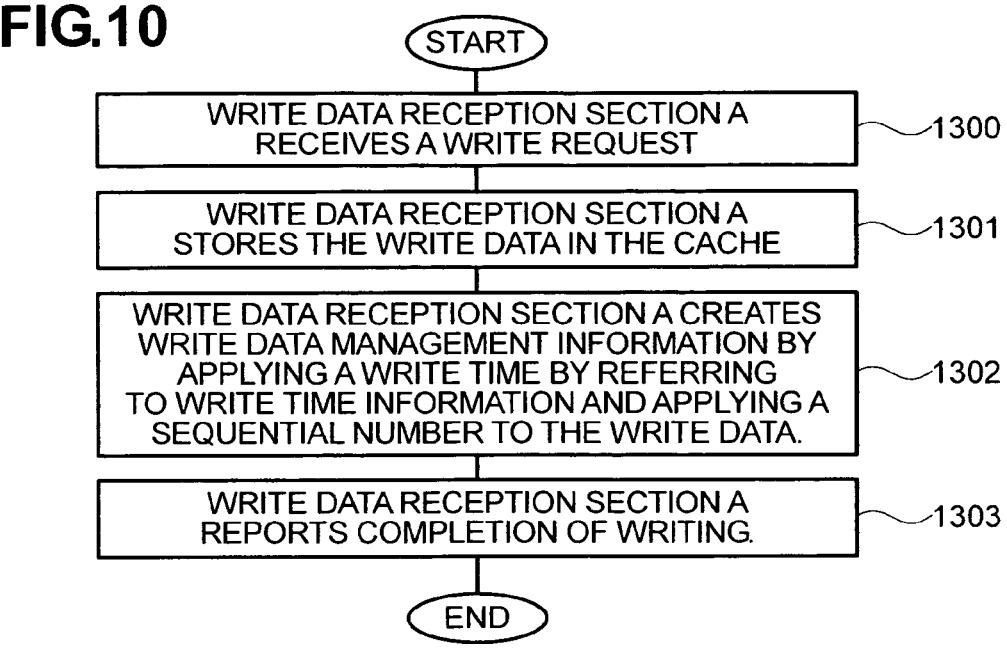
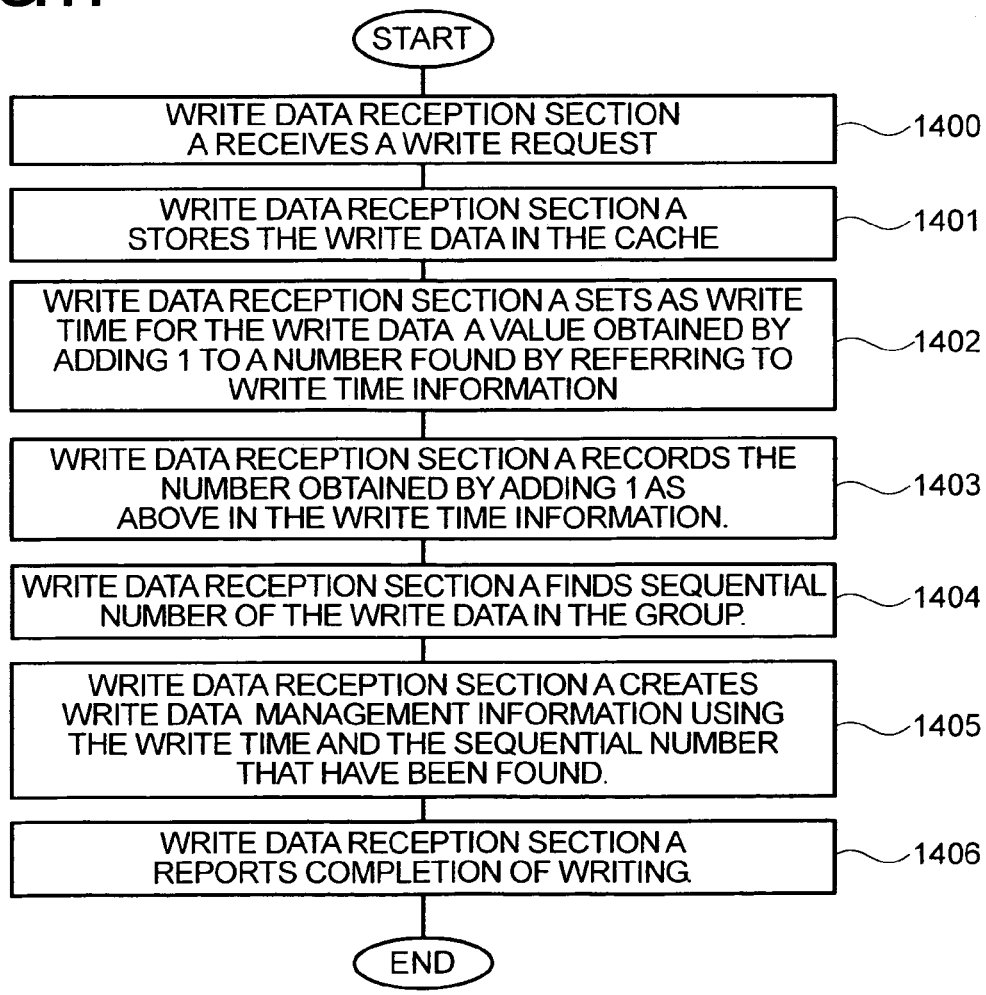

360 — MARKER NUMBER

330 —
- LOGICAL VOLUME ID
- WRITE ADDRESS
- WRITE DATA LENGTH
- WRITE DATA POINTER
- SEQUENTIAL NO.
- WRITE TIME
- MARKER ATTRIBUTE BIT
- MARKER NUMBER
- BIT INDICATING WHETHER TRANSFER IS REQUIRED

| MARKER NUMBER | SEQ NUMBER |
|---|---|
| 1 | 101 |
| 2 | 210 |
|  |  |
| 4 | 560 |
| 5 | 1024 |
| : | : |
| 120 | 10000 |
|  |  |
|  |  |

REMOTE COPYING SYSTEM AND METHOD OF CONTROLLING REMOTE COPYING

CROSS-REFERENCE TO PRIOR APPLICATION

This application relates to and claims priority from Japanese Patent Applications No. 2006-209897, filed on Aug. 1, 2006, No. 2006-087983, filed on Mar. 28, 2006, and U.S. patent application Ser. No. 10/937,731, filed on Sep. 10, 2004, the entire disclosures of which are incorporated herein by reference.

BACKGROUND

The present invention relates to remote copying.

In Laid-open European Patent Application No. 0672985, a technique is disclosed whereby the data that is employed by a computer is stored by a storage system and a copy of this data is stored in a separate storage system arranged at a remote location, while reflecting the write sequence of the data. In the processing indicated in Laid-open European Patent Application No. 0672985, the source storage system that has received the write data from the primary host computer reports completion of reception of the write data to the primary host computer only after reception of the write data. After this, the primary host computer reads a copy of the write data from the source storage system. A write time, which is the time at which the write request in respect of the write data was issued, is applied to this write data and, when the write data is read by the primary host computer, the write time is also transferred to the primary host computer. In addition, the primary host computer transfers the write data and the write time to the secondary host computer. After receiving the write data and the write time, the secondary host computer writes information including the write time to a control volume in the storage system on the secondary side and, in addition, writes the write data in the target storage system in the write time sequence, with reference to the write times at which the various items of write data were presented. By writing the write data in the target storage system in the write time sequence, it is possible to maintain consistent data in the target storage system.

If write data were to be reflected to the target storage system neglecting the write sequence (the operation of storing write data in the target storage system will hereinbelow be referred to as "reflecting" the data), for example in the case of a bank account database, in processing to transfer funds from an account A to an account B, it would not be possible to reproduce the debiting of the account A and the crediting of the account B as a single transaction and it would be possible for example for a period to occur in the target storage system in which the balance of the account B was credited before debiting of the balance of the account A. If, in this case, some fault occurred in the source storage system rendering it unusable prior to debiting the balance of the account A in the target storage system, mismatching data would be left in the target storage system, with the result that incorrect processing would be performed if business were to be subsequently continued using the secondary host computer. Consequently, by storing the write data in the target storage system preserving the write sequence, consistent data can be maintained, making it possible to guarantee correctness of a sequence of related operations in respect of related data.

U.S. Pat. No. 6,092,066 discloses a technique whereby the data that is used by a computer is stored in a storage system and, by copying the data that is stored in this storage system to a separate storage system arranged at a remote location, the data can be maintained in the separate storage system even if the first storage system has become unusable due to for example a natural disaster or fire.

U.S. Pat. No. 6,209,002 discloses a technique whereby data employed by a computer is stored in a storage system and, by copying the data that is stored in this storage system to a separate storage system arranged at a remote location, and additionally copying the data that has been received by this separate storage system to a third storage system, a high level of redundancy can be obtained in respect of data.

SUMMARY

In the technique that is disclosed in Laid-open European Patent Application No. 0672985, consistency of the copy of data stored in the target storage system cannot be maintained unless the host computer applies a write time to the write data, since the write sequence is maintained using the write time applied to the write data by the host computer when the write data from the host computer is reflected to the target storage system. In the case of a so-called mainframe host computer, the write time is applied to the write request, but, in the case of a so-called open system host computer, the write time is not applied to the write request. Consequently, in the technique disclosed in Laid-open European Patent Application No. 0672985, consistency of the copy of the data stored in the target storage system with I/O from an open system host computer cannot be maintained.

Also in the case of U.S. Pat. No. 6,092,066 and U.S. Pat. No. 6,209,002, there is no disclosure concerning maintenance of consistency of a copy of data stored in a target storage system when the host computers include an open system host computer.

Accordingly, in a computer system in which data that is employed by computer is stored in a storage system and the data that is stored in this storage system is transferred to a separate storage system so that a copy of the data is also held in this separate storage system, there is herein disclosed a technique for maintaining consistency of the copy of the data stored in the separate storage system (i.e. the target storage system) even in respect of data written to the storage system by a host computer that does not apply a write time to the write data, such as an open system host computer.

The system comprises a first storage device system having a first logical volume coupled to a computer and in which data received from the computer is stored and a second storage device system coupled to the first storage device system and having a second logical volume in which a copy of data stored in the first logical volume is stored.

The first storage device system applies time information to the write data received from the computer and sends the write data and this time information to the second storage device system; the second storage device system stores the write data received from the first storage device system in the second logical volume in accordance with the time information applied to this write data.

In a computer system in which data that is employed by computer is stored in a storage system and the data that is stored in this storage system is transferred to a separate storage system so that a copy of the data is also held in this separate storage system, it is thereby possible to maintain consistency of the copy of the data that is stored in the separate storage system (target storage system), even in the case of data stored in the storage system by a host computer that does not apply the write time to the write data, such as an open system host computer.

A remote copy system according to the present invention comprises: a plurality of primary storage systems that receive write commands from a host computer; a first control section that controls the plurality of primary storage systems; a plurality of secondary storage systems that are respectively connected with the plurality of primary storage systems; and a second control section that controls the plurality of secondary storage systems. The first control section transmits to the plurality of primary storage systems a marker creation instruction including a marker sequence representing the sequence of marker creation. The plurality of respective primary storage systems comprise: a primary memory device; a journal memory region; a write processing section that writes to the primary memory device the data that is to be written in accordance with a write command from the host computer; a journal creation section that creates a journal of writing of this data to be written and stores this in the journal memory region; and a journal transmission section that transmits the journal in the journal memory region to a secondary storage system comprising a secondary memory device constituting a pair with the primary memory device. The markers constitute a journal of a different type from the write journal of the data to be written. The journal creation section contains a journal sequence expressing a creation sequence of the journal in a journal to be created, and when receiving a marker creation instruction from the first control section, creates markers including a marker sequence included in the marker creation instruction and stores the same in the journal memory region. Each of the plurality of secondary storage systems comprises: a secondary memory device; a marker sequence accumulation section that accumulates in the marker sequence information a marker sequence included in the markers received from the primary storage system; a marker sequence transmission section that transmits to the second control section a marker sequence group constituting a sequence of one or more markers in the marker sequence information in response to a marker sequence request from the second control section; and a data storage section that stores in the secondary memory device, based on the journal received from the primary storage system, in accordance with a data storage instruction from the second control section, data that is to be written corresponding to this journal. The second control section comprises: a marker sequence request section that respectively transmits to the plurality of secondary storage systems the marker sequence request which is a request for the marker sequence information; a marker sequence selection section that selects a common marker sequence contained in all of the plurality of marker sequence groups on receipt of the plurality of respective marker sequence groups from the plurality of secondary storage systems; and a data storage instruction section that transmits to the plurality of secondary storage systems a data storage instruction that performs data storage as far as the selected marker sequence.

The memory device described above may be a physical memory device, or may be a logical memory device.

Also, the journal of the data to be written may include management information for specifying the data to be written. In addition to the management information, the write data itself may be entered in the journal, or may not be entered in the journal.

Also, for the journal sequence, various types of information may be adopted so long as this information is capable of specifying the sequence. For example, this information may comprise a number, or may comprise a time stamp representing the time. Also, since the marker order can be easily found from the journal sequence, for the marker sequence, various types of information may be adopted so long as this information constitutes an identifier that is capable of specifying the respective marker. For example, the information may be a number, or may be a time stamp representing the time, having sufficient precision to specify the marker, or may be a uniquely determined name capable of specifying the marker (however, information expressing the order need not be included).

Also, the first control section may be a first computer connected with the primary storage systems, or, as will be described later, may be a single primary storage system of the plurality of primary storage systems. Likewise, the second control section may be a second computer (or even the first computer) connected with the secondary storage systems, or, as will be described later, may be a single secondary storage system of the plurality of secondary storage systems.

In a first embodiment, if a plurality of the common marker sequences are present, the marker sequence selection section may select the maximum marker sequence of the plurality of common marker sequences.

In a second embodiment, the first control section transmits a write disable request to the plurality of primary storage systems, and when receiving a notice of completion of write disabling from the plurality of primary storage systems in respect of this write disabling request, transmits the marker creation instruction to the plurality of primary storage systems. In each of the plurality of primary storage systems, when the write disabling request is received, the write processing section assumes a write disabling state and transmits to the first control section a notice of completion of write disabling; in the write disabling condition, even if a write command is received, a notice of completion of writing is not returned to the host computer.

In a third embodiment, in the second embodiment, the first control section when receiving a notice of marker creation completion from a primary storage system, transmits a write disabling cancellation request to the primary storage system. In each of the plurality of primary storage systems, the journal creation section, when creating a marker in response to the marker creation instruction, transmits a notice of marker creation completion to the first control section, and the write processing section, on receiving the write disabling cancellation request from the first control section, cancels a write disabling condition.

In a fourth embodiment, in the third embodiment if a fixed time has elapsed since the write disabling condition has been brought about, the write processing section cancels the write disabling condition even without receiving the write disabling cancellation request.

In a fifth embodiment, the marker sequence transmission section controls one or more marker sequences contained in the group of transmitted marker sequences to a marker sequence of markers up to a point where journal numbers in respect of the data to be written are consecutive.

In a sixth embodiment, the first control section is present in a single primary storage system of the plurality of primary storage systems and the primary storage system where this first control section is present acts as a master primary storage system in respect of other primary storage systems.

In a seventh embodiment, the second control section is present in one secondary storage system of the plurality of secondary storage systems and the secondary storage system where this second control section is present acts as a master secondary storage system in respect of other secondary storage systems.

In an eighth embodiment, the first control section is present in a single primary storage system of the plurality of primary storage systems and the primary storage system where this first control section is present acts as a master primary storage system in respect of other primary storage systems. The second control section is present in one secondary storage system of the plurality of secondary storage systems. The secondary storage system where this second control section is present acts as a master secondary storage system in respect of other secondary storage systems. If a plurality of the common marker sequences are present, the marker sequence selection section selects the maximum marker sequence of a plurality of the common marker sequences. The master primary storage system transmits a write disabling request to the other primary storage systems; when receiving a notice of completion of write disabling in response to this write disabling request from the other primary storage systems, the master primary storage system transmits the marker creation instruction to the other primary storage systems and, when receiving a notice of marker creation completion from the other primary storage systems, transmits a write disabling cancellation request to the other primary storage systems. It should be noted that it is also possible for the marker creation instruction and the write disabling cancellation request to be transmitted in combined form as a single instruction to the other primary storage systems. In the other primary storage systems, when receiving the write disabling request, the write processing section assumes a write disabled condition and sends a notice of completion of write disabling to the first control section; in this write disabled condition, even if a write command is received, no notice of write completion is returned to the host computer. The journal creation section, when a marker has been created in response to the marker creation instruction, transmits a notice of marker creation completion to the first control section. If a write disabling cancellation request is received from the first control section, the write processing section cancels the write disabling condition, or, if a fixed time has elapsed since the write disabling condition is produced, this write disabling condition is cancelled even if no such the write disabling cancellation request is received. It should be noted that, if the marker creation instruction and the write disabling cancellation request are received by the journal creation section in combined form as a single instruction, a marker may be created, the write disabling condition cancelled, and a notice of marker creation completion transmitted to the first control section.

Each of the sections described above may be constructed for example by a memory resource such as a memory. Also, the other sections may be constructed by hardware, a computer program or a combination of these (for example part may be implemented by a computer program and the rest may be implemented by hardware). The computer program is read by a prescribed processor and executed. Also, in the information processing that is performed by reading of the computer program by the processor, a memory region present on a hardware resource such as memory or the like may be suitably employed. Also, the computer program may be installed on a computer from a recording medium such as a CD-ROM, or may be downloaded to the computer through a communication network.

BRIEF DESCRIPTION OF THE DRAWINGS

FIG. 10 is a flow diagram showing another example of processing in the case where the storage device A has received a write request;

FIG. 11 is a flow diagram showing another example of processing in the case where the storage device A has received a write request;

FIG. 37 shows an example of the layout of received marker information 5438;

FIG. 46 shows an example of a flow chart of a write data reflection program 5434.

DESCRIPTION OF THE PREFERRED EMBODIMENTS

Embodiments of the present invention are described below. However, it should be noted that the present invention is not restricted to the embodiments described below.

Embodiment 1

Figure 1:
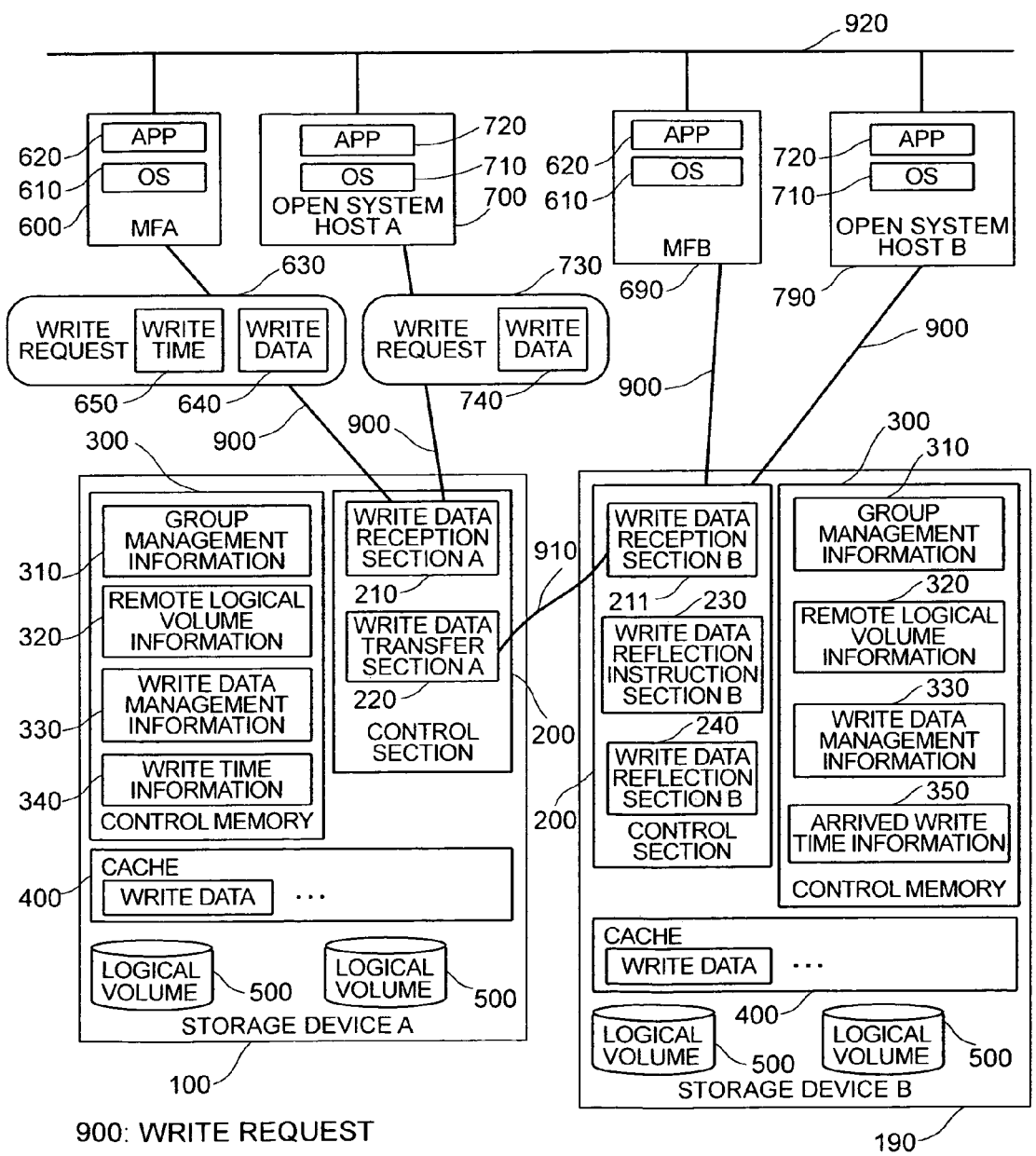
FIG. 1 is a view showing an example of the layout of a computer system according to embodiment 1.

FIG. 1 is a view showing an example of the layout of a computer system according to a first embodiment.

This system comprises a storage device (also referred to as a storage system) A100, a mainframe host computer A (also called MFA) 600, an open system host computer A700, a storage device B190, a mainframe host computer B (also referred to as MFB) 690 and an open system host computer B790. The storage devices A 100 and MFA 600 and the open system host A 700 are respectively connected by I/O paths 900. The storage device B 190 and MFB 690 and open system host B 790 are also respectively connected by I/O paths 900. The MFB 690 and open system host B 790 are normally a standby system. The MFA 600, MFB 690 and open system host A 700 and open system host B 790 are connected by a network 920.

The MFA 600 and MFB 690 include an OS 610 and application software (APP) 620. Also, the open system host A 700 and open system host B 790 likewise include an OS 710 and APP 720. An I/O request issued from the APP of the MFA 600, MFB 690, open system host A 700, or open system host B 790 through the OS is issued to the storage device A 100 or storage device B 190 through the I/O path 900. In this case, software such as a DBMS is included in the APP 620 or APP 720.

The storage device A 100 comprises a control section 200, control memory 300 and cache 400. The control section 200 comprises a write data reception section A 210 and write data transfer section A 220. The control section 200 accesses the control memory 300 and performs the following processing, utilizing the information stored in the control memory 300. The cache 400 comprises high-speed memory that chiefly stores the read data or write data so that the storage device A can achieve a high I/O processing performance by employing the cache 400. It should be noted that, preferably, these components are duplicated and provided with back-up power sources, for purposes of fault resistance and availability.

The storage device B 190 also comprises a control section 200, control memory 300 and cache 400. The control section 200 comprises a write data reception section B 211 and write data reflection instruction section 230 and write data reflection section 240. The role of the control memory 300 and cache 400 is the same as in the description of the storage device A 100 above.

The storage device A 100 and storage device B 190 provide logical volumes 500 constituting data storage regions in respect of the MFA 600, open system host A 700, MFB 690 and open system host B 790. It is not necessary that a single logical volume 500 should constitute the single physical device; for example it could be constituted by a set of storage regions dispersed on a plurality of magnetic disc devices. Also, a logical volume may have for example a mirror construction or a construction that has redundancy such as for example a RAID construction, in which parity data is added.

The storage device A 100 provides a logical volume 500 as described above; however, in the case of the MFA 600 and open system host A 700, the type of logical volume 500 that is provided is different from that provided in the case of the storage device A 100; also, the logical and/or physical interfaces of the I/O paths 900 are different. The same applies to the storage device B 190, MFB 690 and open system host B 790. The time of the write request 630 is included in the write request 630 from the MFA 600 as the write time 650, but is not included in the write request 730 from the open system host A 700.

The storage device A 100 and the storage device B 190 are connected by transfer paths 910. As will be described, the storage device A 100 and the storage device B 190 can hold a copy of the content of one logical volume in another logical volume. In this embodiment, a copy of the content of the logical volume 500 of the storage device A 100 is held in the logical volume 500 of the storage device B 190; the content of the updating performed on the logical volume 500 of the storage device A 100 is also stored in the logical volume 500 of the storage device B 190 by being sent to the storage device B 190 through the transfer path 910. As will be described, the storage device A 100 and the storage device B 200 hold management information regarding the copy, indicating the relationship between the logical volumes and maintenance of the copy referred to above is performed by using this management information. The relationship between the logical volumes and the relationship of the logical volume groups, to be described, is set by the user in accordance with the user's needs.

Figure 2:
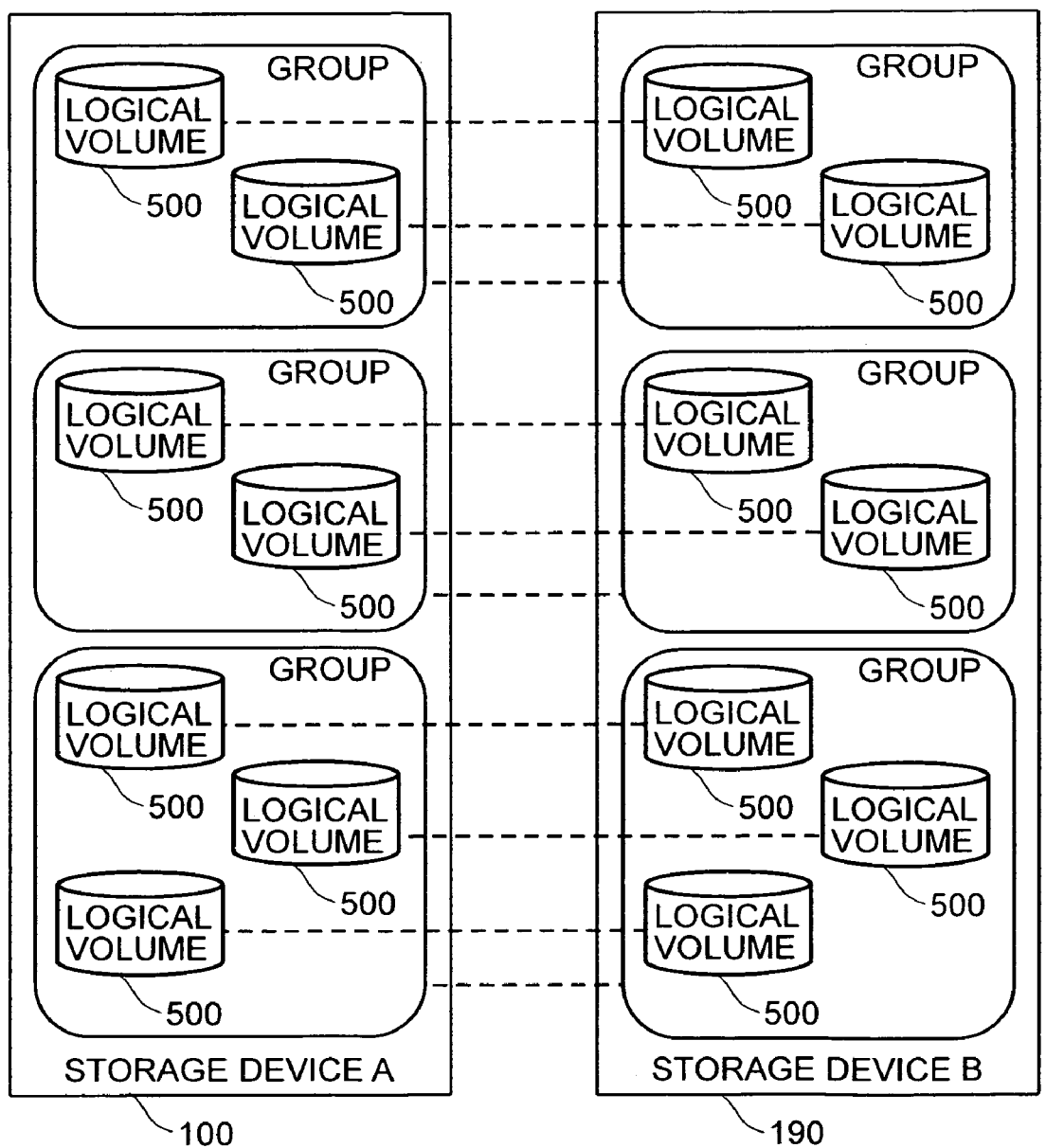
FIG. 2 is a diagram showing an example of a logical volume group.

In this embodiment, the relationships between the logical volumes are grouped. FIG. 2 is a diagram showing an example of a group of logical volumes. The broken lines indicate the copy relationship between the logical volumes 500 or between the logical volume groups i.e. the correspondence relationship of the source and target. In this embodiment, the sequence of write data in the storage device A 100 and reflection in the storage device B 190 are managed in units of logical volume groups comprising a plurality of such logical volumes and allocation of the necessary resources for processing as described above is also performed in units of logical volume groups.

If these are performed for each of the individual logical volumes, the large number of items to be managed makes the management process complicated and there is also a possibility of the resources required for this processing being increased, due to the large number of items to be processed. On the other hand, if the entire storage device A 100 is treated as a unit, detailed management can no longer be performed. In particular, since demands such as performance in regard to the logical volumes 500 differ greatly between a mainframe host and an open system host, it is desirable to arrange for example for manual control operations from the user in regard to processing and setting such as of tuning conditions to be accepted separately, by arranging for such hosts to perform processing separately, divided into respective groups. By setting up logical volume groups in this way, flexible copy processing management can be provided in response to the requirements of users or businesses.

Next, processing of writing of data onto each logical volume 500, transfer of data to a storage device B 190 and processing for reflection of data in the storage device B 190 will be described for the case where the logical volumes 500 that are used by the MFA 600 and the open system host A 700 are arranged to belong to different logical volume groups. By means of these processes, reflection to a copy is performed in write sequence between the various logical volumes of the storage device A 100 and, regarding consistency between copies, it is arranged that mutual consistency can always be maintained between the mainframe host data and open system host data.

Figure 3:
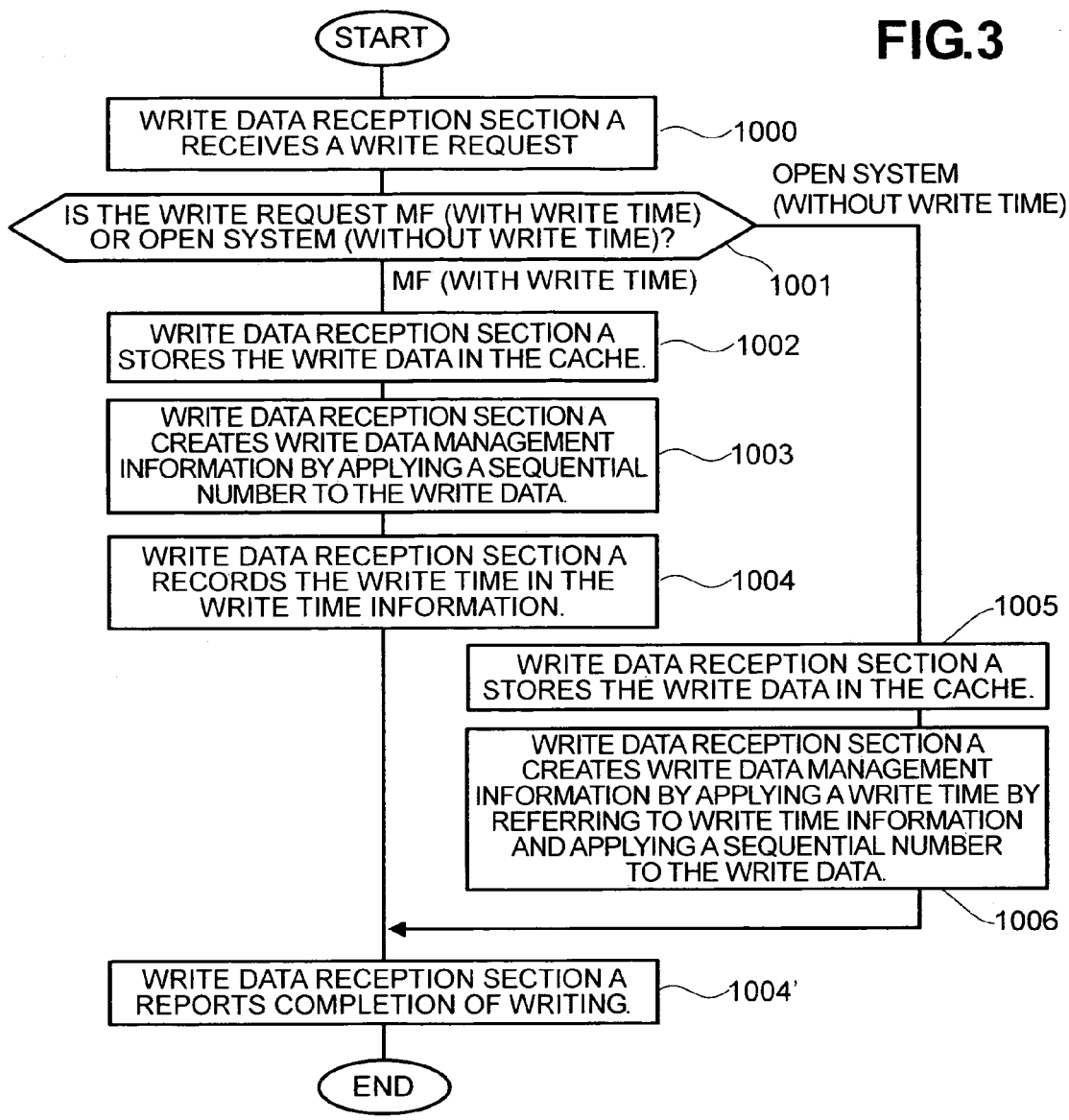
FIG. 3 is a flow diagram showing an example of processing in the case where a write request is received by a storage device A.

FIG. 3 is a view showing the processing that is performed in the case where a write request is received from the MFA 600 or open system host A 700 in respect of a logical volume 500 (logical volume 500 constituting the source) where a copy of the logical volume 500 is being created. The write data reception section A 210 receives a write request from the MFA 600 or open system host A 700 (step 1000). If the write time 650 is included in the write request that is received (step 1001), the write data reception section A 210 stores the write data in the cache 400 (step 1002) and creates (step 1003) write data management information 330 by applying (assigning) a sequential number to the write data. The write data reception section A 210 then records the write time 650 in the write data management information 330. Also, when the sequential number is applied, the write data reception section A 210 obtains the sequential number from the group management information 310 of the logical volume group to which the logical volume that is being written belongs and records a value obtained by adding 1 thereto in the write data management information 330 as the sequential number of the write data, and records this new sequential number in the group management information 310.

Figure 4:
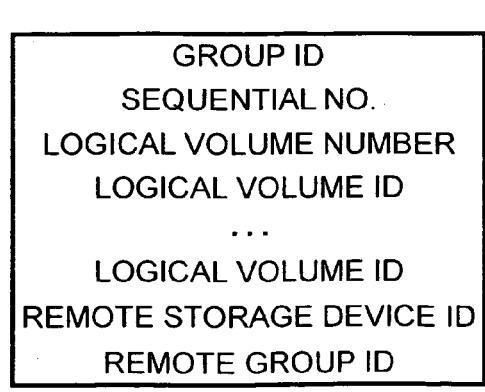
FIG. 4 is a view showing an example of group management information.

FIG. 4 is a view showing an example of group management information 310 of the various logical volume groups. The group ID is the ID for identifying a logical volume group in the storage device A 100. The sequential numbers are numbers that are continuously given to write data in respect of a logical volume belonging to the logical volume group in question. Numbers successively increased by 1 in each case are applied to such write data, the initial value being for example 0. The logical volume number is the number of the logical volume that belongs to the logical volume group in question. The logical volume number is the ID of the logical volume belonging to the logical volume group in question in the storage device A 100. The remote storage device ID has a logical volume group that is paired with the logical volume group in question and is an ID (e.g. serial number) that specifies the storage device (in this embodiment, the storage device B 190) where a copy of the content of the logical volume belonging to the logical volume group in question is stored. The remote group ID is an ID that specifies the logical volume group that is paired with the logical volume group in question in the remote storage device (storage device B 190) i.e. the logical volume group to which the logical volume 500 (also called the remote logical volume) belongs in which a copy of the content of the logical volume belonging to the logical volume group in question is stored.

Figure 5:
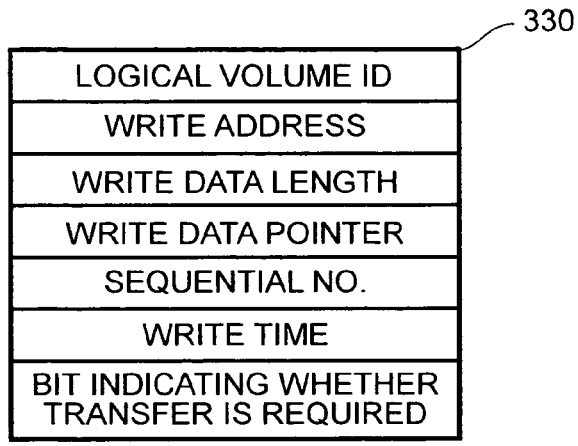
FIG. 5 is a view showing an example of write data management information for managing write data.

FIG. 5 is a view showing an example of write data management information 330 for managing the various write data. The logical volume ID is the ID of the logical volume in which the write data is stored. The write address is the write start address of the write data in question in the aforesaid logical volume. The write data length is the length of the write data in question. The write data pointer is the storage start address of the write data in question in the cache 400. The sequential numbers are numbers that are continuously given to write data in the logical volume group and to which the logical volume belongs in which the write data is written. The write time will be discussed below. The "transfer required" bit is a bit that indicates whether or not the write data in question needs to be transferred to the storage device B and is set to ON when write data management information 330 is created by receipt of write data by the write data reception section A 210. The write data management information 330 is managed in the form of a list for example for each logical volume group.

Returning to FIG. 3, in step 1004, the write data reception section A 210 records the write time 650 as the write time information 340 in the control memory 300.

If, in step 1001, no write time is included in the write request, the write data reception section A 210 stores the write data in the cache 400 (step 1005) and obtains from the write time information 340 a write time, which it applies (assigns) to the write data, and creates write data management information 330 (step 1006) by applying a sequential number obtained from the group management information 310. At this time, the write data reception section A 210 then records the time at which the write time information 340 was recorded, as the write time of the write data management information 300, and finds a sequential number by the same procedure as in the case of step 1003 described above and records this sequential number in the write data management information 300.

Finally, in step 1007, completion of writing is reported to the MFA 600 or to the open system host A 700. The aforesaid processing does not include the time-consuming processing of physically writing the write data that is stored in the cache 400 to the recording medium of the logical volume 500 or of transferring the write data to the storage device B 190; this processing is performed subsequently in asynchronous fashion, with an appropriate timing. Consequently, the time required until reporting of completion of writing after receiving the write request by the write data reception section A 210 need only be a short time, so rapid response to the MFA 600 or open system host A 700 can be achieved.

Figure 6:
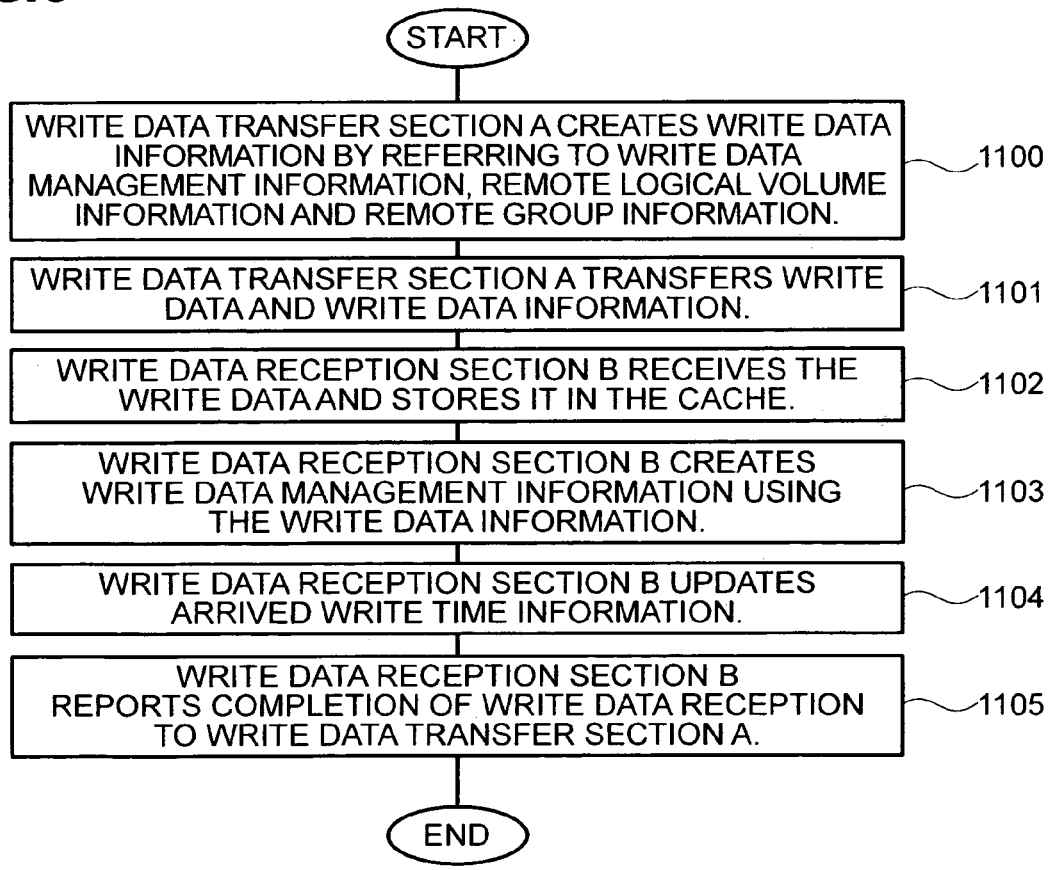
FIG. 6 is a flow diagram showing an example of transfer processing of write data from the storage device A to a storage device B.

FIG. 6 is a view showing an example of transfer processing of write data to the storage device B 190 from the storage device A 100. The write data transfer section A 220 finds (step 1100) the information relating to the write data that is transferred to the storage device B 190 by referring to the list of the write data management information 330 to find the write data that needs to be transferred and, in addition, referring to the write data management information 330, group management information 310 and remote logical volume information 320. This information includes the write address acquired from the write data management information 330, the write data length, the sequential number, the write time, the remote storage device ID acquired from the remote logical volume information 320, the remote logical volume number, and the remote group number obtained from the group management information 310 using the logical volume ID.

Figure 7:
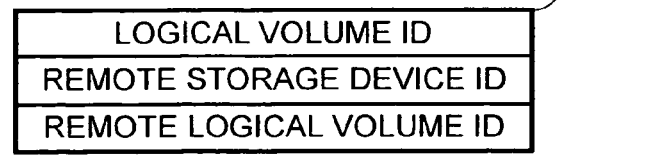
FIG. 7 is a view showing an example of remote logical volume information of a logical volume.

FIG. 7 is a view showing an example of the remote logical volume information 320 of the various logical volumes. The logical volume ID is the ID of the logical volume on the source side (logical volume 500 included in the storage device A 100 in embodiment 1). The remote storage device ID is an ID (for example a serial number) specifying the storage device (storage device B 190 in embodiment 1) having the logical volume (also called the remote logical volume) in which is stored a copy of the data stored by the logical volume in question that is paired with the logical volume in question. The remote logical volume ID is an ID that specifies the remote logical volume (i.e. the logical volume 500 on the target side, where a copy of the data that was stored in the logical volume is stored) in the remote storage device (storage device B 190 in embodiment 1).

Next, returning to FIG. 6, the write data transfer section A 220 transfers (step 1101) to the storage device B 190 the write data and the information found in step 1100. The write data reception section B 211 of the storage device B stores (step 1102) the received write data and information in the cache 400 and creates (step 1103) write data management information 330 from the received information. The items of the write data management information 330 of the storage device B 190 are the same as the items of the write data management information 330 of the storage device A 100. The content of the write data management information 330 of the storage device B 190 differs from that of the write data management information 330 of the storage device A 100 in that the logical volume ID is the ID of the logical volume 500 on the target side where the copy is stored and the write data pointer is the storage start address of the write data in the cache 400 of the storage device B 190 and the "transfer needed" bit is normally OFF, but is otherwise the same.

The storage device B 190 also has group management information 310, but the items thereof are the same as in the case of the storage device A 100. Regarding the content of the group management information 310, the group ID is an ID that specifies the logical volume group to which the logical volume 500 on the side of the target where the copy is stored belongs, the remote storage device ID is the ID of the storage device (storage device A 100 in the case of embodiment 1) constituting the source and the remote group ID is an ID that specifies the logical volume group to which the remote logical volume (i.e. the logical volume 500 constituting the source) belongs in the remote storage device (storage device A 100 in embodiment 1). The storage device B 190 also has remote logical volume information 320, but the items thereof are the same as in the case of the storage device A 100 and, regarding its content, the logical volume ID is an ID that specifies the logical volume 500 where the copy is stored, the remote storage device ID is an ID that specifies the ID of the storage device (storage device A 100) constituting the source and the remote logical volume ID is an ID that specifies the remote logical volume (logical volume 500 constituting the source) in the remote storage device (storage device A 100).

Returning to FIG. 6, next, the write data reception section B 211 updates the arrived write time information 350 (step 1104).

Figure 8:
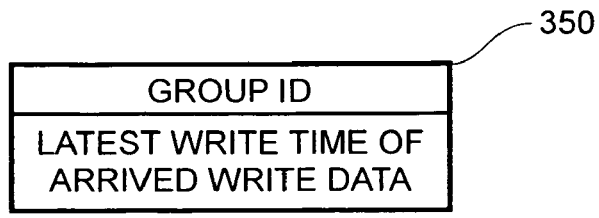
FIG. 8 is a view showing an example of arrived write time information.

FIG. 8 is a view showing an example of arrived write time information 350 of the various groups. The group ID is an ID that specifies the logical volume group in the storage device B 190. The latest write time of the arrived write data is the latest time closest to the current time, of the write times applied to the write data received by the write data reception section of B 211, in respect of the logical volume groups of the storage device B 190. However, if it appears, from the sequential number order, that some of the write data has not yet arrived (some of the sequence of write data is missing), the latest time of the write time applied to these items of write data is recorded as the arrived write data time information, taking the continuous time comparison range in the order of the sequential numbers as being up to the final write data (write data immediately preceding the missing data).

In transfer of the write data between the write data transfer section A 220 and the write data reception section B 211, a plurality of items of write data may be simultaneously transferred in parallel. The write data is therefore not necessarily received in the write data reception section B 211 in the order of the sequential numbers but, as will be described, the write data is reflected in the order of the sequential numbers to each of the logical volume groups (i.e. it is stored in the logical volumes of the storage device B 190), so the write data is reflected to the copy in the order of updating (i.e. in the order of writing of the write data in the storage device A 100).

Returning once more to FIG. 6, finally, the write data reception section B 211 reports completion of reception of the write data to the write data transfer section A 220 (step 1105). The write data transfer section A 220 of the storage device A 100 that has received this write data turns the "transfer required" bit of the write data management information 330 OFF in respect of the write data corresponding to the report of completion of reception of write data. At this time, the storage device A 100 may discard from the cache the arrived write data that was held for transfer to the storage device B 190.

Figure 9:
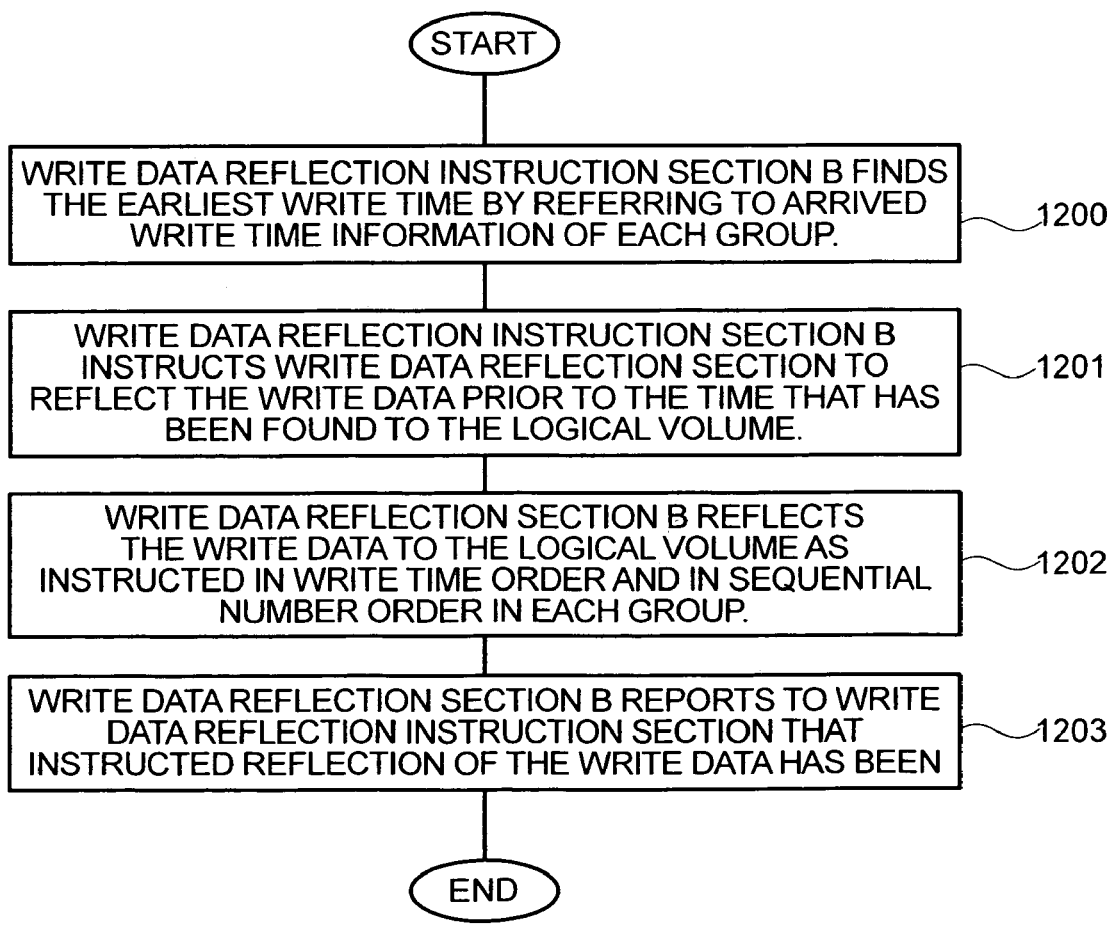
FIG. 9 is a flow diagram showing an example of reflection processing of write data in the storage device B.

FIG. 9 it is a view showing an example of the reflection processing of write data in the storage device B 190 (i.e. the processing of storage of the write data to the logical volume).

The write data reflection instruction section B 230 checks the arrived write time information 350 of all the logical volume groups of the storage device B 190 and finds, of these, the earliest time (step 1200). The write data reflection instruction section B 230 gives instructions (or permission)

(step 1201) to the write data reflection section B 240 for reflection to these logical volumes of the write data whose write time is previous to the time that was thus found. When the write data reflection section 240 receives these instructions (or permission), by referring to the write data management information 330 and group management information 310, it reflects the write data in the designated time range (i.e. the write data whose write time is previous to the time found in step 1200), in the order of the write times, or, if these write times are the same, in the order of the sequential numbers in the various logical volume groups, in respect of the logical volume 500 in which the copy is stored (i.e. the write data is stored in the logical volume on the target side) (step 1202). After completion of reflection of all of the write data in the range specified in step 1202, the write data reflection section B 240 reports completion of the instructed processing (step 1203) to the write data reflection instruction section 230. The storage device B may discard the reflected write data from the cache 400.

By means of the above processing from step 1200 to step 1203, one of cycle of reflection processing is completed. The write data reflection instruction section B 230 and the write data reflection section B 240 repeat the above cycle in order to reflect the write data transferred from the storage device A continuously.

By means of the above processing, a copy of the updated data of the storage device B 190 is stored maintaining the order between updating of data by the mainframe host and updating of data by the open system host. Regarding data consistency between the copies, mutual consistency can be maintained between the data of the mainframe host and the data of the open system host.

Specifically, the storage device A 100 utilizes the write time 650 contained in the write request 630 received from the mainframe host and applies a write time also to the write data received from the open system host and, furthermore, manages the received write data using both the write times and the sequential numbers. The target storage device B 190 designates the write data that is capable of being reflected (i.e. that is capable of storage in a logical volume on the target side) using the sequential numbers and the write times and stores the designated write data in a logical volume on the target side. As a result, even if buffering and/or transferring are provided in parallel mid-way, write order is maintained between the data written from the mainframe host and the data written from the open system host, so copy data can be stored in a logical volume of the storage device B 190 on the target side.

Also, even if some fault occurs in for example the storage device A 100, so that previously updated write data does not reach the storage device B 190, since the sequential numbers will not be continuous in respect of the write data of write times subsequent to the write time of the write data that failed to arrive, reflection thereof will not be allowed. Gaps of updating of data cannot therefore occur in the target side storage device B 190 and consistency between the source storage device A 100 and target storage device B 190 is ensured. As a result, even if a fault occurs in the source storage device A 100, business can be continued using the content of the logical volume 500 of the storage device B 190, which is matched with the MFB 690 and/or open system host B 790.

Also, since, in the above processing, write times are applied to all of the write data received by the storage device A 100, irrespective of whether the host that employs the data is a mainframe host or open system host, it is possible to ascertain information such as up to which write time the write data in any desired logical volume 500 has been transferred from the storage device A 100 to the storage device B 190 or has arrived at the storage device B 190 or has been reflected at the storage device B 190 (i.e. has been stored in a logical volume).

It should be noted that, in order to lighten the processing load in the above step 1202, the write data in the designated time range may be stored in the logical volume 500 that stores the copy in sequential number order in the various logical volume groups, neglecting the write time order. In this case, consistency between the copies (i.e. between the logical volumes of the storage device B 190 on the target side) is maintained by the timing of the reports of completion of processing in step 1203. If it is desired to hold consistent data of the period between a report of completion of processing and the next report of completion of processing, a snapshot of the logical volume 500 in which the copy is stored may be acquired with the timing of the report of completion of processing. The technique disclosed in for example U.S. Pat. No. 6,658,434 may be employed as a method of acquiring such a snapshot. In this method, the storage content of a logical volume 500 (source volume) in which is stored the data whereof a snapshot is to be acquired is copied to another logical volume 500 (target volume) of the storage device B 190, so that the updated content is reflected also to the target volume when the source of volume is updated. However, in this embodiment, once the snapshot of the source volume has been stored in the target volume, the content of the target volume is frozen and verified by stopping reflection at that time.

Also in the transfer processing of the above write data, it was assumed that, initially, the write data transfer section A 220 transfers the write data in respect of the write data reception section B 211; however, it would be possible for the write data reception section B 211 to initially issue a write data transfer request in respect of the write data transfer section 220 and for the write data transfer section A 220 to transfer the write data in respect of the write data reception section B 211 after having received this request. By employing write data transfer requests, the pace of transfer of write data can be adjusted in accordance with for example the processing condition or load of the storage device B 190 or the amount of write data that has been accumulated.

Also, in the above processing, it was assumed that the location of storage of the write data was the cache 400; however, by preparing a separate logical volume 500 for write data storage, the write data could be stored in this logical volume 500. In general, a logical volume 500 of large volume may be prepared in respect of the cache 400, so this makes it possible for more write data to be accumulated.

Also, in the above processing, it was assumed that the write time information 340 was updated by the write time 650 of reception from the mainframe host; however, it may be arranged for the storage device A 100 to possess an internal clock and to constantly update the write time information 340 by reference to this clock. In this case, FIG. 10 shows an example of the processing that is executed when a write request in respect of a logical volume 500 (logical volume 500 constituting the source) where the storage device A 100 creates a copy is received from the MFA 600 or open system host A 700. This processing is processing corresponding to the processing shown in FIG. 3.

The write data reception section A 210 receives (step 1300) a write request from the MFA 600 or open system host A 700. The write data reception section A 210 stores (step 1301) the write data in the cache 400 and applies a write time to the write data by referring to the write time information 340 that is constantly updated in accordance with the clock provided in the storage device A 100, and creates (step 1302) write data management information 330 by applying a sequential number to the write data, by referring to the group management information 310. Finally, completion of writing is reported to the MFA 600 or open system host A 700 (step 1303).

Also, in the above processing, a time is used in the write time information 340 or the write time of the write data management information 300 or the arrived write time information 350; however, the time that is employed for this purpose need not necessarily be of the form of years, months, days, hours, minutes, seconds, milliseconds, microseconds, nanoseconds or a total of an ordinary time and instead a sequential number could be employed. In particular, FIG. 11 shows an example of the processing when the storage device A 100 has received a write request in respect of the logical volume 500 (logical volume 500 constituting the source), where the copy is created, from the MFA 600 or open system host A 700, in a case where the storage device A 100 itself updates the write time information 340. This processing is processing corresponding to FIG. 3 or FIG. 10. It should be noted that, in FIG. 11, the initial value of the write time information 340 may for example be 0 and numbers successively incremented by 1 may be applied to the write data as shown below as the write times.

The write data reception section A 210 receives a write request (step 1400) from the MFA 600 or open system host A 700. The write data reception section A 210 stores the write data in the cache 400 (step 1401), reads the number from the write time information 340 and applies to the write data (step 1402) as the write time the value obtained by incrementing this by 1. Then the write data reception section A 210 records the value after incrementing by 1 as the write time information 340, thereby updating the write time information 340 (step 1403). The write data reception section A 210 also creates the write data management information 330 (step 1405) by applying a sequential number to the write data (step 1404) by referring to the group management information 310. The write data reception section A 210 finally reports completion of writing (step 1406) to the MFA 600 or open system host A 700.

When a sequential number is employed as the write time in this manner, in the storage device B 190, instead of the write data reception section B 211 being arranged to update the arrived write time information 350 using the write time applied to the write data received and the write data reflection instruction section B 230 being arranged to designate the range of write data capable being stored in a logical volume of the storage device B by checking the arrived write time information 350 of the various logical volume groups, it may be arranged for the write data reflection section 240 to reflect (i.e. store) the write data arriving at the storage device B by referring to the sequential number recorded at the write time of the write data management information 330 in the logical volume 500 without skipping numbers in the number sequence.

Embodiment 2

Figure 12:
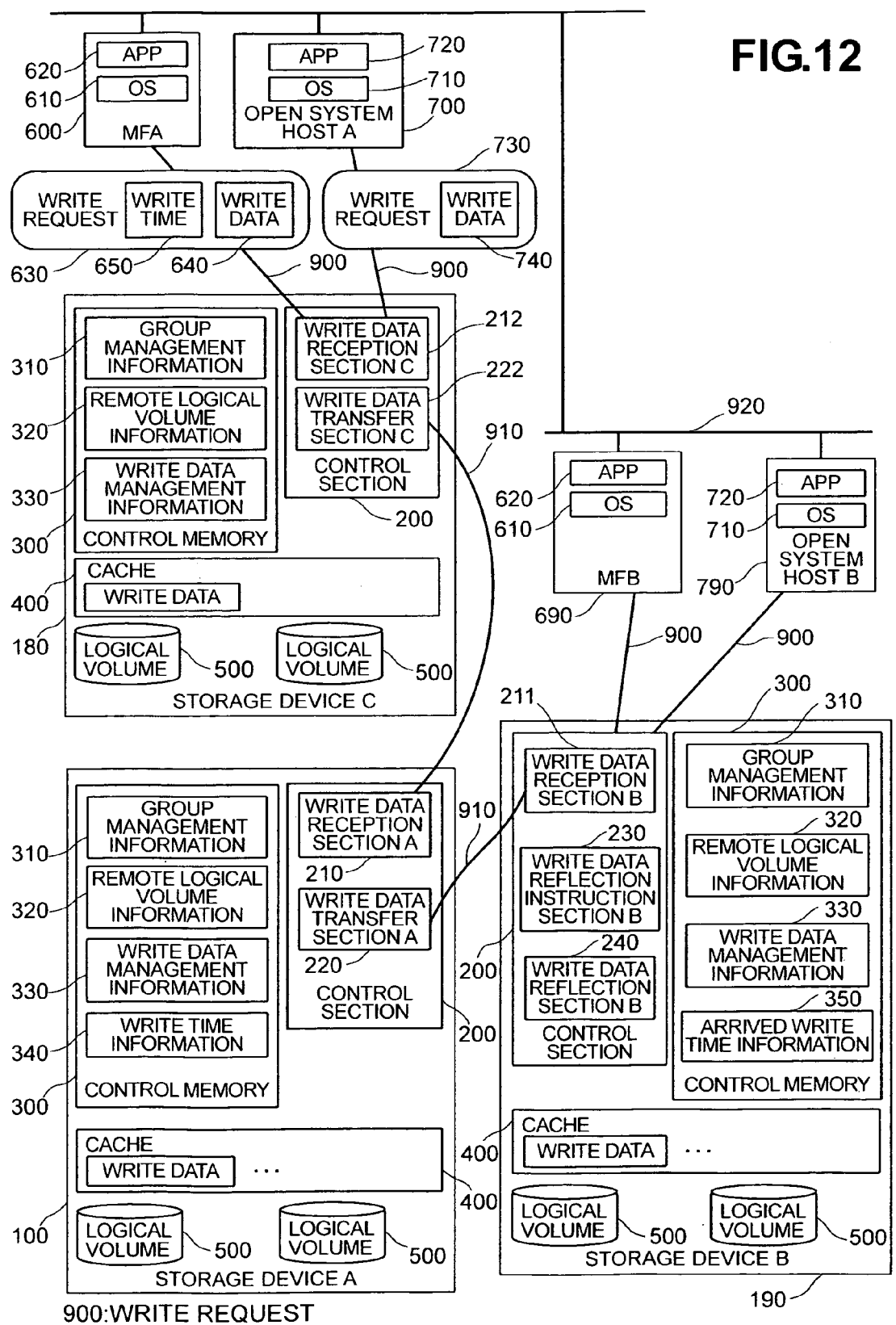
FIG. 12 is a view showing an example of the layout of a computer system according to embodiment 2.

FIG. 12 is a view showing an example of the layout of a computer system according to a second embodiment.

The differences with respect to embodiment 1 lie in that the MFA 600 and open system host A 700 are connected with the storage device C 180 through an I/O path 900 and the storage device C 180 is connected with the storage device A 100 through a transfer path 910. In this embodiment, a copy of the data stored in the logical volume 500 of the storage device C 180 is stored in a logical volume 500 of storage device A 100. Further, a copy of the data stored in the logical volume 500 of the storage device A is stored in the logical volume 500 of the storage device B 190 in processing like the processing described in embodiment 1. That is, in this embodiment, a copy of the data stored in the logical volume 500 of the storage device C 180 is stored in the storage device A 100 and the storage device B 190.

In order to implement such processing, the storage device C 180 is provided with the various items of information and a construction like that of the storage device A 100 described in embodiment 1. However, the timing with which the write data reception section C 212 reports completion of writing in respect of the write data is different from that in embodiment 1. The write data reception section reports completion of writing to the MFA 600 or to the open system host A after reception of a report of completion of reception from the write data reception section A of the storage device A in the following way. Other details of the layout of the storage device C are the same as in the case of the storage device A described in embodiment 1.

When the storage device C 180 has received a write request 630 or a write request 730 for the logical volume 500 from the MFA 600 or open system host A 700, it stores the received write data 640 or write data 740 in a logical volume in the storage device C 180 and transfers this to the write data reception section A 210 of the storage device A 100. At this point, in contrast to the processing described in embodiment 1, the storage device C 180 sends notification of completion of writing to the MFA 600 or open system host A 700 after waiting for notification of completion of reception from the write data reception section A 210, and the storage device C 180 is thereby able to guarantee that a copy of the write data 640 or write data 740 that was written thereto is present in the storage device A 100. In this way, if for example due to the occurrence of some fault in the storage device C 180 or on the transmission path 910, transfer of data to the storage device A 100 has not succeeded, the MFA 600 or open system host A 700 will not deem write data that have not been transferred to the storage device A 100 to have been written but will only deem write data that have been received by the storage device A 100 to have actually been written; a copy as expected by the APP 620 on the MFA 600 or the APP 720 on the open system host A 700 will therefore exist on the storage device A 100. Furthermore, after all of the write data received by the storage device A 100 have been sent to the storage device B 190, a copy as expected will also exist on the storage device B 190, so, at the time where the processing executed by the MFA 600 or open system host A 700 was interrupted, the MFB 690 or open system host B 790 will be able to continue business using data as expected identical with the data that are recognized as having been written by the MFA 600 or open system host A 700.

As initially indicated in embodiment 1, when the write time information 340 is updated by the write time 650 applied to the write data, the write data reception section C 212 of the storage device C 100, if a write time 650 is included in the received write request 630, records the write time also in the write data management information 330 and the write data transfer section C 222 also transfers this write time to the write data reception section A210 of the storage device A 100 when performing write data transfer. After receiving the write data and the write time, the write data reception section A 210 processes the write data and the write time received from the storage device C 180 by the same method as the processing of the write request 630 that was received from the mainframe host in embodiment 1; consistency between the copies stored in the logical volumes in the storage device A 100 is thereby maintained and consistency between the write data issued from the mainframe host and the write data issued from the open system host can thereby be maintained.

In this way, even if, due for example to a large-scale disaster, faults occur in both of the storage device C 180 and the storage device A 100, business can be continued using the consistent content of the logical volume 500 of the storage device B 190, which was matched with the MFB 690 and open system host B 790. As indicated in the final part of embodiment 1, when the write time information 340 is updated from the storage device A 100 itself, transfer of the write time from the storage device C 180 is unnecessary, so that, after receiving the write data from the storage device C 180, the write data reception section A 210 may perform processing on the write data like the processing of FIG. 11 indicated in the latter part of embodiment 1.

It should be noted that there may be a plurality of storage devices C 180 that connect to the storage device A 100.

Also, although not shown, if the mainframe host and open system host are connected by an I/O path with the storage device A 100, the mainframe host or open system host that is connected with the storage device A may continue the business that was being conducted by the MFA 600 or open system host A 700 using the consistent content of a logical volume 500 of the storage device A 100 that was matched therewith, in the event that a fault occurs in the MFA 600 or open system host A 700 or storage device C 180.

Embodiment 3

Figure 13:
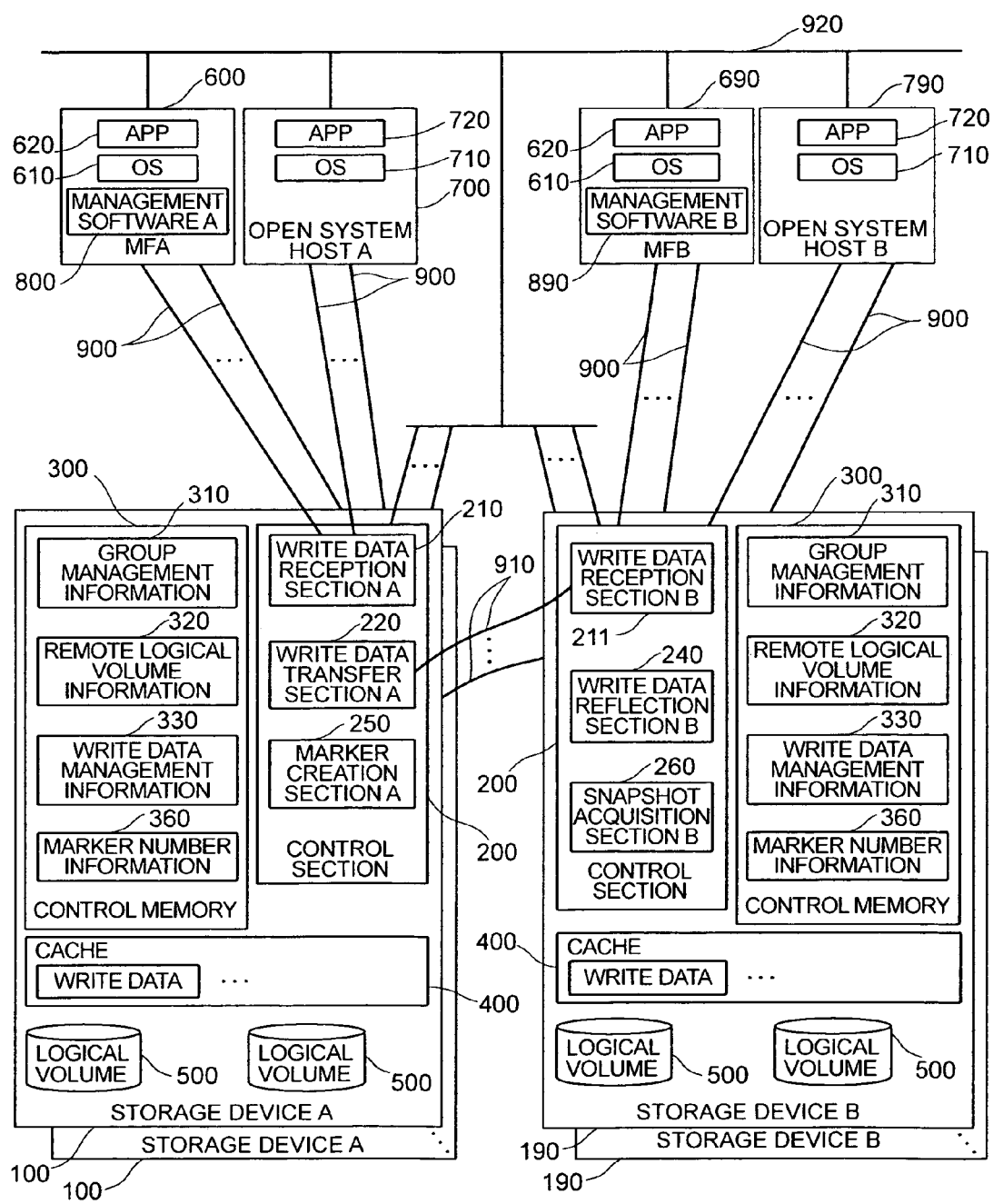
FIG. 13 is a view showing an example of the layout of a computer system according to embodiment 3.

FIG. 13 is a view showing an example of the construction of a computer system according to Embodiment 3.

The chief differences with respect to embodiment 1 lie in that there are a plurality of respective storage devices A 100 and storage devices B 190, the MFA 600 and open system host A 700 are connected through an I/O path 900 respectively with a plurality of storage devices A 100, the MFB 690 and the open system host B 790 are connected through an I/O path 900 respectively with a plurality of storage devices B 190, the MFA 600 includes management software A 800 and the MFB 690 includes management software B 890. Other differences will be described below.

Hereinbelow, the processing in respect of writing performed to the various logical volumes 500, transfer of write data to the storage device B 190 and the processing of reflection of write data in the storage device B 190 (i.e. storage of the write data in the logical volume) will be described in respect of the logical volumes 500 employed by the MFA 600 and the open system host A 700. This processing ensures that mutual consistency is maintained between the data of the mainframe host and the data of the open system host in regard to consistency between copies respectively stored in the plurality of logical volumes that are possessed by the plurality of storage devices B 190.

Figure 14:
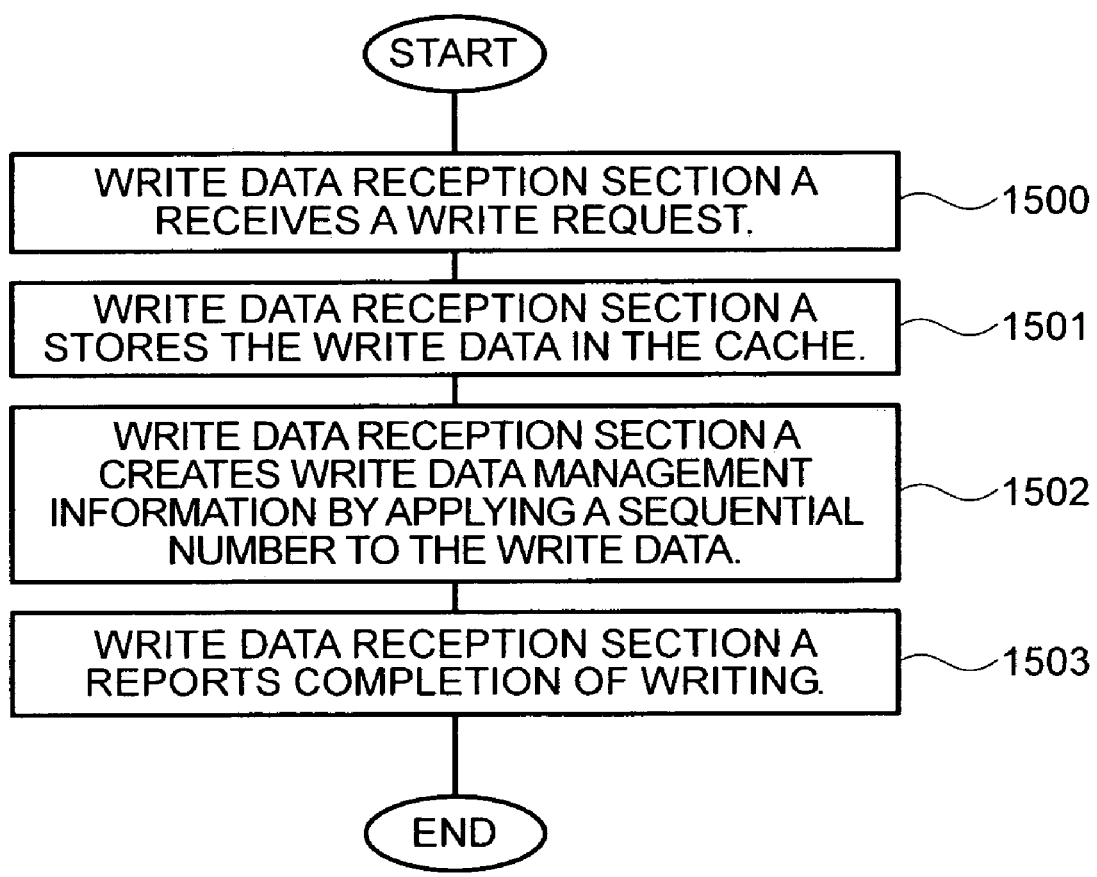
FIG. 14 is a flow diagram showing another example of processing in the case where the storage device A in embodiment 3 has received a write request.

FIG. 14 is a view showing an example of the processing when a write request in respect of the logical volume 500 (logical volume 500 constituting the source) in which a copy is created by the storage device A 100 is received from the MFA 600 or open system host A 700.

The write data reception section A 210 receives (step 1500) a write request from the MFA 600 or open system host A 700. The write data reception section A 210 stores the write data in the cache 400 (step 1501) or, as in embodiment 1, creates write data management information 330 (step 1502) by acquiring a sequential number by referring to the group management information 310. Finally, the write data reception section A 210 reports to the MFA 600 or open system host A 700 completion of writing (step 1503). The group management information 310 is the same as that in the case of embodiment 1. The write data management information 330 of this embodiment will be described later.

Figure 15:
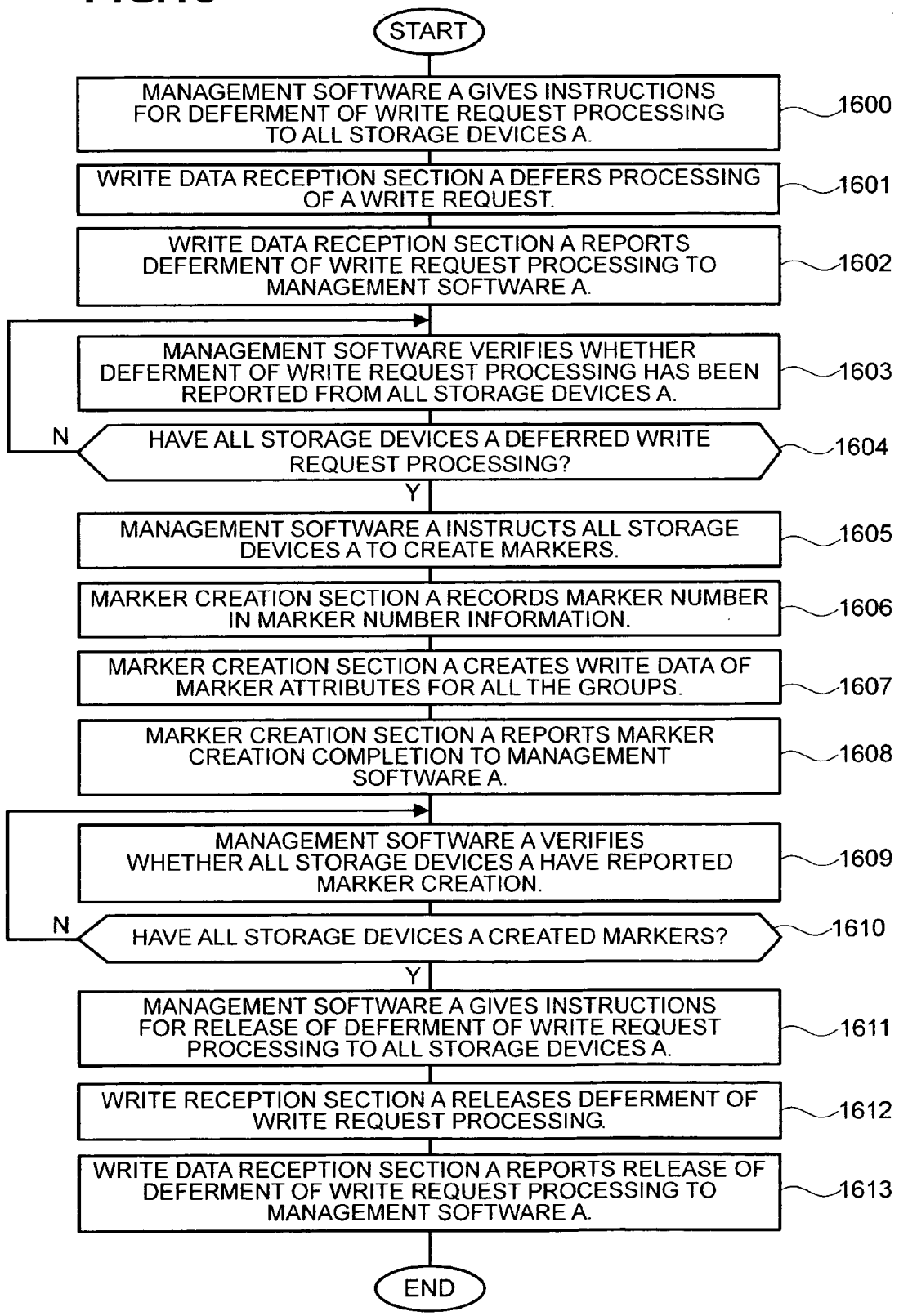
FIG. 15 is a flow diagram showing an example of processing in the case where the management software A gives instructions for deferring processing of a write request in respect of the storage device A and creation of a marker.

FIG. 15 is a view showing an example of the processing when the management software A 800 gives instructions for deferment of processing of write requests in respect of the storage device A 100 and creation of a marker. As will be described later, consistency is established between the copies stored in the plurality of storage devices B 190 by subsequently performing synchronization of reflection to the copies, with the timing with which this processing was performed during updating of the logical volume 500 of the storage device A 100.

First of all, the management software A 800 gives instructions for deferment of processing of write requests to all of the storage devices A 100 (step 1600). On receipt of these instructions, the write data reception section A 210 defers processing of write requests (step 1601) and reports to the management software A 800 the fact that deferment has been commenced (step 1602). After the management software A 800 has confirmed that commencement of deferment has been reported from all of the storage devices A 100 that have been so instructed, processing advances to the following processing (step 1603 and step 1604).

Figure 16:
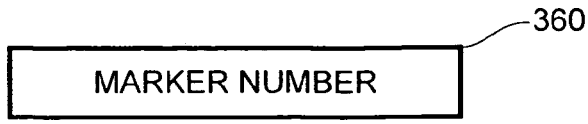
FIG. 16 is a view showing an example of marker number information.

Next, the management software 800 instructs all of the storage devices A 100 to create markers (step 1605). This instruction includes a marker number as a parameter. The marker number will be described subsequently. On receipt of this instruction, the marker creation section A 250 records the received marker number in the marker number information 360 shown in FIG. 16 stored in the control memory 300 (step 1606) and creates (step 1607) special write data (hereinbelow called a marker) for information transmission in respect of all of the logical volume groups. A marker is write data in which a marker attribute is set in the write data management information 300.

Figure 17:
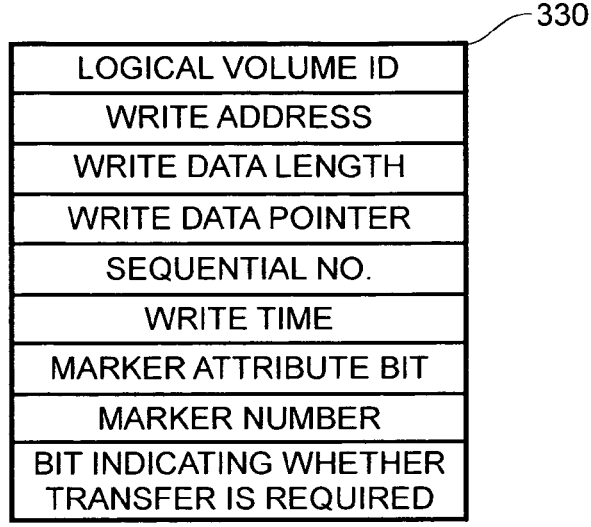
FIG. 17 is a view showing another example of write data management information.

FIG. 17 is a view showing an example of write data management information 330 of write data in this embodiment; a marker attribute bit and marker number are added to the write data management information 330 of embodiment 1.

The marker attribute bit is a bit indicating that the write data in question is a marker and is OFF in the case of ordinary write data but is set to ON in the case of a marker. A marker number as described above is set in the "marker number". The sequential number in the group is acquired and applied in respect of a marker in the same way as in the case of ordinary write data. Specifically, in marker creation, the marker creation section A 250 obtains a sequential number from the group management information 310 of the group in the same way as in the processing of the write data reception section A 210 and records a value obtained by adding 1 thereto in the write data management information 330 as the sequential number of the aforesaid marker, and records the new sequential number in the group management information 310. When the sequential number has been applied in this way to the marker, it is transferred to the storage device B 190 in the same way as in the case of ordinary write data, but the marker is not reflected to the logical volume 500.

The marker number is a number for identifying the instruction in response to which the marker was created; when a marker creation instruction is issued by the management software A 800, for example the initial value thereof is 0 and the marker number is incremented by 1 before being issued. The management software A 800 may confirm the current marker number by reading the marker number recorded in the marker number information 360.

Returning to FIG. 15, after the marker creation section A 250 has created a marker in respect of all of the logical volume groups, the marker creation section A 250 reports completion of marker creation to the management software A 800 (step 1608). After confirming that completion of marker creation has been reported from all of the designated storage devices A 100, the management software A 800 proceeds to the subsequent processing (step 1609, step 1610).

The management software A 800 gives instructions (step 1611) for cancellation of deferment of processing of write requests to all of the storage devices A 100. On receipt of these instructions, the write data reception section A 210 cancels deferment of processing of write requests (step 1612) and reports to the management software A 800 (step 1613) the fact that such deferment has been cancelled.

Figure 18:
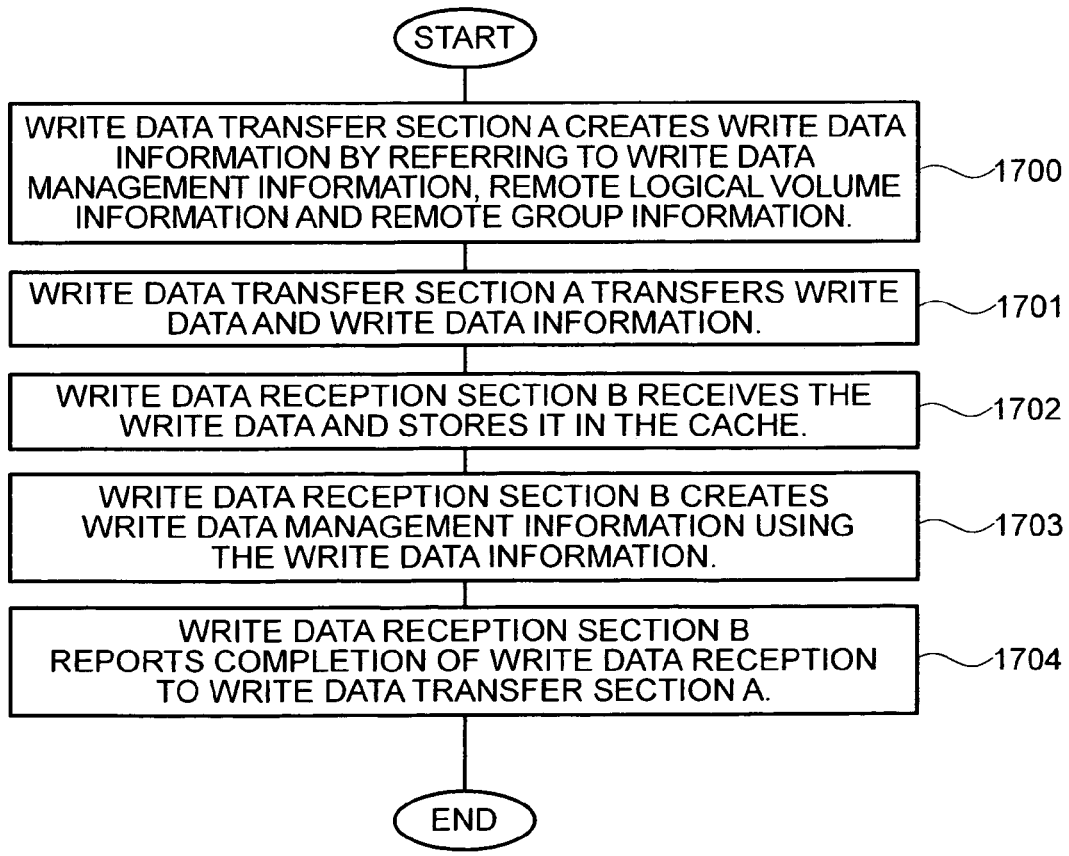
FIG. 18 is a flow diagram showing an example of transfer processing of write data from the storage device A in embodiment 3 to the storage device B.

FIG. 18 is a view showing an example of transfer processing of write data to a storage device B 190 from a storage device A 100. This processing is substantially the same as the transfer processing described in FIG. 6 of embodiment 1, but differs in that no updating of the arrived write time information 350 is performed by the write data reception section B 211. It should be noted that the write data management information 330 of the storage device B 190 is the same as the write data management information shown in FIG. 17, described above; in step 1703, the presence or absence of the marker attribute of the write data and/or the marker number recorded in the write data management information 330.

Figure 19:
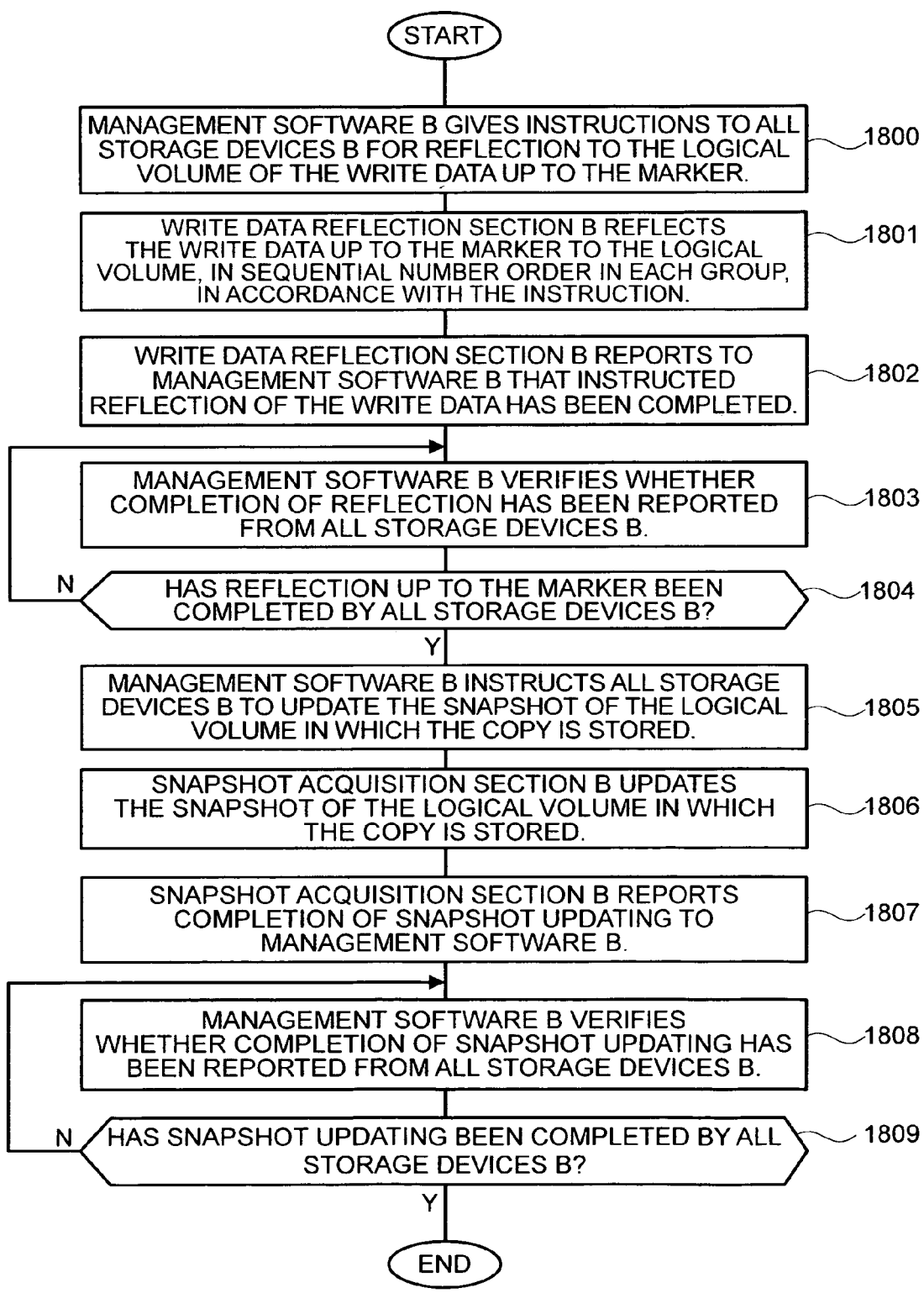
FIG. 19 is a flow diagram showing an example of reflection processing of write data in the storage device B in embodiment 3.

FIG. 19 is a view showing an example of the processing of reflection (storage) of write data to a logical volume in the storage device B 190. First of all, the management software B 890 gives instructions for reflection of the write data, as far as the marker, to the logical volume 500 in which a copy is stored (step 1800) to all of the storage devices B 190. After receiving such an instruction, the write data reflection section B 240 refers to the write data information 330 and group management information 310 and reflects (step 1801) the write data as far as the marker, in the sequential number order in each group, to the logical volume 500 in which the copy is stored. Specifically, the write data reflection section B 240 continues to store the write data in the logical volume in the order of the sequential numbers, but stops data storage processing on finding write data with the marker attribute (i.e. a marker) and then reports completion of reflection to the management software B 890 (step 1802). In the aforementioned processing, the write data reflection section B 240 checks the marker numbers of the markers that are recorded in the write data management information 330 and thereby ascertains whether the marker number is correct (whether the marker conforms to rules which are the same as the marker number decision rules, described above, for example of being a number whose initial value is 0 and that is incremented by 1 with respect to the previous marker number). If the marker number is not correct, the write data reflection section B 240 reports an abnormal situation to the management software B 890; if the marker number is correct, the write data reflection section B 240 records the marker number in the marker number information 360 and reports a normal situation. The management software B 890 may confirm the current marker number by reading the marker number that is recorded in the marker number information 360.

After confirming that a "normal reflection completed" report has been obtained from all of the storage devices B 190 that had been designated, the management software B 890 proceeds to the next processing (step 1803, step 1804).

Next, the management software B 890 gives instructions (step 1805) for updating of the snapshot of the logical volume 500 that stores the copy to all of the storage devices B 190. After receiving this instruction, the snapshot acquisition section B 260 updates (step 1806) the snapshot of the content of the logical volume 500. As the method of acquiring such a snapshot, for example the technique disclosed in U.S. Pat. No. 6,658,434 may be employed. It should be noted that, in this embodiment, just as in the case of the method described in embodiment 1, reflection of the write data to the volume that stores the snapshot data is stopped at the time of acquisition of the snapshot, and the content of the volume that stores the snapshot is frozen. After updating the snapshot, the snapshot acquisition section B 260 reports completion of snapshot updating to the management software B 890 (step 1807). After confirming that a report of completion of snapshot updating has been obtained from all of the storage devices B 190 that were designated, the management software B 890 proceeds to the next processing (step 1808, step 1809).

The management software A 800 and the management software B 890 respectively repeat the processing of the aforesaid step 1600 to step 1613 and of step 1800 to step 1809. In this way, the updating of the storage device A 100 to the logical volume 500 is constantly reflected to the logical volume 500 of the storage device B 190.

By processing as described above, the data updating by the MFA 600 and the open system host A 700 is stopped and a marker is created with the timing (checkpoint) at which the updating condition is unified between the plurality of storage devices; reflection (i.e. storage) of the updated data to the stored copy data in the plurality of target logical volumes provided in the plurality of target storage devices B 190 can be synchronized at the time immediately preceding the writing of the marker, so mutual consistency between the various copies can be obtained with the data of the mainframe host and the data of the open system host at the time of this marker. In addition, the MFB 690 or open system host B 790 can continue business using the matched data stored in the snapshot volume, since a copy having mutual consistency is held in the snapshot volume, this snapshot being acquired by reflection of the updated data to the copy data at a time that is synchronized between the plurality of copy data.

Figure 20:
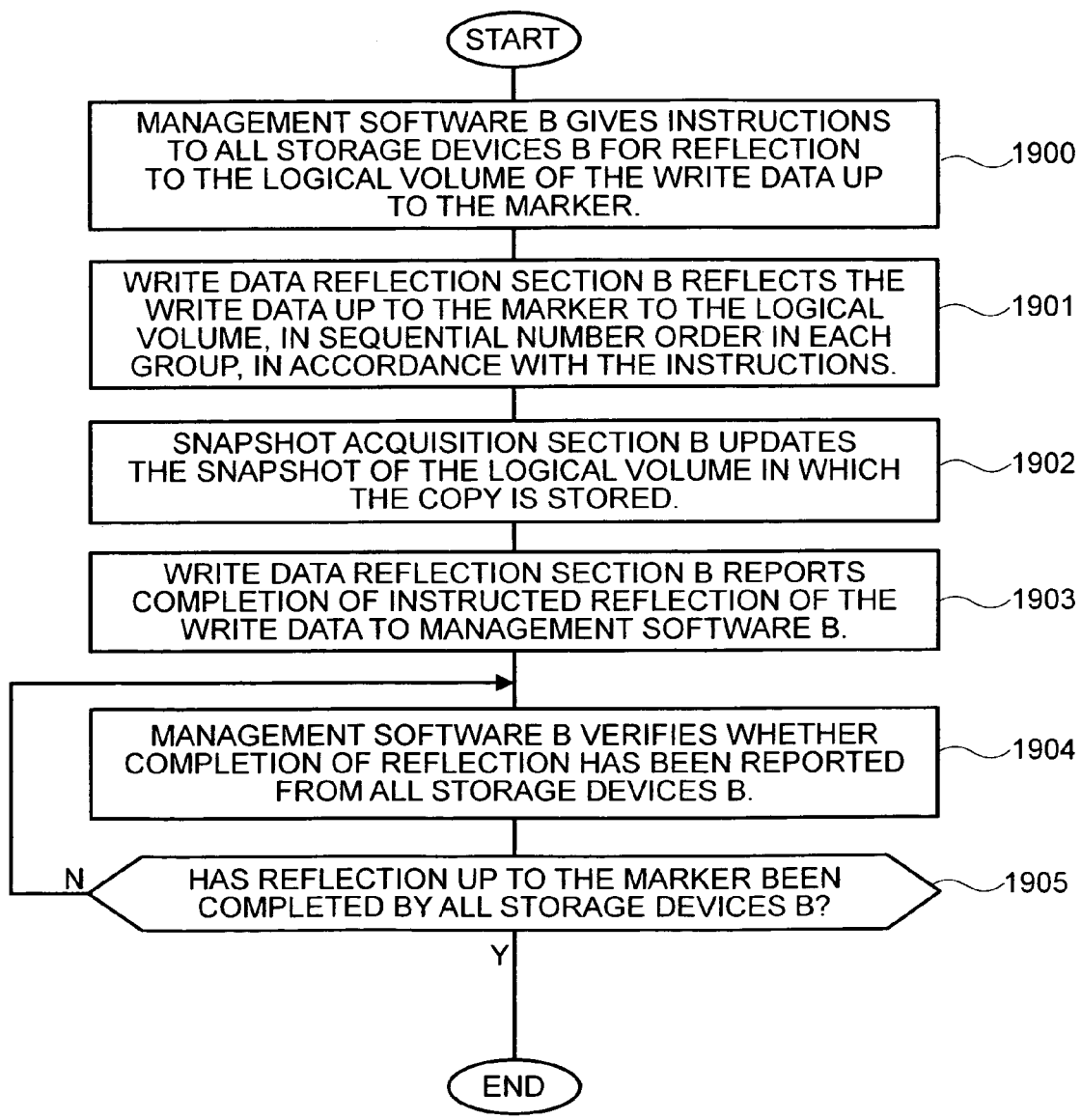
FIG. 20 is a flow diagram showing another example of reflection processing of write data in the storage device B in embodiment 3.

In the above processing, the snapshot was assumed to be updated by the storage device B 190 in response to an instruction from the management software B 890, but it would be possible to update the snapshot with the timing of synchronization of reflection of the updated data between the copy data of a plurality of storage devices B 190. FIG. 20 shows an example of the reflection processing of write data to the copy in the storage devices B 190 in this case.

The management software B 890 gives instructions (step 1900) for reflection of the write data as far as the marker to the logical volume of 500 that stores the copy in all of the storage devices B 190. After receiving such an instruction, the write data reflection section B 240 reflects the write data in the same way as in the processing described with reference to FIG. 19 but stops the reflection as soon as it finds a marker and notifies the snapshot acquisition section B 260 (step 1901). After receiving such notification, the snapshot acquisition section B 260 updates the snapshot of the content of the logical volume 500 and notifies the write data reflection section B 240 (step 1902). After receiving this notification, the write data reflection section B 240 reports completion of reflection to the management software B 890 (step 1903). The management software B 890 confirms that a report of completion of snapshot updating has been obtained from all of the storage devices B 190 that were designated and then proceeds to the next processing (step 1904, step 1905).

Also, in the aforesaid processing, it was assumed that the storage device A 100 or storage device B 190 reported completion of processing in respect of the various types of instructions from the management software A 800 or management software B 890. However, it would also be possible for completion of the various types of processes by the storage device A 100 or storage device B 190 to be detected by the management software A 800 or management software B 890 by the management software A 800 or management software B 890 periodically making inquiries of the storage device A 100 or storage device B 190 regarding their processing condition in respect of the aforesaid instructions.

Also, in the above processing, transfer processing of write data from the storage device A 100 to the storage device B 190 is performed continuously, but it would be possible for the storage device A 100 to create a marker and to then stop transfer of write data and, in addition, for the storage device B 190, after detecting reflection processing of the received marker (after reflection of the write data previous to the marker) to stop reflection of the write data i.e. to put the processing by the storage device A 100 and storage device B 190 in a stopped condition (also called a suspended condition). However, the storage device B 190 could perform write data reflection up to the detection of the marker without reference to instructions from the management software B 890. In this case, the marker creation instruction is equivalent to an instruction to shift to the suspended condition and mutually matched copies are created in the logical volume 500 of the storage device B 190 at the time where all of the storage devices B 190 have shifted to the suspended condition. When restarting the copy processing, the copy processing is recommenced by the storage device A 100 and storage device B 190 in response to an instruction for recommencement of copy processing from the management software A 800 or management software B 890 after acquisition of the snapshot of the logical volume 500. As a result, copies having mutual consistency can be held in data stored by the snapshots, so MFB 690 or open system host B 790 can continue business using the matched data.

Also, in the processing described above, the various types of instructions, reports and exchange of information between the management software A 800 or management software B 890 and storage device A 100 and storage device B 190 may be executed by way of an I/O path 900 or could be executed by way of a network 920. In the case where instructions for marker creation are given in the form of a write request to the storage device A 100, a logical volume 500 that is not subject to the processing deferment of write instructions is provided at the storage device A 100 and the marker creation instructions are given in respect of this logical volume 500.

In the above processing, the storage device A 100 and storage device B 190 need not be connected in one-to-one relationship and it is not necessary that there should be the same number of devices, so long as the respective logical volumes 500 and logical volume groups correspond as source and copy.

Also, in the above construction, it was assumed that the management software A 800 was present in the MFA 600 and the management software B 890 was present in the MFB 690; however, it would be possible for the management software A 800 and management software B 890 to be present in any of the MFA 600, MFB 690, open system host A 700, open system host B 790, storage device A 100 or storage device B 190. Also, they could be present in another computer, not shown, connected with the storage device A 100 or storage device B 190.

In the above processing, it was assumed that the write data reflection section B 240 determined the correct marker number, but it would also be possible for the correct marker number to be designated to the storage device B 190 as a parameter of the reflection instructions by the management software B. Also, it could be arranged that when the management software A 800 gives instructions for deferment of processing of write requests and marker creation to the storage device A 100, a unique marker number is determined and designated to the storage device A 100 and communicated to the management software A 890 and that this management software B 890 then designates this marker number to the storage device B 190.

In the above processing, the occasion at which the management software A 800 instructions for deferment of processing of write requests and marker creation to the storage device A 100 may be determined in a manner linked with the processing of the APP 620 or APP 720. For example, synchronization of reflection to the copy may be performed at the checkpoint by giving instructions for deferment of write request processing and marker creation on the occasion of creation of a DBMS checkpoint. Business can therefore be continued by the MFB 690 or open system host B 790 using the data of this condition, by obtaining a snapshot in the condition in which the stored content of the source logical volume 500 at the checkpoint has been reflected to the copy in the target logical volume.

It could also be arranged for the MFA 600 or open system host A 700 to defer issue of a write request to the storage device A 100 or to restart, by linking the OS 610 or OS 710 with the management software A 800, instead of the management software A 800 giving instructions for deferment of processing of write requests and canceling of deferment in respect of the storage device A 100.

Also, as described in embodiment 1, a logical volume for write data storage that is separate from the cache 400 could be prepared and the write data stored in this logical volume 500 for write data storage. Also, in the transfer processing of write data, it would be possible for a write data transfer request to be initially issued in respect of the write data transfer section 220 by the write data reception section B 211 and for the write data to be transferred in respect of the write data reception section B 211 by the write data transfer section A 220 after receiving this request.

The processing described in this embodiment could also be implemented even if the write request does not contain a write time.

Embodiment 4

Figure 21:
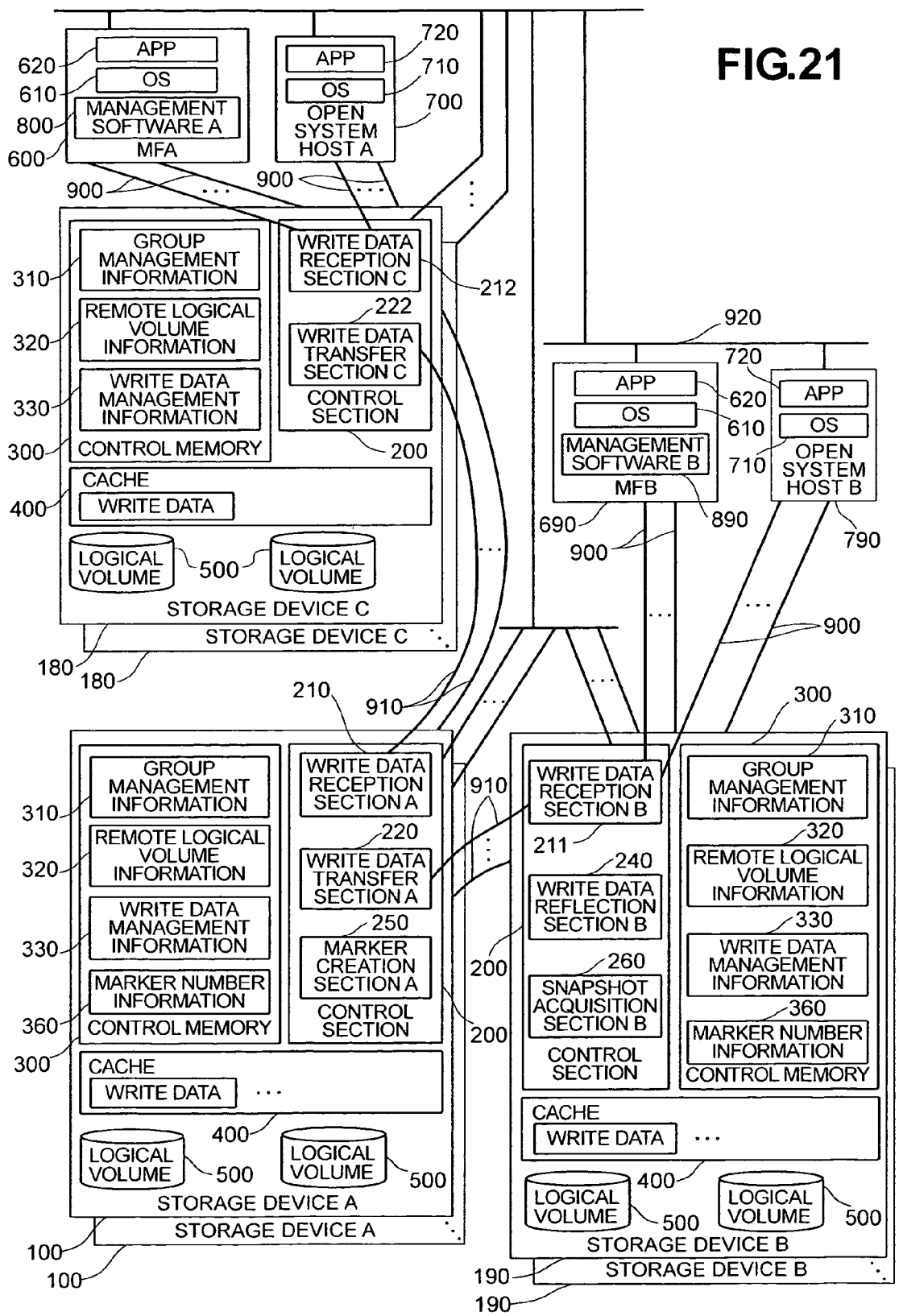
FIG. 21 is a view showing an example of the layout of a computer system according to embodiment 4.

FIG. 21 is a view showing an example of the layout of a computer system in embodiment 4.

The difference with respect to Embodiment 3 lies in that the MFA 600 and the open system host A 700 are respectively connected with a plurality of storage devices C 180 by way of an I/O path 900 and the plurality of storage devices C 180 are connected with a plurality of storage devices A 100 by way of a transfer path 910. In addition, the plurality of storage devices C 180 are connected with another computer or device by means of a network 920. The storage device A 100 and the storage device B 190 of embodiment 4 have the same construction and function as the storage device A 100 and storage device B 190 in embodiment 3.

In this embodiment, just as in the case of embodiment 2, a copy of the data stored in the logical volume 500 of the storage device C 180 is stored in the logical volume 500 of the storage device A 100. Specifically, the storage device C 180 comprises the same construction and various types of information as in embodiment 2 and after receiving a write request to the logical volume 500 from the MFA 600 or open system host A 700, the storage device C 180 stores the write data that it has received and transfers this received write data to the write data reception section A 210 of the storage device A 100; however, it is then guaranteed that a copy of the write data 640 or write data 740 that was written by the storage device C 180 exists in the storage device A 100, by sending a write completion notification to the MFA 600 or open system host A 700 after waiting for a notification of completion of reception from the write data reception section A 210, in the same way as in embodiment 2.

In addition, the storage device A stores a copy of the data stored in the logical volume 500 of the storage device C in a logical volume 500 of the storage device B 190 by the same processing as the processing described in embodiment 3. By processing as described above, as described in embodiment 2, even if for example some fault occurs in the storage device C 180 or in the transfer path 910, causing transfer of data to the storage device A 100 to become impossible, the expected content that was recognized as having been stored in the storage device C 180 when processing of the MFA 600 or open system host A 700 was interrupted can still be obtained from the storage device B 190, so the MFB 690 or open system host B 790 can continue business using this data.

In the above processing, the management software A 800 gives instructions for deferment of processing of write requests or marker creation or cancellation of deferment of processing of write requests in respect of all of the storage devices C 180 in the same way as in the case of the processing performed in respect of the storage device A 100 in embodiment 3. Just as in the case of step 1600 of embodiment 3, the management software A 800 first of all gives instructions for deferment of processing of write requests to all of the storage devices C 180. After receiving these instructions, the write data reception section C 212 of the storage device C 180 defers processing of write requests in the same way as in the case of the processing performed by the storage device A 100 in step 1601 and step 1602 of embodiment 3 and reports commencement of deferment to the management software A 800. As described above, at this time, write data in respect of which a write completion notification has been given in respect of the MFA 600 or open system host A 700 has already been transferred to the storage device A 100 and the storage device A 100 creates write data management information 300 of this write data. In the same way as in the case of step 1603 and step 1604 of embodiment 3, the management software A 800 confirms that a report of commencement of deferment has been obtained from all of the designated storage devices C 180 before proceeding to the following processing.

Next, the management software A 800 gives instructions for marker creation to all of the storage devices C 180 in the same way as in the step 1605 of embodiment 3. After receiving such an instruction, the storage device C 180 transmits a marker creation instruction through the path 910 or network 920 to the storage device A 100 that stores the copy. After receiving the marker creation instruction, the storage device A 100 creates a marker in the same way as in step 1606, step 1607 and step 1608 of embodiment 3 and reports completion of marker creation to the storage device C 180 through the transfer path 910 or network 920. After receiving the report, the storage device C 180 reports completion of marker creation to the management software A 800. The management software A 800 confirms that a report of completion of marker creation has been received from all of the designated storage devices C 180 in the same way as in step 1609 and step 1610 of embodiment 3 before proceeding to the next processing.

Next, the management software A 800, in the same way as in step 1611 of embodiment 3, gives instructions for cancellation of deferment of processing of write requests to all of the storage devices C 180. After receiving these instructions, the write data reception section C 212 of the storage device C 180 cancels the write request processing deferment in the same way as the processing that was performed by the storage device A 100 in step 1612 and step 1613 of embodiment 3 and reports this cancellation of deferment to the management software A 800.

Specifically, deferment of processing of write requests and cancellation of deferment are performed by the storage device C 180 and marker creation meanwhile is performed by the storage device A 100 on transmission to the storage device A 100 of an instruction by the storage device C 180. As described above, write data in respect of which completion of writing has been notified to the MFA 600 or open system host A 700 has already been transferred to the storage device A 100 and write data management information 300 of such write data is created in the storage device A 100, so deferment of processing of write requests by the storage device A 100 in embodiment 3 and deferment of processing of write requests by the storage device C 180 in this embodiment are equivalent. Consequently, by performing processing as described above and by performing other processing as described in embodiment 3, in the construction of this embodiment, reflection of updating to the copies can be synchronized at the marker time by stopping data updating by the MFA 600 and open system host A 700 in the same way as in embodiment 3 and creating a marker of the updated condition with unified timing (checkpoint) between the plurality of storage devices; mutual consistency of the respective copies with the mainframe host data and the open system host data can thus be achieved at this time. Furthermore, mutually matched copies are maintained in snapshot volumes by acquiring snapshots at the time of synchronization of reflection and the MFB 690 or open system host B 790 can therefore continue business using matched data.

In the above processing, it was assumed that the management software A 800 gave instructions for marker creation to the storage devices C 180 and the storage devices C 180 transmitted these instructions to the storage devices A 100; however, it would also be possible for the management software A 800 to give instructions for marker creation directly to all of the storage devices A 100 and for the storage devices A 100 to report completion of marker creation to the management software 800. Specifically, the management software A 800 first of all gives instructions for deferment of write request processing to all of the storage devices C 180 and the management software A 800 confirms that reports of commencement of deferment have been received from all of the designated storage devices C 180 before giving instructions for marker creation to all of the storage devices A 180 in the same way as in step 1605 of embodiment 3. After having received these instructions, the storage device A 100 creates a marker in the same way as in step 1606, step 1607 and step 1608 of embodiment 3 and reports completion of marker creation to the management software 800. After confirming that reports of completion of marker creation have been obtained from all of the designated storage devices A 100 in the same way as in step 1609 and step 1610 of embodiment 3, the management software A 800 may be arranged to give instructions for the cancellation of deferment of write request processing to all of the storage devices C 180.

Also, it would be possible that the storage devices C 180 are provided with a marker creation section and marker number information 330 and create a marker on receipt of instructions for marker creation from the management software A 800; the marker, which has been created as write data, is then transferred to the storage device A 100 and completion of marker creation may be arranged to be reported to the management software A 800 when a report of receipt thereof has been received from the write data reception section 210 of the storage device A 100. In this case, the storage device A 100 treats the received marker as a special type of write data, which is transferred to the storage device B 190 after processing in the same way as ordinary write data except that reflection to the copy is not performed.

In any case, the above can be implemented irrespective of the number of storage devices C 180 that are connected with the storage devices A 100 and deposit copies on the storage devices A 100.

Also, although not shown, if a mainframe host and open system host are connected with the storage devices A 100 by an I/O path, if for example some fault occurs in the MFA 600 or open system host A 700 or storage devices C 180, the aforesaid mainframe host and open system host can continue business using the content of the logical volume 500 of the storage device A 100 that is matched therewith.

Embodiment 5

Figure 22:
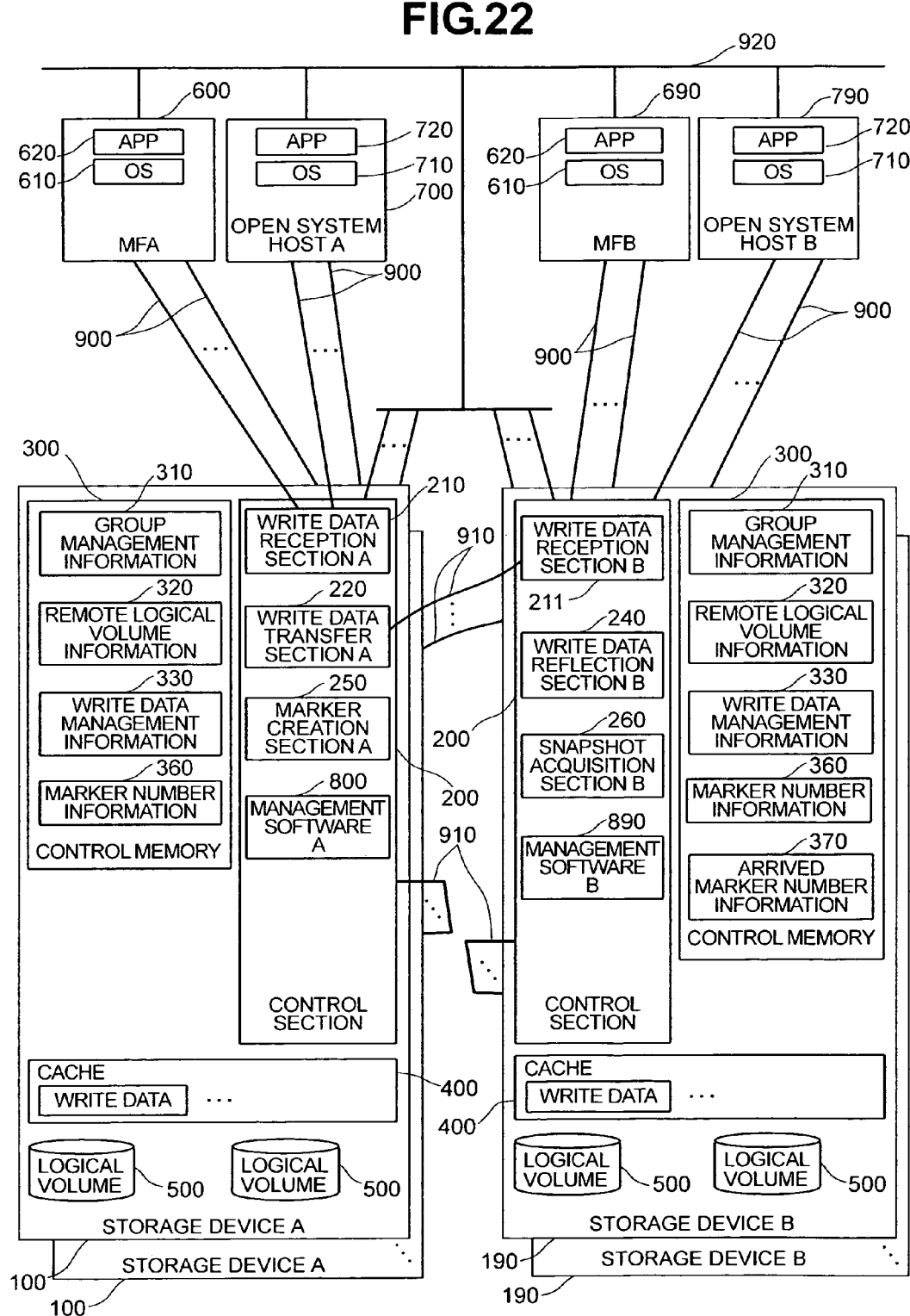
FIG. 22 is a view showing an example of the layout of a computer system according to embodiment 5.

FIG. 22 is a view showing an example of the layout in embodiment 5 of a computer system to which the present invention has been applied.

The differences from embodiment 3 are that the management software A 800 is stored on a single storage device A 100, the management software B 890 is stored on a single storage device B 190, the storage devices A 100 are connected by means of a transfer bus 910 and the storage devices B 190 are also connected by the transfer bus 910. Also, each storage device B 190 is provided with arrived marker number information 370, to be described, in a control memory 300. The arrived marker number information 370 is stored for each group. Other differences will be described below.

The processing in respect of writing to each logical volume 500, transfer to the storage device B 190 and reflection processing in the storage device B 190 will now be described in respect of the logical volume 500 that is employed by the MFA 600 and open system host A 700. Regarded consistency between the various copies, these processes ensure that consistency can always be maintained between the data of the mainframe host and the data of an open system host. In this embodiment, processing to ensure consistency between the various copies can be implemented by processing involving only processing of the storage device A 100 and storage device B 190, by controlling the storage device A 100 and storage device B 190 using the transfer bus 910 described above.

In this embodiment, the processing when the storage device A 100 receives a write request from the MFA 600 or open system host A 700 in respect of the logical volume 500 (source logical volume 500) whereof a copy is to be created is the same as the processing described in embodiment 3 and the storage device A 100 performs processing as described in FIG. 14 of embodiment 3. The various items of management information in this embodiment are the same as described in embodiment 3 with the exception of the arrived marker number information 370.

Figure 23:
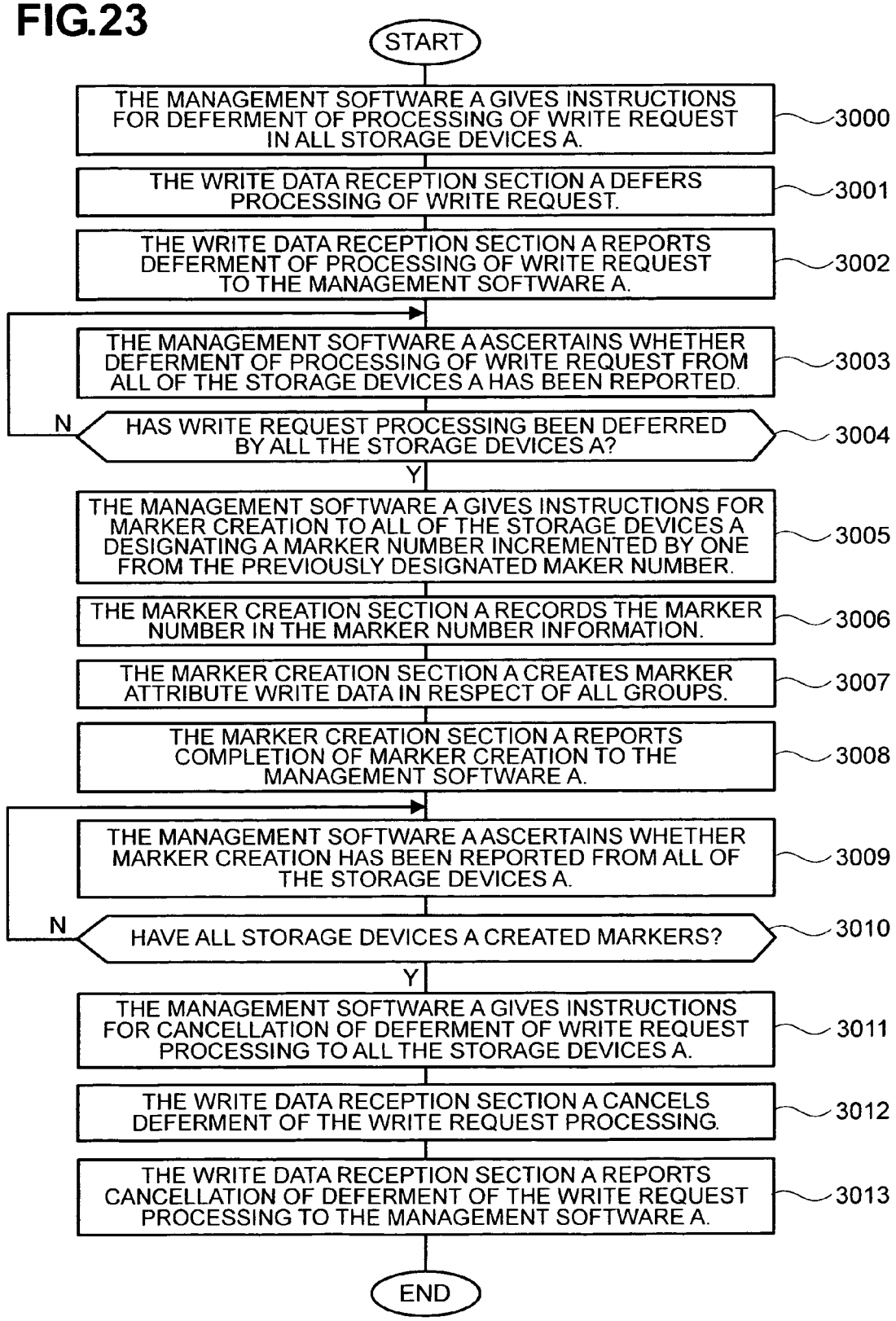
FIG. 23 is a flow diagram showing an example of deferment of processing of a write request in respect of a storage device A by the management software A in embodiment 5 and processing when instructions are given for marker creation.

FIG. 23 is a view showing the processing when the management software A 800 that is stored in the storage device A 100 gives instructions for deferment of processing of the write requests in respect of the storage devices A 100 and marker creation. This is practically the same as the processing described in FIG. 15 of embodiment 3. However, unlike the embodiment 3, in this embodiment, as described above, the management software A 800 is stored in a particular storage device A 100 of the plurality of storage devices A 100, so negotiation between the management software A 800 and the storage device A 100 takes place between the management software A 800 and a write data reception section or marker creation section within the storage device A 100 where the management software A 800 is stored or takes place between the management software A 800 and the write data reception section or marker creation section in a storage device A 100 other than the storage device A 100 where the management software A 800 is stored. Furthermore, in this embodiment, the rule that is used for determining the marker number is that the marker number designated in step 3005 is incremented by one with respect to the marker number on the previous occasion (i.e. the marker numbers are incremented by one in each case).

Figure 24:
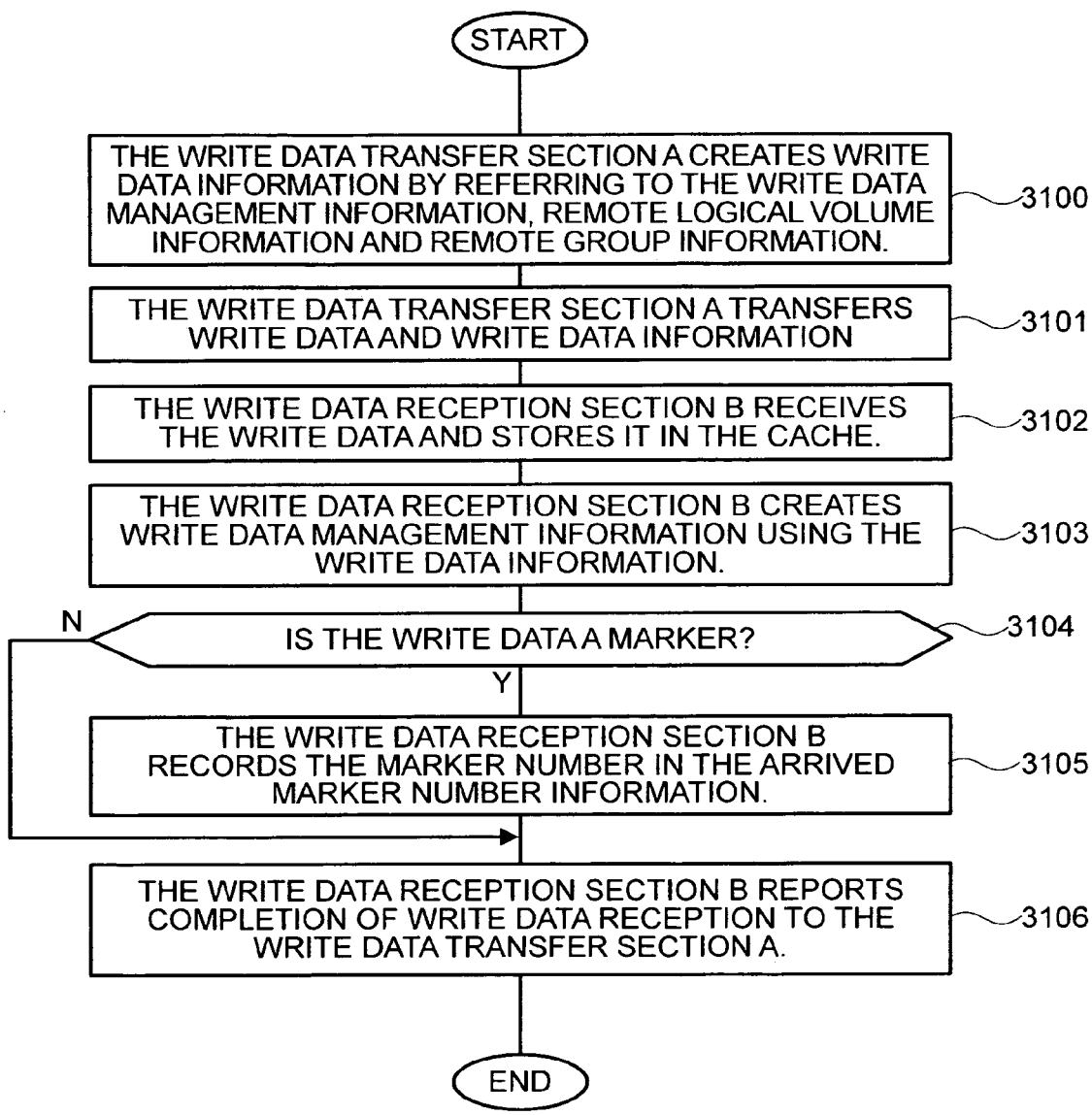
FIG. 24 is a flow diagram showing an example of transfer processing of write data from a storage device A in embodiment 5 to a storage device B.
Figure 25:
FIG. 25 is a view showing an example of arrived marker number information.

FIG. 24 is a view showing the transfer processing of the write data from the storage device A 100 to the storage device B 190. The processing is substantially the same as the processing described in FIG. 18 of embodiment 3, but differs in that, prior to reporting completion of write data reception in the write data transfer section A 220 in step 3106, in step 3104 the write data reception section B 211 ascertains whether the write data received by the write data reception section B 211 is a marker; if the write data is a marker, in step 3105, the write data reception section B 211 records the marker number of this marker in the arrived marker number information 370 shown in FIG. 25. The arrived marker number information 370 is created for each group and the management software B 890 can thus acquire the arrived marker number of each group by reading the marker number that is recorded in the arrived marker number information 370 of each group.

Figure 26:
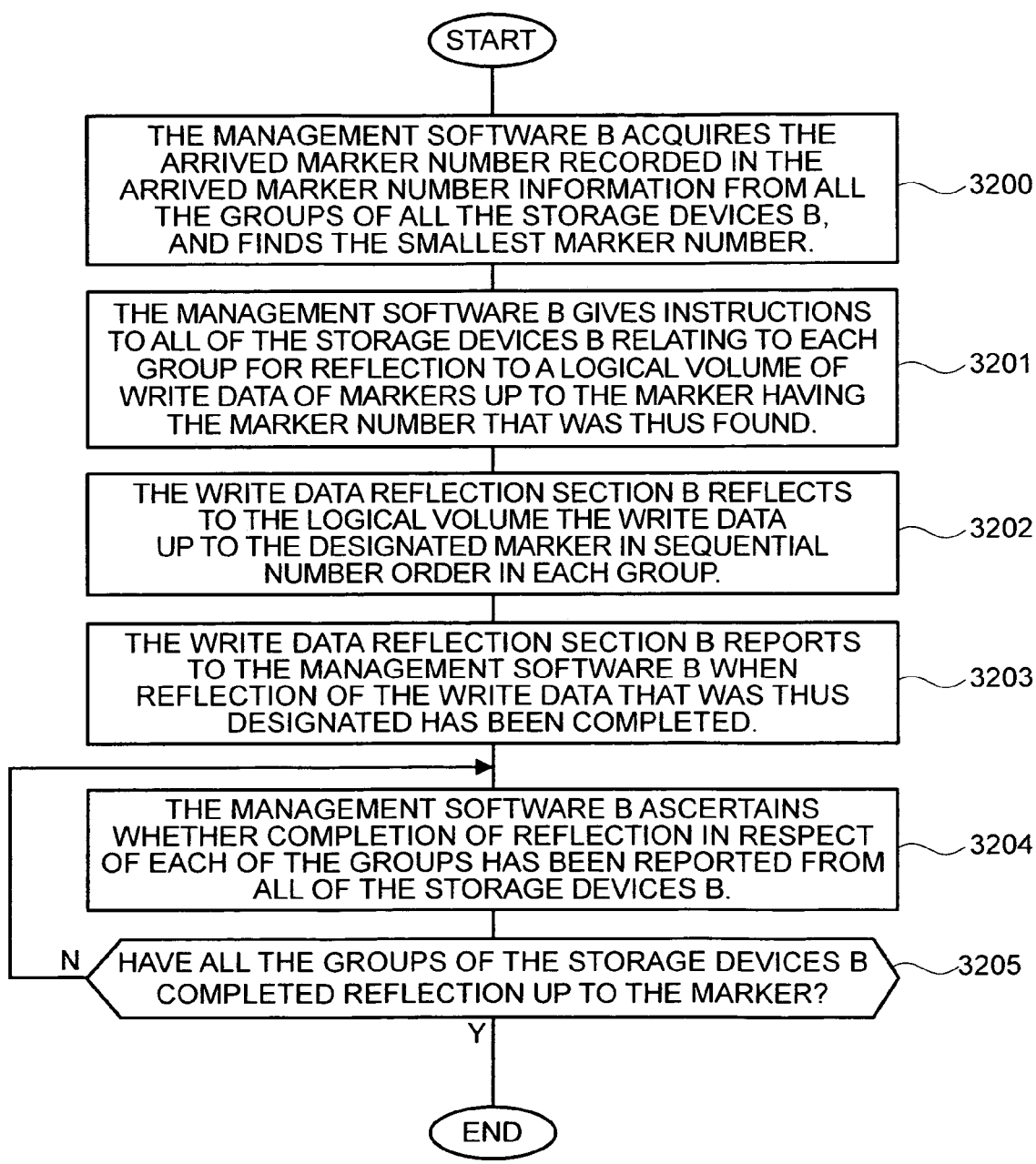
FIG. 26 is a flow diagram showing an example of reflection processing of write data to a copy in a storage device B in embodiment 5.

FIG. 26 is a view showing the reflection processing of the write data to a copy in the storage device B 190. The management software B 890 that is stored in the storage device B 190 acquires the marker numbers that are stored in the arrived marker number information 370 from all the groups of all of the storage devices B 190 and finds the smallest marker number of the marker numbers that have thus been acquired (step 3200). Next, the management software B 890 gives instructions to all of the storage devices B 190 relating to each group for reflection (step 3201) to the logical volume 500 of write data having all of the marker numbers up to the marker number that has thus been found. The write data reflection section B 240 that has received this instruction, by referring to the write data information 330 and group management information 310, reflects the write data to the logical volume 500 in which the copy is stored, in sequential number order in each group, up to the designated marker (step 3202). When, during processing of the write data in respect of each group in sequential number order, the write data reflection section B 240 finds the marker designated for each group, it stops the reflection and reports completion of reflection to the management software B 890 (step 3203). Since the smallest marker number was found in step 3200, the marker of this marker number must have arrived at each group of the storage devices B 190, so reflection of write data up to the designated marker must be possible. The write data reflection section B 240 records the marker number of the reflected marker in the marker number information 360 and the management software B 890 can thereby read and confirm the marker numbers recorded in the marker number information 360. After confirming that normal completion of reflection has been reported from all of the designated storage devices B 190 in respect of each group, the management software B 890 advances to the next processing (step 3204, step 3205).

The management software A 800 and management software B 890 respectively repeat the processing described above. In this way, updating to the logical volumes 500 of the storage devices A 100 is constantly reflected to the logical volumes 500 of the storage devices B 190.

In the reflection processing described above, consistency between the various copies is ensured and maintained without using snapshots, so a storage region for snapshots i.e. a logical volume 500 (auxiliary volume) for snapshots is unnecessary. On the other hand, even in a construction in which management software A 800 and management software B 890 as described above are created in the storage device A 100 and storage device B 190, processing such as the reflection processing described in embodiment 3 to ensure consistency using snapshots is still possible.

Regarding consistency between the copies created by the plurality of storage devices A 100 and plurality of storage devices B 190, consistency between the data of a mainframe host and the data of an open system host can always be maintained by means of the above processing. Furthermore, since processing for ensuring consistency between the copies is controlled by the storage devices A 100 and storage devices B 190, ensuring consistency between the copies can be achieved by processing involving only the storage devices A 100 and storage devices B 190, without needing to use the host resources.

In the processing described above, it was assumed that the various instructions, reports and information acquisition performed between the management software A 800 or management software B 890 and the storage devices A 100 or storage devices B 190 were effected via the transfer bus 910 but it would be possible to perform these via a network 920. If an instruction for the creation of a marker is given in the form of a write request to a storage device A 100, a logical volume 500 that is not being used for deferment of write request processing is provided in the storage device A 100 and this marker creation instruction is carried out in respect of this logical volume 500.

Also, in the above processing, it is not necessary for the storage devices A 100 and storage devices B 190 to be connected in one-to-one fashion, so it is not necessary to provide the same number of devices so long as the respective logical volumes 500 and groups correspond as source and copy.

Also, as described in embodiment 1, a logical volume 500 for write data storage may be provided separately from the cache 400 and the write data stored in this logical volume 500; also, in transfer processing of the write data, the write data reception section B 211 may initially issue a transfer request of write data in respect of the write data transfer section A 220 and the write data transfer section A 220 that has received this request may then transfer write data in respect of the write data reception section B 211.

Also, as in the fourth embodiment, another storage device D, not shown, corresponding to the storage device C 180 may be connected through the transfer bus 910 with the storage device A 100, and the MFA 600 and open system host A 70 may be connected through an I/O bus 900 with this other storage device D. In this case, in the same way as the processing described in embodiment 2 or embodiment 4, a copy of the logical volume 500 of the storage device D is stored in a logical volume 500 of the storage device A 100 and, in addition, as already described in this embodiment, a copy of the logical volume 500 of the storage device A 100 is stored in the logical volume 500 of the storage device B 190. Thereby, as described in embodiment 4 or embodiment 2, even if for example a fault is generated in the storage device D or the transfer bus 910, making it impossible to transfer data to the storage device A 100, the MFB 690 or open system host B 790 can continue business using the content as anticipated immediately after interruption of processing by the MFA 600 or open system host A 700.

In relation to the above processing, a storage device A 100 may provide the following interfaces (CLI or GUI or API):

(1) An interface for starting or stopping the above processing that is performed by the management software A 800

(2) An interface for acquiring or displaying the processing condition of the management software A 800

(3) An interface for determining or designating a storage device A 100 at which running of the management software A 800 is to be conducted. The storage device A 100 may be designated by a user or administrator or a storage device A 100 with low processing load may be automatically selected, taking into account the processing load balance. Also, an interface may be provided indicating storage devices A 100 that are capable of running the management software A 800, the user or administrator may then use this interface to obtain a conspectus of the storage devices A 100 that are capable of running the management software A 800, and may then select and designate the aforesaid storage device A 100 at which the management software A 800 is to be run from among these.

(4) An interface for designating storage devices A 100 and groups that are the subjects of the aforesaid processing performed by the management software A 800. Serial numbers or identifiers of the storage devices A 100, and group numbers or identifiers thereof etc may be designated as parameters. Also, an interface may be provided indicating storage devices A 100 and groups that are capable of being the subject of the aforesaid processing performed by the management software A 800, the user or administrator may then use this interface to obtain a conspectus of the storage devices A 100 and groups that are capable of being the subject of the aforesaid processing, and may then select and designate storage devices A 100 and groups to be the subject of the aforesaid processing from among these.

(5) An interface to delete storage devices A 100 or groups from the subjects of the aforesaid processing performed by the management software A 800. Serial numbers or identifiers of the storage devices A 100, and group numbers or identifiers thereof etc may be designated as parameters. Also, an interface may be provided indicating storage devices A 100 and groups that are currently the subject of the aforesaid processing performed by the management software A 800, the user or administrator may then use this interface to obtain a conspectus of the storage devices A 100 and groups that are capable of being deleted from the subjects of the aforesaid processing, and may then select and designate storage devices A 100 and groups to be deleted from the subjects of the aforesaid processing from among these.

(6) An interface to determine or designate the repetition interval of the aforesaid processing of the management software A 800. This interval may be specified by the user or administrator or may be automatically determined taking into account processing load or may be automatically determined in accordance with the amount of write data.

(7) An interface to determine or designate the upper limiting time to wait for a report from the storage devices A 100 in the above processing performed by the management software A 800.

(8) An interface for specifying or displaying causes of malfunction in the aforesaid processing performed by the management software A 800.

(9) An interface whereby, in the event that a malfunction occurs in the aforesaid processing that is performed by the management software A 800, the range of effect of this malfunction may be selected as deemed to be the entirety of the subjects of the aforesaid processing performed by the management software A 800, or certain storage devices A 100 related to the malfunction, or certain groups, or certain logical volumes 500.

(10) An interface for acquiring or displaying created marker numbers.

Also, in relation to the above processing, a storage device B 190 may provide the following user interfaces:

(11) An interface for starting or stopping the above processing that is performed by the management software B 890

(12) An interface for acquiring or displaying the processing condition of the management software B 890

(13) An interface for determining or designating a storage device B 190 at which running of the management software B 890 is to be conducted. The storage device B 190 may be designated by a user or administrator or a storage device B 190 with low processing load may be automatically selected, taking into account the processing load balance. Also, an interface may be provided indicating storage devices B 190 that are capable of running the management software B 890, the user or administrator may then use this interface to obtain a conspectus of the storage devices B 190 that are capable of running the management software B 890, and may then select and designate the aforesaid storage device B 190 at which the management software B 890 is to be run from among these.

(14) An interface for designating storage devices B 190 and groups that are the subjects of the aforesaid processing performed by the management software B 890. Serial numbers or identifiers of the storage devices B 190, and group numbers or identifiers thereof etc may be designated as parameters. Also, an interface may be provided indicating storage devices B 190 and groups that are capable of being the subject of the aforesaid processing performed by the management software B 890, the user or administrator may then use this interface to obtain a conspectus of the storage devices B 190 and groups that are capable of being the subject of the aforesaid processing, and may then select and designate storage devices B 190 and groups to be the subject of the aforesaid processing from among these.

(15) An interface to delete storage devices B 190 or groups from the subjects of the aforesaid processing performed by the management software B 890. Serial numbers or identifiers of the storage devices B 190, and group numbers or identifiers thereof etc may be designated as parameters. Also, an interface may be provided indicating storage devices B 190 and groups that are currently the subject of the aforesaid processing performed by the management software B 890, the user or administrator may then use this interface to obtain a conspectus of the storage devices B 190 and groups that are capable of being deleted from the subjects of the aforesaid processing, and may then select and designate storage devices B 190 and groups to be deleted from the subjects of the aforesaid processing from among these.

(16) An interface to determine or designate the repetition interval of the aforesaid processing of the management software B 890. This interval may be specified by the user or administrator or may be automatically determined taking into account processing load or may be automatically determined in accordance with the amount of write data that has arrived at the storage device B 190 but has not been reflected, or the difference between the reflected marker number and arrived marker number.

(17) An interface to determine or designate the upper limiting time to wait for a report from the storage devices B 190 in the above processing performed by the management software B 890.

(18) An interface for specifying causes of malfunction in the aforesaid processing performed by the management software B 890.

(19) An interface whereby, in the event that a malfunction occurs in the aforesaid processing that is performed by the management software B 890, the range of effect of this malfunction may be selected as deemed to be the entirety of the subjects of the aforesaid processing performed by the management software B 890, or certain storage devices B 190 related to the malfunction, or certain groups, or certain logical volumes 500.

(20) An interface for acquiring or displaying and arrived marker number and reflected marker number. Serial numbers or identifiers of the storage devices B 190, and group numbers or identifiers thereof etc may be designated as parameters.

(21) An interface for acquiring or displaying the amount of write data that has arrived but has not been reflected. Serial numbers or identifiers of the storage devices B 190, and group numbers or identifiers thereof etc may be designated as parameters.

(22) An interface for designating the size of the storage region in which write data that has arrived but has not been reflected is stored. Serial numbers or identifiers of the storage devices B 190, and group numbers or identifiers thereof etc may be designated as parameters.

The form of the above interfaces may be CLI, GUI or API. Also, regarding the method of use of the above interfaces, the terminal of a storage device A 100 or storage device B 190 may be directly employed, or the MFA 600 or MFB 690 or open system host A 700 or open system host B 790 or another computer, not shown, may be remotely employed via the network 920 or I/O bus 910 or transfer bus 920.

In the above description, it was assumed that the management software A 800 was stored in the storage device A 100 and the management software B 890 was stored in the storage device B 190. However, it would be possible for the management software A 800 to be run on the storage device B 190 or for the management software B 890 to be run on the storage device A 100, by executing various instructions, reports or information acquisition, using the transfer bus 910 or network 920. In this case also, since processing for ensuring consistency between the copies is controlled by the storage devices A 100 and storage devices B 190, ensuring consistency between the copies can be achieved by processing involving only the storage devices A 100 and storage devices B 190, without needing to use the host resources.

Embodiment 6

This embodiment of the present invention represents an improvement in the technology disclosed in Laid-open U.S. patent application Ser. No. 10/937,731 (in particular, the technology relating to embodiment 5 of this publication). Hereinbelow, for convenience, this technology will be referred to as the "basic technology".

This basic technology is technology for implementing asynchronous remote copying without interposition of a host computer between a plurality of primary storage systems and a plurality of secondary storage systems. A problem in asynchronous remote copying is the storage of consistent data in the secondary storage systems. In this basic technology, special data called "markers" are suitably inserted in the series of write data that is transferred to the plurality of secondary storage systems from the plurality of primary storage systems, so that consistent data can be stored by the secondary storage systems by using these markers as a guide.

In this basic technology, for example a temporary fault on the transfer path between the primary storage system (hereinbelow, described as a master primary storage system) that gives instructions for marker insertion and the other primary storage systems may give rise to temporary suspension of marker insertion instructions to some of the primary storage systems and as a result marker creation may be temporarily lost.

In this case, while the fault continues and instructions are suspended, "marker creation completed" messages are not received from the primary storage systems by the master primary storage system. As a result, if no counter-measures are taken, processing of write requests from the host computer becomes impossible and there is a risk that task processing by the host computer itself may be suspended.

One method of solving this is to arrange that, after a fixed time, the primary storage systems assume a condition in which write processing may be commenced even if no markers are created. However, in this case, since the write data is directly written without insertion of markers, consistency of data between the plurality of primary storage systems and the plurality of secondary storage systems is no longer maintained.

In order to prevent this, for example the method may be considered of suspending remote copying itself. However, if this is done, even though data is updated on a plurality of the primary storage systems, data is not updated at all on the plurality of secondary storage systems: this therefore cannot be described as a desirable method from the viewpoint of disaster recovery.

Accordingly, in this embodiment, an improved remote copying system is constructed whereby these problems can be eliminated. Specifically, in this embodiment, even if there is a temporary fault on the transmission path between the primary storage systems, resulting in temporary failure of marker creation on some of the primary storage systems, asynchronous remote copying can be continued with consistency maintained.

Accordingly, in this embodiment, a remote copying system is constructed as described below. An outline of this remote copying system is as follows. In the following description, of the plurality of primary storage systems, the primary storage system that issues the marker creation instruction will be termed the "master primary storage system" and the other primary storage systems that do not issue a marker creation instruction will simply be termed "primary storage systems". Also, of the plurality of secondary storage systems, one will be taken as the "master secondary storage system" and the other secondary storage systems will simply be referred to as "secondary storage systems".

Specifically, the respective secondary storage systems include a marker memory section that stores one or a plurality of markers included in the journal group received from the primary storage system. The master secondary storage system collects the plurality of items of marker information stored in the marker memory sections from all of the secondary storage systems, including itself. The master secondary storage system, based on the marker information which has thus been collected, selects the most recent marker from the markers that have been received by all of the secondary storage systems and supports data storage on all of the secondary storage systems. In this way, even if some of the markers do not arrive at some of the secondary storage systems, asynchronous remote copying with consistency maintained can be continued.

This embodiment is described in detail below with reference to the drawings.

Figure 27:
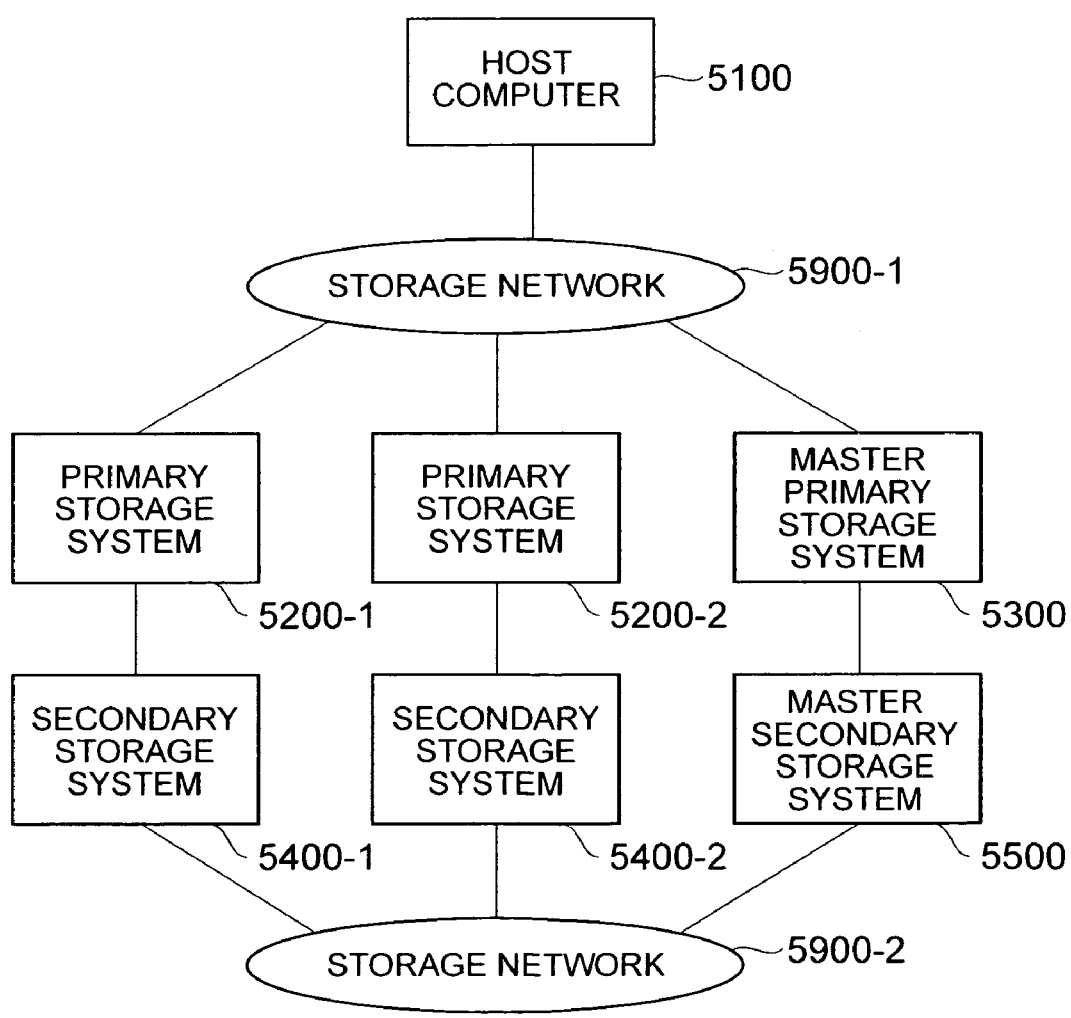
FIG. 27 is an overall layout diagram of a system according to an embodiment of the present invention.

FIG. 27 is an overall layout view of a system according to an embodiment of the present invention. It should be noted that, in the following description, similar elements are given the same reference symbols (for example 5200) and, when description is given in which these elements are distinguished, the description employs a root number and branch number (for example 5200-1, 5200-2).

One or more host computers 5100 are connected with a plurality of primary storage systems 5200 through a storage network 5900-1. Also, each of the primary storage systems 5200 is connected with a master primary storage system 5300 through the storage network 5900-1. The master primary storage system 5300 is also connected through the storage network 5900-1 with the host computers 5100; there may be a plurality thereof in the master primary storage system 5300 or primary storage system 5200, so there may be only a single primary storage system 5200.

In addition to the functions possessed by the primary storage system 5200, the master primary storage system 5300 is a storage system having a primary side master function.

The respective primary side storage systems 5200 are connected through the network with a plurality of secondary storage systems 5400. Also, the master secondary storage systems 5500 are connected through a storage network 5900-2 with the secondary storage systems 5400. There may be a plurality thereof in the master secondary storage system 5500 or secondary storage system 5400, so there may be only a single secondary storage system 5200.

The master secondary storage system 5500 is a storage system having a secondary side master function, in addition to the functions possessed by the secondary storage systems 5400.

Figure 28:
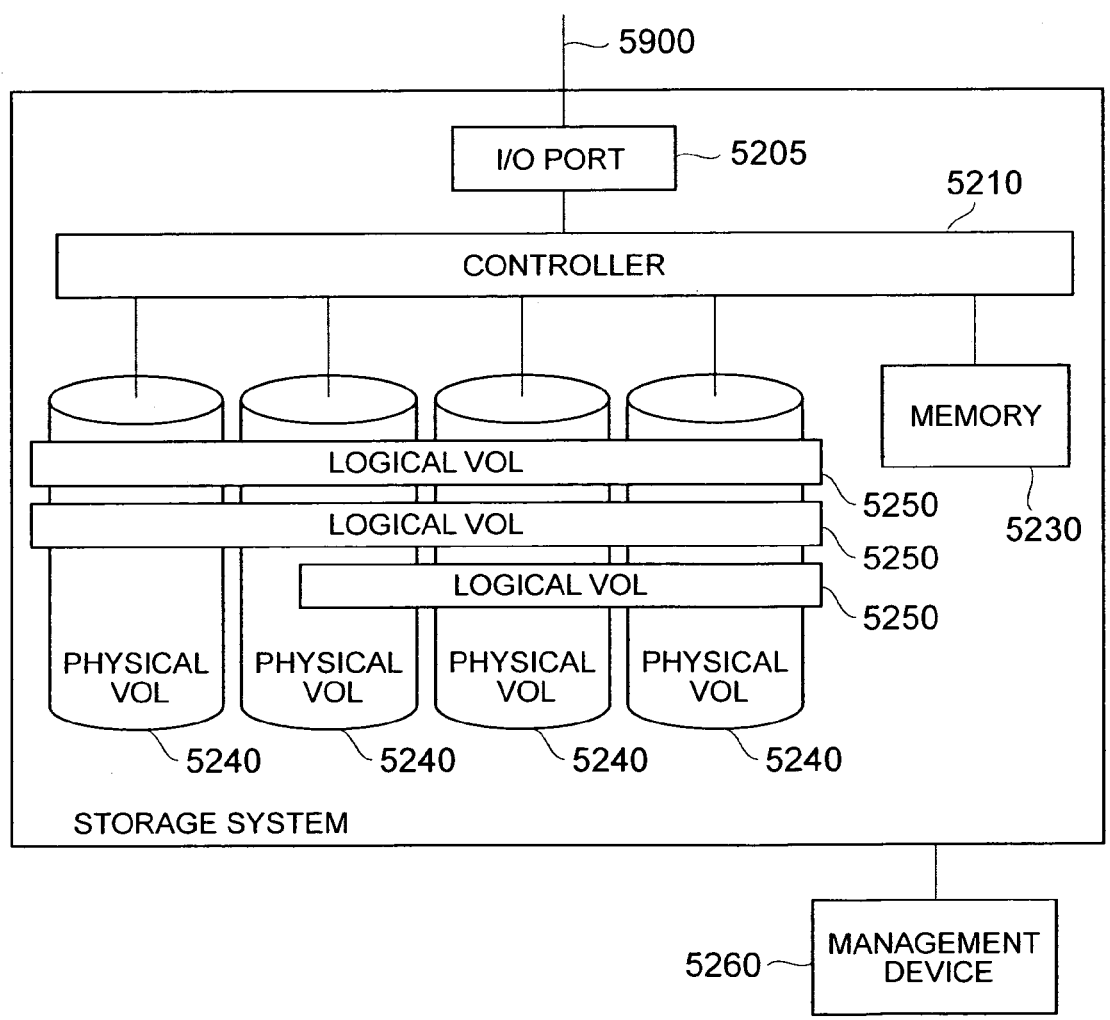
FIG. 28 is an example of a hardware layout of a storage system.

FIG. 28 shows an example of storage system hardware layout.

This hardware layout shows the hardware layout of the storage systems included in this embodiment, namely, the primary storage systems 5200, master primary storage systems 5300, secondary storage systems 5400, and master secondary storage systems 5500.

A storage system comprises: a controller 5210, memory 5230, I/O port 5205, physical volume 5240, logical volume 5250 and management device 5260. The storage system is controlled by the controller 5210. The memory 5230 is capable of storing the data used by the computer program that is executed by the controller (for example CPU) 5210 and this computer program. A partial region of the memory 5230 can be used as a cache for temporarily holding data that is read/written by the host computer 5100. Connection with the storage network 5900 is effected by the I/O port 5205 and data may thereby be exchanged with a host computer 5100. The physical volume 5240 is physical hardware for storing incoming data delivered from a host computer 5100. A non-volatile memory device such as for example a hard disk drive or flash memory device is employed as the physical volume 5240. The logical volume 5250 is the unit that is specified for reading/writing of data by an application program (not shown) that is executed on the host computer 5100. In this embodiment, a logical volume 5250 may be installed as a physical volume 5240 itself or may be installed using a plurality of physical volumes 5240, as a RAID (Redundant Array of Independent (or Inexpensive) Discs). Since the installation of such a logical volume 5250 is performed by the ordinary installation method, a detailed description thereof is not given in the present specification. The management device 5260 is a device for maintaining/managing the storage system. Also, it may have the function of giving special instructions to storage systems.

Figure 29:
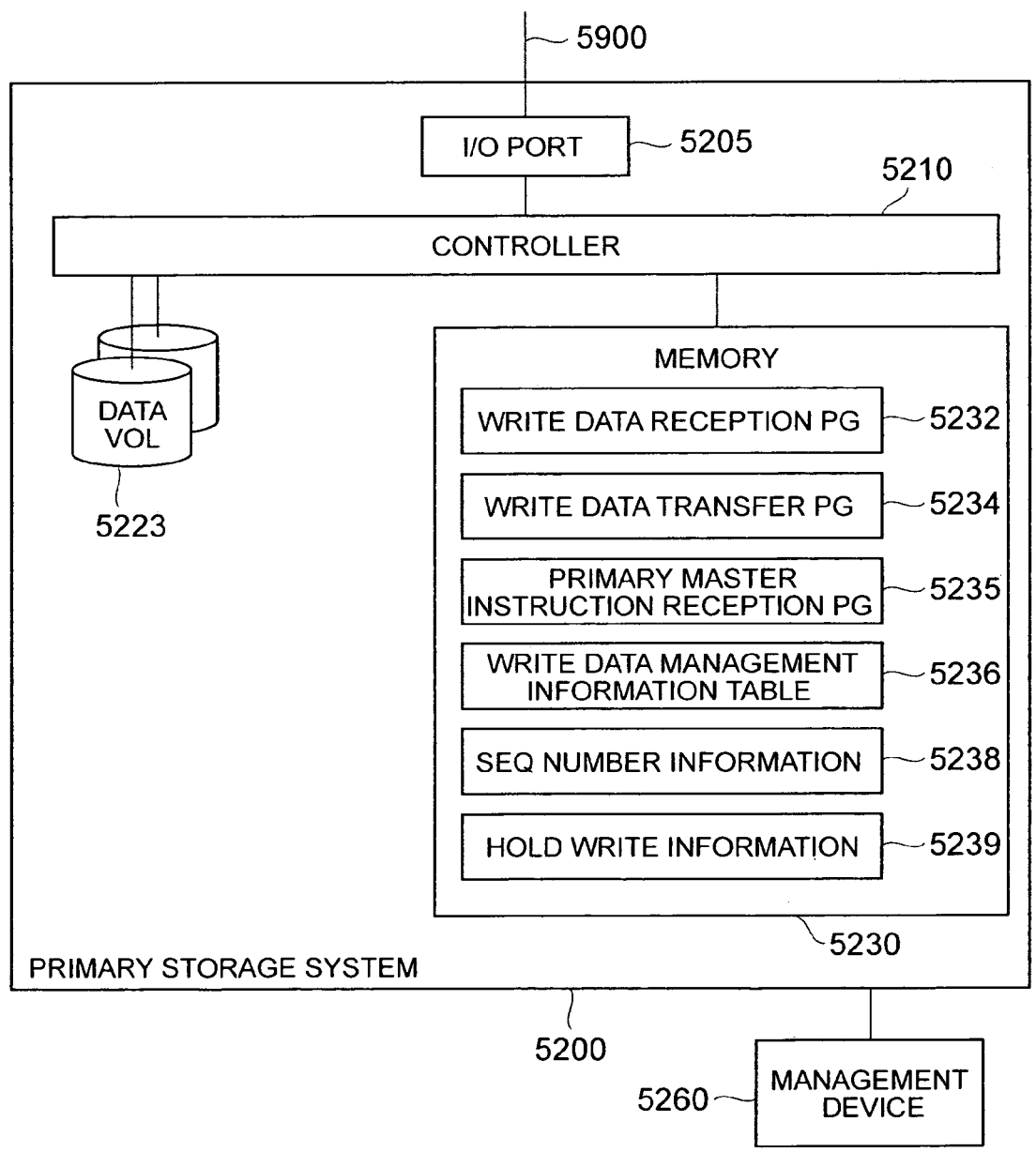
FIG. 29 shows an example of the layout of a primary storage system 5200.

FIG. 29 shows an example layout of a primary storage system 5200.

The controller 5210, memory 5230, I/O port 5205 and management device 5260 are the same as described with reference to FIG. 28.

The primary storage system 5200 comprises one or more data volumes 5223. A data volume 5223 is a logical volume 5250 that is employed for reading/writing good data by an application executed by a host computer 5100. A data volume 5223 constitutes a primary volume that is paired with a secondary volume of a secondary storage system 5400. The information for managing this pair is not shown, but is stored in memory 5230.

In addition, the primary storage system 5200 has in memory 5230: a write data reception program 5232; a write data transfer program 5234; a primary master instruction reception program 5235; write data management information table 5236 (e.g. it may be other type information); sequence number information 5238 (e.g. table); and hold write information 5239 (e.g. table). The constitution and processing of these will be described later.

Figure 30:
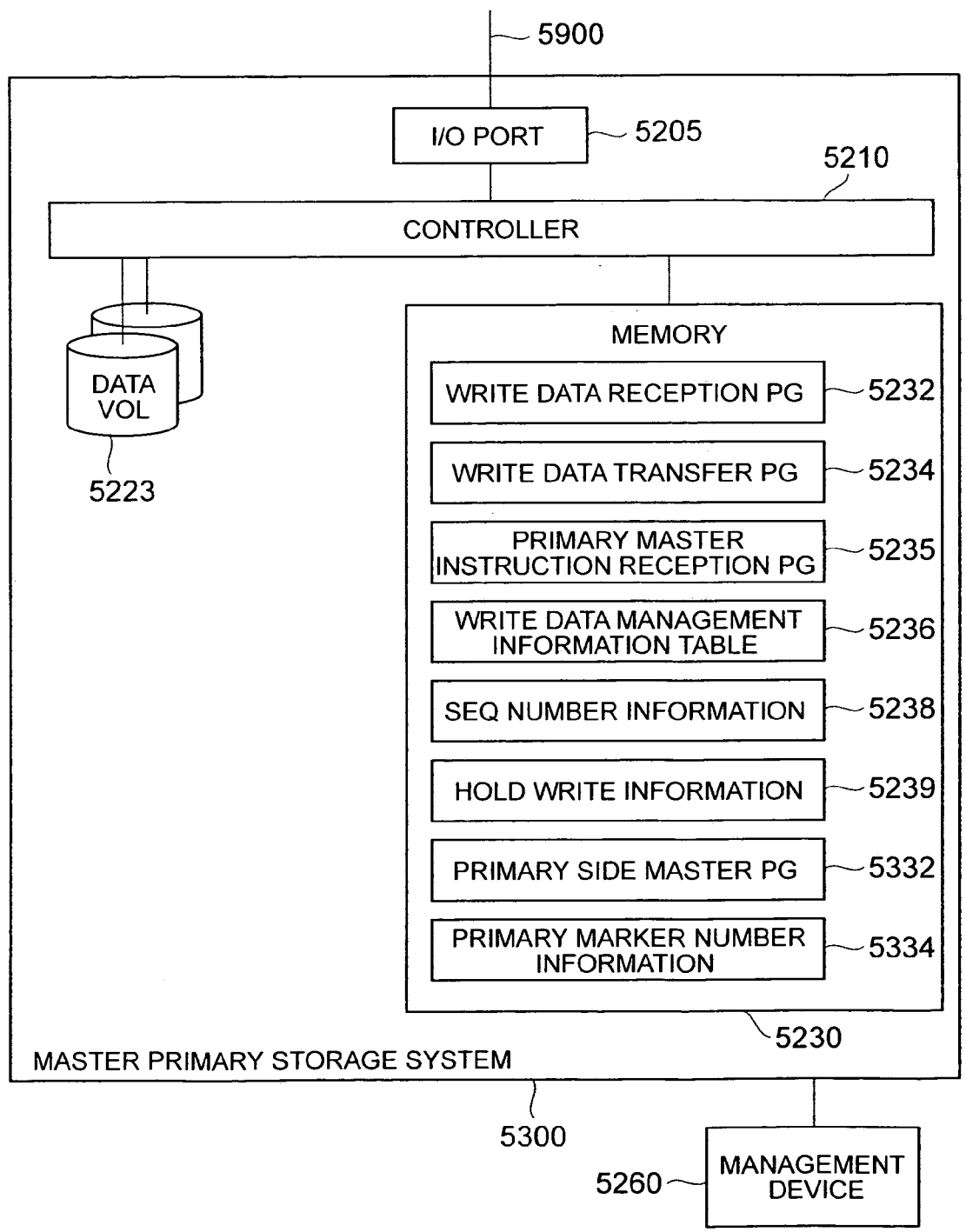
FIG. 30 shows an example of the layout of a master primary storage system 5300.

FIG. 30 shows an example layout of a master primary storage system 5300.

The basic layout of the master primary storage system 5300 is the same as that of a primary storage system 5200. The difference lies in that the master primary storage system 5300 is additionally provided with a primary side master program 5332, primary marker number information 5334 (e.g. table), and memory 5230. The constitution and processing of these will be described later.

Figure 31:
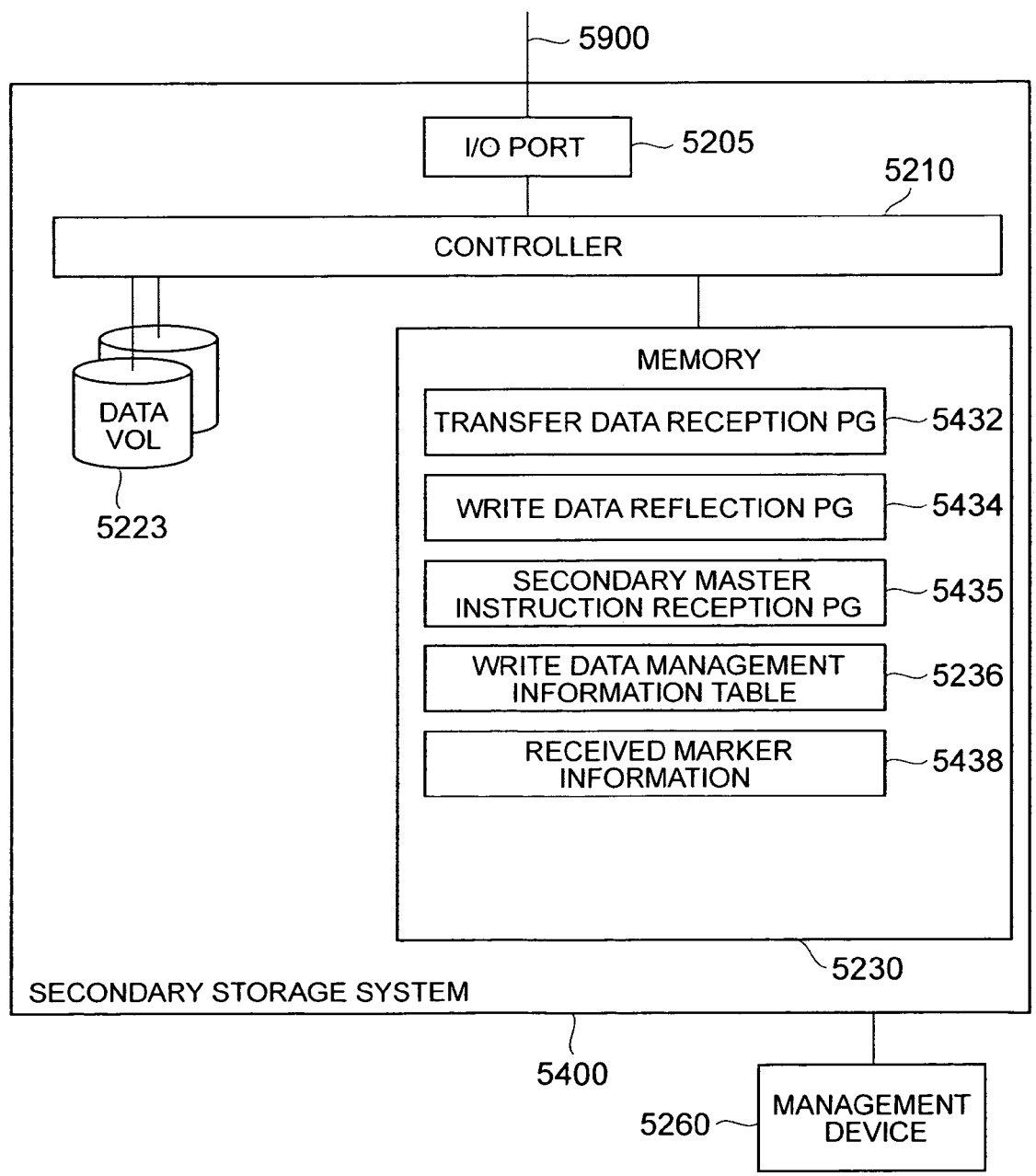
FIG. 31 shows an example of the layout of a secondary storage system 5400.

FIG. 31 shows a layout example of a secondary storage system 5400.

The controller 5210, memory 5230, I/O port 5205 and management device 5260 are the same as described with reference to FIG. 28.

The secondary storage system 5400 has one or more data volumes 5223. In this case, a data volume 5223 is a logical volume 5250 that holds copied data of a data volume 5223 owned by a primary storage system 5200. The data volume 5223 owned by the primary storage system 5200 and the data volume 5223 owned by the secondary storage system 5300 are respectively associated data volumes 5223 having a correspondence relationship. In other words, if a data volume 5223 owned by a given primary storage system 5200 is selected, a data volume owned by the secondary storage system 5300 corresponding thereto must exist. The relationship of such associated data volumes 5223 is termed a volume pair. Also, hereinbelow, in order to avoid confusion, the data volume 5223 of the primary storage system is referred to as the "primary volume" and the data volume 5223 that is paired therewith is referred to as the "secondary volume".

In addition, the secondary storage system 5400 has in memory 5230: a transfer data reception program 5432; a write data reflection program 5434; a secondary master instruction reception program 5435; write data management information table 5236; and received marker information 5438 (e.g. table). The constitution and processing of these will be described later.

Figure 32:
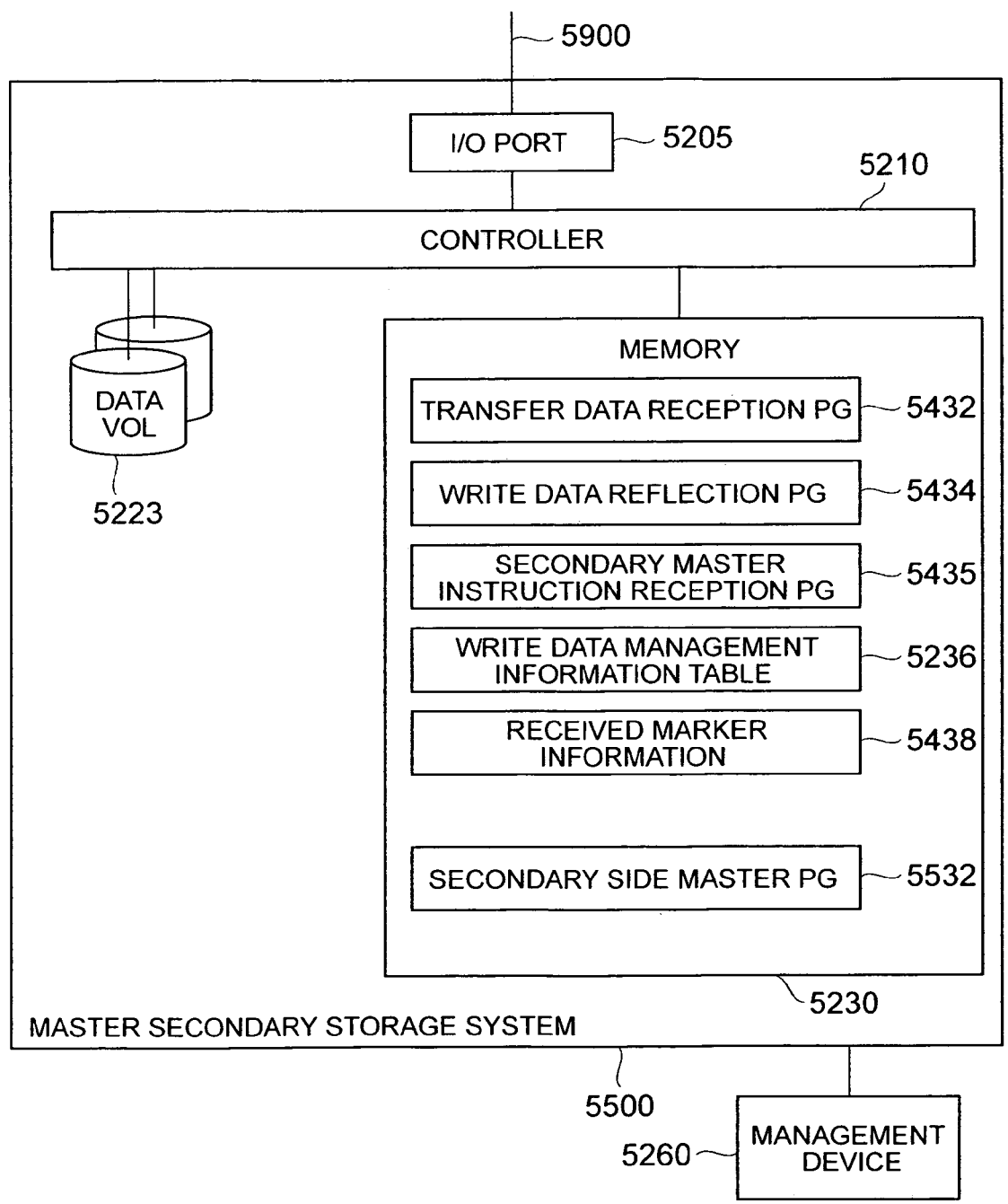
FIG. 32 shows an example of the layout of a master secondary storage system 5500.

FIG. 32 shows an example layout of a master secondary storage system 5500.

The basic layout of the master secondary storage system 5500 is the same as that of the secondary storage system 5400. The difference lies in that a secondary side master program 5532 is provided in the memory 5230. The processing of this secondary side master program 5532 will be described later.

Figure 33:
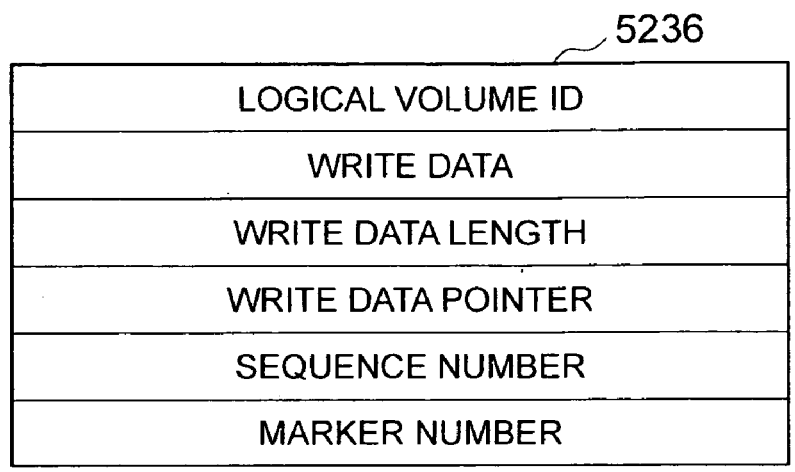
FIG. 33 shows an example of the layout of write data management information table 5236.

FIG. 33 shows an example layout of write data management information table 5236.

The write data management information table 5236 comprises a logical volume ID, write address, write data length, write data pointer, sequence number and marker number. The set of values of these and the method of setting them will be described later.

Figure 34:
FIG. 34 shows an example of the layout of sequence number information 5238.

FIG. 34 shows an example layout of sequence number information 5238.

The sequence number information 5238 includes an integer value and is initialized for example at 0.

Figure 35:
FIG. 35 shows an example of the layout of hold write information 5239.

FIG. 35 shows an example layout of hold write information 5239.

Write hold information 5239 includes a Boolean value and is initialized for example at 0.

Figure 36:
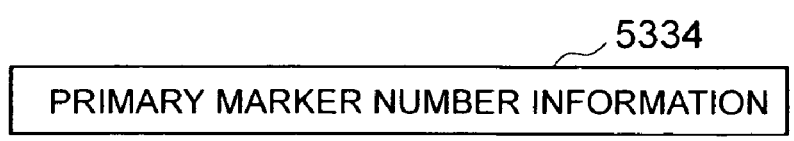
FIG. 36 shows an example of the layout of primary marker number information 5334.

FIG. 36 shows an example layout of primary marker number information 5334.

Primary marker number information 5334 includes an integer value and is for example initialized at 0.

FIG. 37 shows an example layout of received marker information 5438.

Received marker information 5438 is constituted such that it can hold one or more pairs of marker number and sequence number. FIG. 37 is an example in which there are held therein for example the marker whose marker number is 1 (hereinbelow referred to as marker 1) and the sequence number 101 corresponding thereto, the sequence number 210 corresponding to marker 2, the sequence number 560 corresponding to marker 4 and the sequence number 1024 corresponding to marker 5. It should be noted that a marker 3 and a sequence number corresponding thereto are not held. The significance of this is that the secondary storage system 5400 that owns this received marker information 5438 has not yet received the marker 3.

Figure 38:
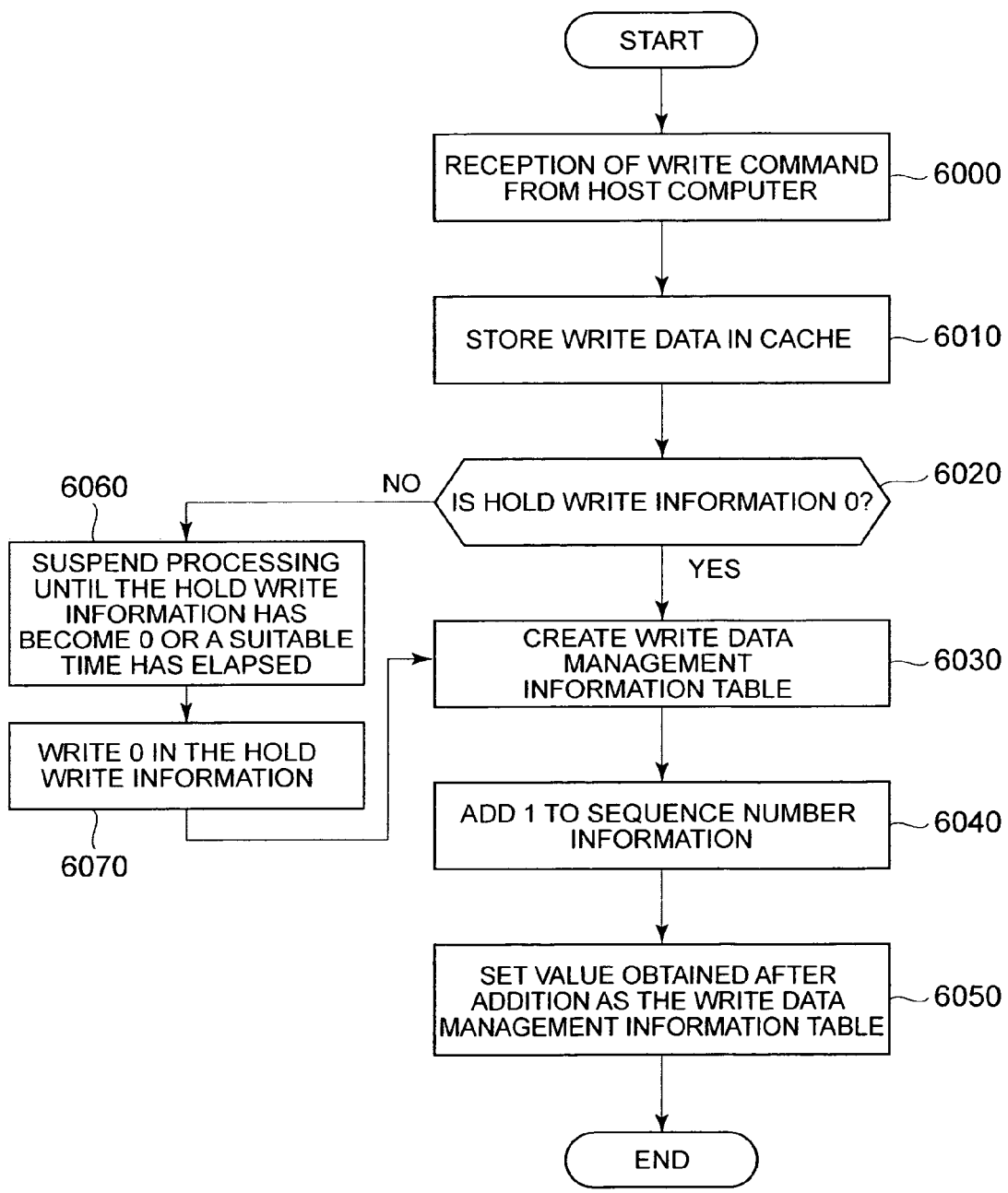
FIG. 38 shows an example of a flow chart of a write data reception program 5232.

FIG. 38 is an example of a flow chart of a write data reception program 5232. Hereinbelow, in cases where a "computer program" is used as a grammatical subject, it is to be understood that in fact processing is performed by the controller (for example CPU) that executes this program. Also, in the description of the following flow chart, the grammatical subject may, where appropriate, be omitted, but the subject of the action whose subject is omitted is the computer program, since this is a flow chart of the computer program.

The write data reception program 5232 is a program that is executed by the controller 5210 when the primary storage system 5200 and the master primary storage system 5300 have received a write command from a host computer 5100. This write program makes preparations for transfer to the corresponding secondary storage system 5400 (secondary storage system having a secondary volume corresponding to this primary volume) by writing the write data (i.e. the data to be written) included in the write command from a host computer 5100 in the primary volume designated by this write command and creating write data management information table 5236 corresponding to this write data.

The write data reception program 5232, when a write command is received from a host computer 5100 (Step 6000), stores (Step 6010) in a cache provided in memory 5230 write data included in the write command.

Next, the write data reception program 5232, by referring to the hold write information 5239 (Step 6020), if the hold write information 5239 is 0, proceeds to Step 6030. In step 6030, the write data management information table 5236 is created. Specifically, the write data reception program 5232 sets in respective fields of the write data management information table 5236 the volume ID (ID of the primary volume) included in the write command, the write address (for example logical block address), the write data length, and the head address of the cache where the write data was stored. Also, the marker number of the write data management information table 5236 is set to 0. In addition, 1 is added (Step 6040) to the sequence number that is held by the sequence number information 5238 and the value obtained after this addition is set (Step 6050) as the sequence number of the write data management information table 5236.

On the other hand, in step 6020, if the hold write information 5239 is other than 0, processing advances to step 6060. The write data reception program 5232 waits until either the hold write information 5239 has become 0, or until a suitable time (for example a predetermined prescribed time) has elapsed. After the passage of the rest time, the write data reception program 5232 writes 0 (Step 6070) in the hold write information 5239 and advances to step 6030. Subsequent processing is as described above.

In this way, write data management information table 5236 is created corresponding to the write command received from the host computer 5100. In addition, creation of the write data management information table 5236 is delayed in accordance with the value indicated by the hold write information 5239. It should be noted that a suitable time in the aforesaid step 6060 could also be set by the user. Also, the primary storage system 5200 or master primary storage system 5300 may be provided with an interface for this purpose.

Figure 39:
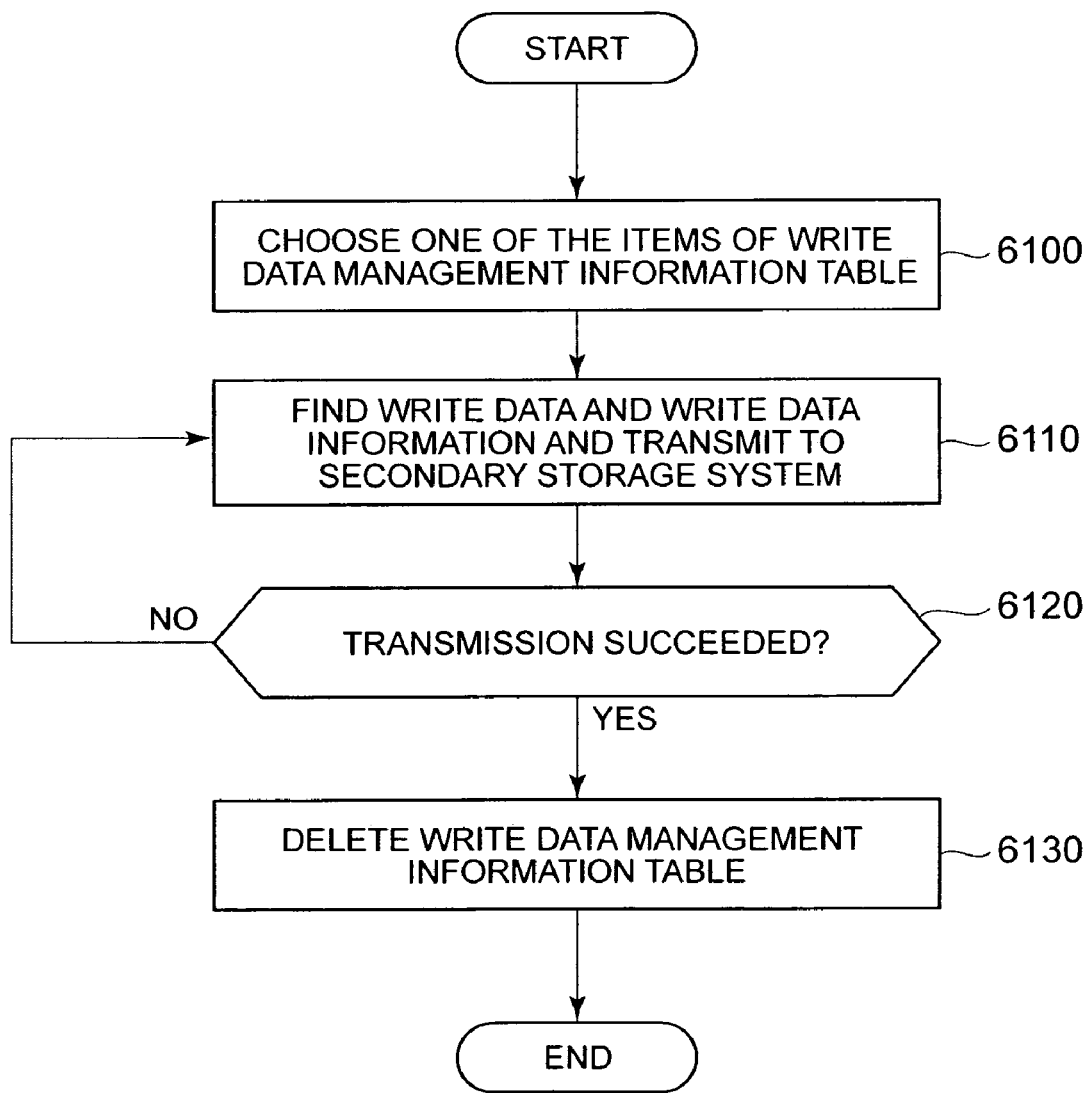
FIG. 39 shows an example of a flow chart of a write data transfer program 5234.

FIG. 39 shows an example of a flow chart of the write data transfer program 5234.

The write data transfer program 5234 is a program that is executed by the controller 5210 of the primary storage system 5200 or master primary storage system 5300 when write data management information table 5236 created by the write data reception program 5232 is present in the memory 5230. By means of this program, write data is transferred to the secondary storage system 5400 in accordance with the write data management information table 5236 that is created by the write data reception program 5232.

First of all, the write data transfer program 5234 selects (Step 6100) suitable write data management information table 5236.

Next, the write data transfer program 5234 finds from the selected write data management information table 5236 the write data and the write data information that are to be sent to the secondary storage system 5400. Specifically, the write data transfer program 5234 designates as write data the data that is stored at the address indicated by the write data pointer. Also, it finds the logical volume ID of the secondary volume from the logical volume ID in this information table 5236 and designates as write data information: data including the logical volume ID that is thus found, the write data address, the write data length, the sequence number, and the marker number in this information table 5236. The write data transfer program 5234 transmits (Step 6110) this write data and write data information to the secondary storage system 5400.

If transmission succeeds (Step 6120), processing advances to Step 6130 and the write data management information table 5236 is deleted. If transmission fails, processing advances to Step 6110 and transmission is repeated until success is achieved. Also, as will be described, the write data management information table 5236 may represent special data, called "markers", rather than write data from the host computer. In this case, since no write data itself exists, no write data is transferred.

The aforesaid processing is repeated until there is no more write data management information table 5236.

In this way, the write data that is written by the host computer 5100 is transferred to the secondary storage system 5400 in accordance with the write data management information table 5236.

Figure 40:
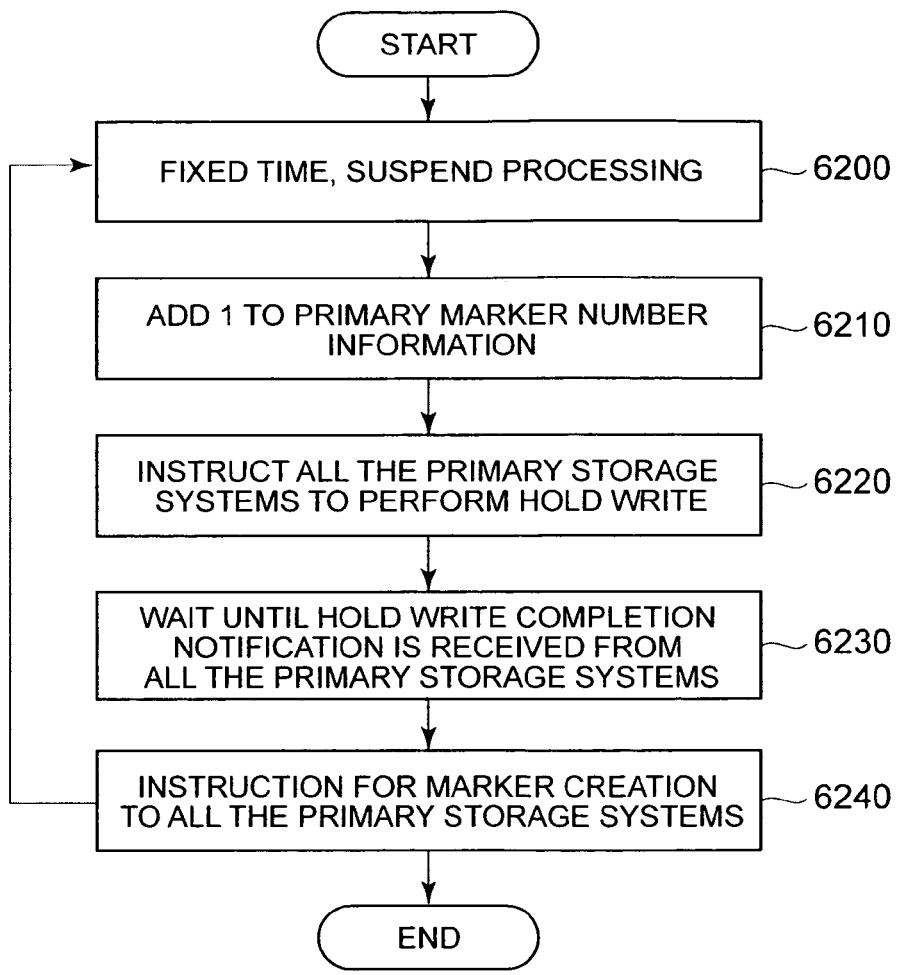
FIG. 40 shows an example of a flow chart of a primary side master program 5332.

FIG. 40 is an example flow chart of the primary side master program 5332.

The primary side master program 5332 issues instructions in respect of the primary master construction reception program 5235 of all of the primary storage systems 5200 and the master primary storage system 5300 (hereinbelow, all of the primary storage systems 5200 and the master primary storage system 5300 will be simply referred to as "all of the primary storage systems 5200, 5300"), and thereby creates special write data management information table 5236, called "markers" in all of the primary storage systems 5200, 5300. Asynchronous remote copying in which consistency is guaranteed across the plurality of secondary storage systems 5400, 5500 can be executed by controlling data storage at the secondary side using these markers as a guide. It should be noted that the primary side master program 5332 continues to be run by the controller 5210 of the master primary storage system 5300 while remote copying is being executed.

First of all, in step 6200, processing by this program 5332 is suspended for a fixed time. This suspension time may be designated by the user of the remote copying system and the master primary storage system 5300 may be provided with an interface for this purpose. Next, 1 is added (Step 6210) to the marker number in the primary marker number information 5334, and a hold write instruction is issued (Step 6220)

to all of the primary storage systems 5200, 5300. In addition, processing waits for the return of a "hold write completed" notification from all of the primary storage systems 5200, 5300. Next, a marker creation instruction is issued (Step 6240) to all of the primary storage systems 5200, 5300. The marker creation instruction includes primary marker number information 5334 that is updated by Step 6210. After this, this processing is further continued by returning to Step 6200.

Figure 41:
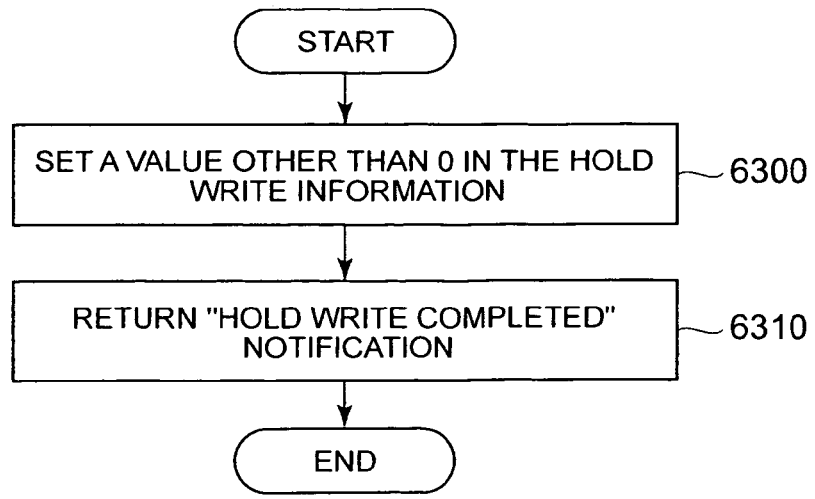
FIG. 41 shows an example of a flow chart of hold write processing.

FIG. 41 is an example flow chart of hold write processing.

A hold write instruction is part of the processing that is executed by the primary master instruction reception program 5235. This hold write instruction is performed by processing executed by the controllers 5210 of the primary storage systems 5200, 5300, when a hold write instruction is received that was issued by the master primary storage system 5300.

When a hold write instruction is received, a value other than 0 (for example 1) is set (Step 6300) in the hold write information 5239 and a "hold write completed" notification is returned (Step 6310) to the master primary storage system 5300.

Figure 42:
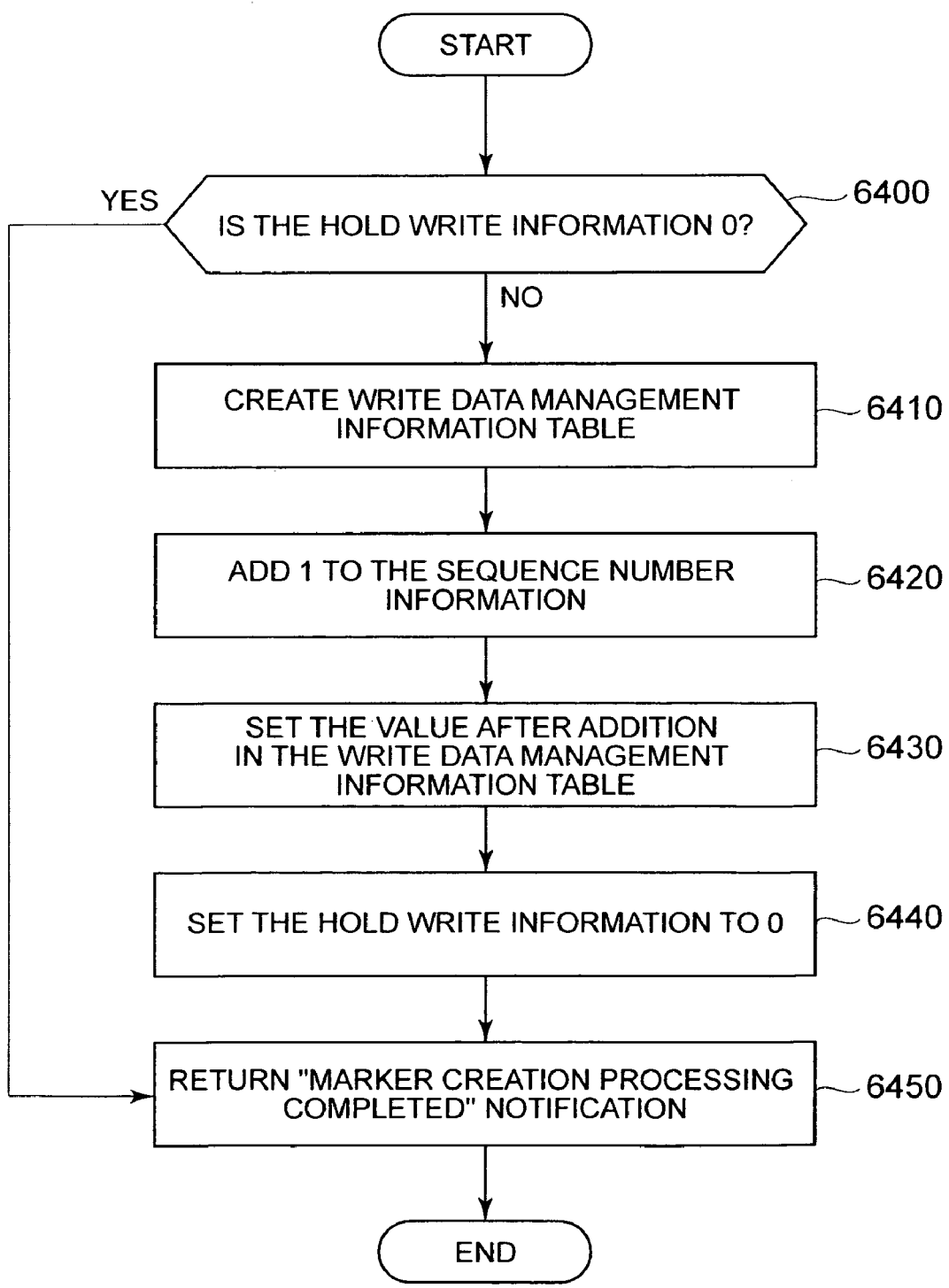
FIG. 42 shows an example of a flow chart of marker creation processing.

FIG. 42 is an example flow chart of marker creation processing.

Marker creation processing is part of the processing that is executed by the primary master instruction reception program 5235 and is processing that is executed by the controllers 5210 of the primary storage systems 5200, 5300 when a marker creation instruction issued by the master primary storage system 5300 is received.

When a marker creation instruction is received from the master primary storage system 5300, a check is made (Step 6400) to ascertain whether or not 0 is set in the hold write information 5239. If 0 is set, processing advances to Step 6450, and a "processing completed" notification is returned to the master primary storage system 5300. If a value other than 0 is set, processing advances to Step 6410, and write data management information table 5236 indicating a marker is created. In this case, invalid values are set in the logical volume ID, write address, write data length, and head address of the cache, that are included in the write data management information table 5236. Also, a marker number that is included in the marker creation instruction is set as the marker number of the write data management information table 5236. In addition, 1 is added (Step 6420) to the sequence number that is held by the sequence number information 5238, and the value obtained after this addition is set as the sequence number of the write data management information table 5236 (Step 6430). Next, 0 is set (Step 6440) as the hold write information 5239, and a "marker creation processing completed" notification is returned (Step 6450) to the master primary storage system 5300.

Figure 43:
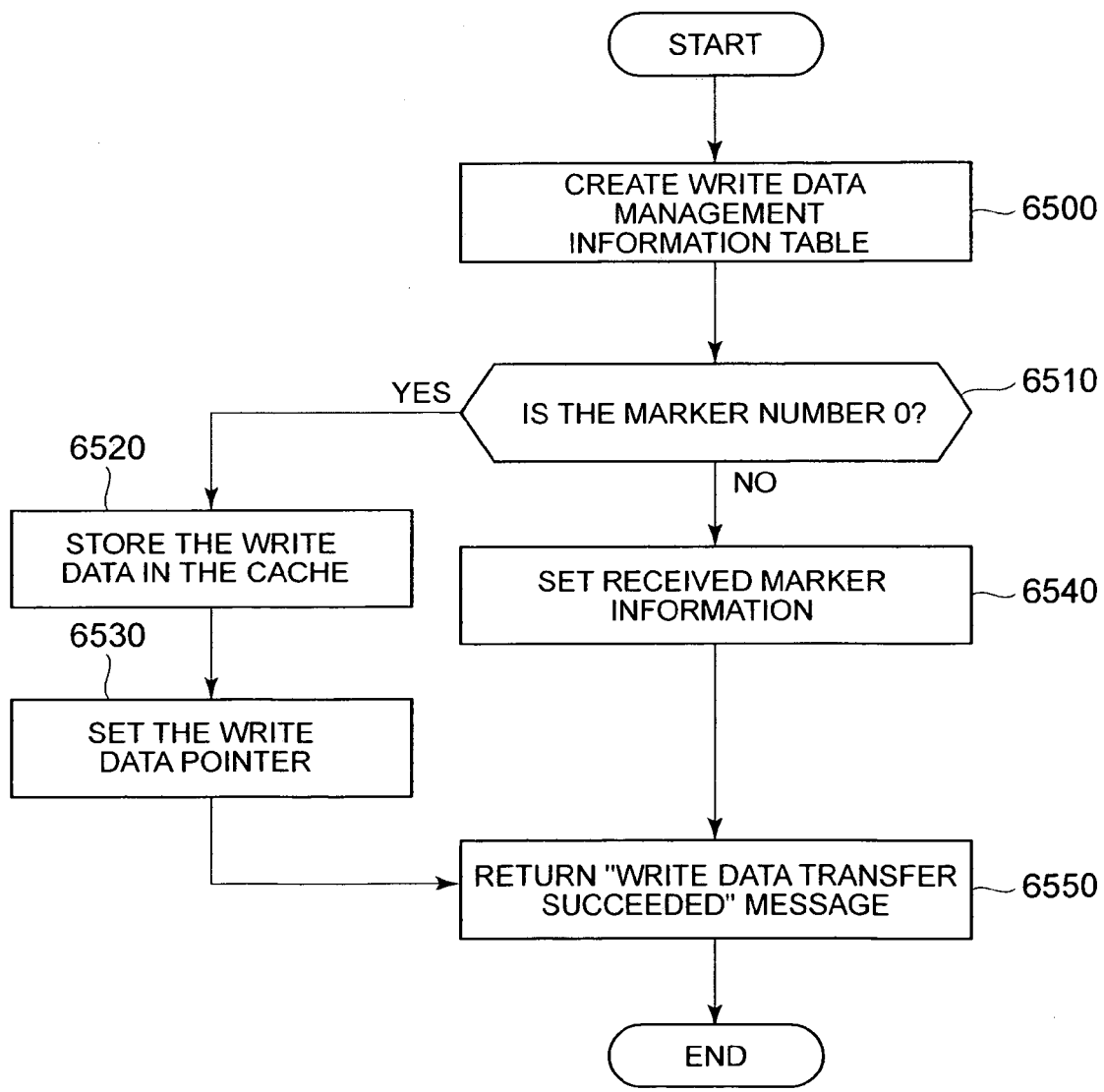
FIG. 43 shows an example of a flow chart of a transfer data reception program 5432.

FIG. 43 shows an example flow chart of the transfer data reception program 5432.

When the secondary storage system 5400 has received write data and write data information sent from the write data transfer program 5234 of the primary storage system 5200, the transfer data reception program 5432 is executed by the controller 5210, causing the write data to be stored in the cache of the memory 5230 of the secondary storage system 5400, and write data management information table 5236 corresponding to this write data is created.

If write data and write data information sent from the write data transfer program 5234 of the primary storage system 5200 are received, write data management information table 5236 is created (Step 6500) in accordance with this received write data. Specifically, the logical volume ID, write address, write data length, sequence number and marker number included in the write data information are set in respective fields of the write data management information table 5236.

Next, a check is made (Step 6510) to ascertain whether or not the marker information included in the write data management information table 5236 is 0: if it is 0, processing advances to Step 6520. In this case, the write data information that was sent is ordinary write data information, so the write data can be acquired. Consequently, the received write data is stored (Step 6520) in the cache possessed by the memory 5230, the head address of this cache is set (Step 6530) as the write data pointer and processing advances to Step 6550.

On the other hand, in Step 6510, if the marker number is a number other than 0, i.e. if the received write data information indicates a marker, processing advances to Step 6540. The marker number of this marker and the sequence number are set in the received marker information 5438. Finally, processing advances to Step 6550, in which success of write data transfer is reported to the storage system 5200.

Figure 44:
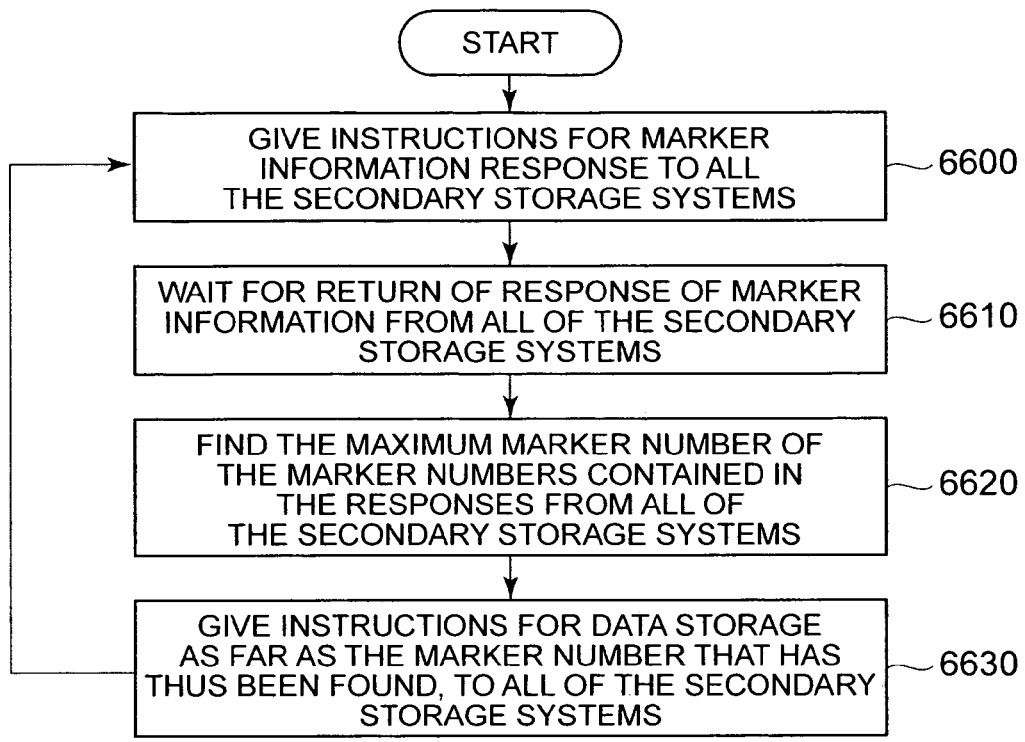
FIG. 44 shows an example of a flow chart of a secondary side master program 5532.

FIG. 44 shows an example flow chart of the secondary side master program 5532.

The secondary side master program 5532 issues instructions in respect of the secondary master instruction reception program 5435 and the write data reflection program 5434 of all of the secondary storage systems 5400 and master secondary storage system 5500 (hereinbelow "all of the secondary storage systems 5400 and the master secondary storage system 5500" will simply be referred to as "all of the secondary storage systems 5400, 5500") and controls storage of data in all of the secondary storage systems 5400, 5500 in accordance with this marker information. It should be noted that the secondary side master program 5532 continues to be run by the controller 5210 of the master secondary storage system 5500 while remote copying is being performed.

In Step 6600, instructions are given for a marker information response to all of the secondary storage systems 5400, 5500. In Step 6610, processing waits for marker information response from all of the secondary storage systems 5400, 5500. The details will be described later, but the marker information that is returned as a response includes one or more and, typically, a plurality, of marker numbers. Next, in Step 6620, the maximum marker number is selected of the marker numbers that are contained in the responses from all of the secondary storage systems 5400, 5500. For example, if there are three secondary storage systems, and marker numbers 1, 3, 4, 5 are returned as a response from the first secondary storage system, while marker numbers 1, 2, 4, 5 are returned as a response from the second secondary storage system, while marker numbers 1, 3, 4 are returned as a response from the third secondary storage system, the maximum marker number i.e. 4 is selected from the marker numbers 1, 4 that are included in all of the responses. In Step 6630, instructions are given to all of the secondary storage systems 5400, 5500 for storage of data as far as the selected marker number: processing then returns to Step 6600. The present processing is continued thereafter.

Figure 45:
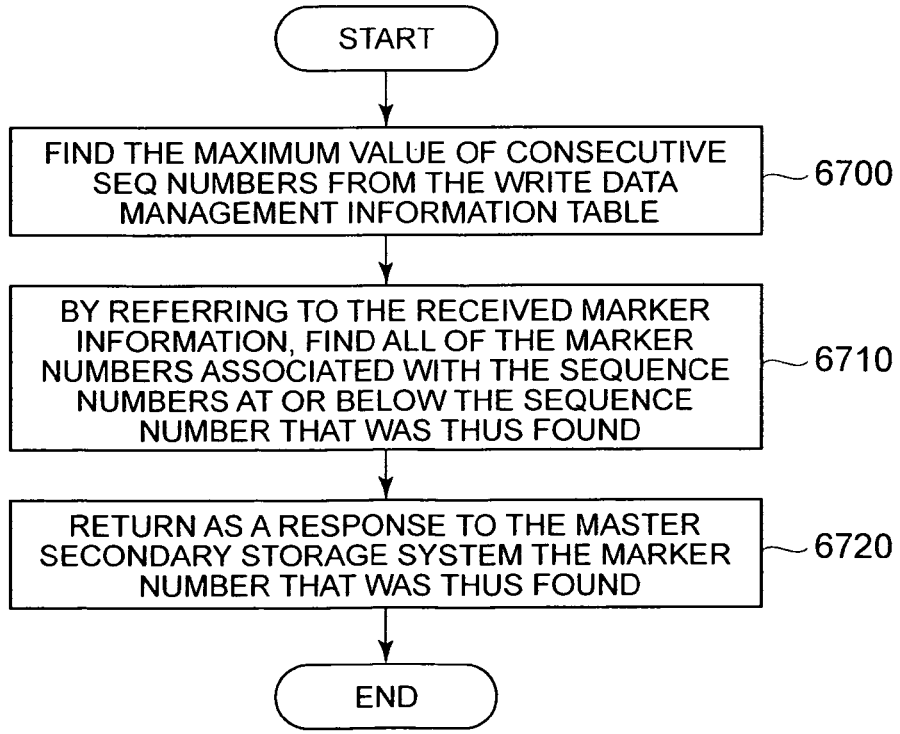
FIG. 45 shows an example of a flow chart of a secondary side master instruction reception program 5435.

FIG. 45 shows an example flow chart of the secondary side master instruction reception program 5435.

The secondary side master processing reception program 5435 is processing that is executed by the controllers 5210 of the secondary storage systems 5400, 5500 when a "marker information response" instruction has been received that was issued by the master secondary storage system 5500.

When this secondary side master processing reception program 5435 receives a marker information response instruction from the master secondary storage system 5500, this program finds (Step 6700) the maximum value of a continuous sequence of sequence numbers from the sequence numbers included in the write data management information table 5236 that is stored in the memory 5230. For example, if write data management information table 5236 is presented that includes the sequence numbers 700, 701, 702, 705, 707, the sequence number that is found by this program is 702.

Next, the program finds (Step 6710) all of the marker numbers associated with the sequence numbers that are no more than the sequence number found in step 6700, by referring to the received marker information 5438. For example, if the received marker information 5438 is in the condition shown by way of example in FIG. 37 and the sequence number that was found is 702 as mentioned above, three marker numbers are found, namely, the numbers 1, 2, 4. Finally, in Step 6720, all of the marker numbers that have been found are returned as a response to the master secondary storage system 5500.

FIG. 46 shows an example flow chart of the write data reflection program 5434.

The write data reflection program 5434 is processing that is executed by the controllers 5210 of the secondary storage systems 5400, 5500 when a data storage instruction issued by the master secondary storage system 5500 has been received.

When a data storage instruction is received from the master secondary storage system 5500, the program searches the entries of received marker information 5438 having the marker number designated in this instruction, and thereby finds (Step 6800) the sequence number corresponding to this marker number. Next, the program deletes (Step 6810) the entries of the received marker information 5438 having marker numbers below the designated marker number. Next, the program selects all of the items of write data management information table 5236 including a sequence number that is no more than the sequence number that has thus been found, and stores the write data indicated by the write data pointer in the secondary volume region indicated by the logical volume ID, write address and write data length included in the write data management information table 5236, and when storage has been completed, deletes (Step 6820) this write data storage information table 5236.

In this way, not only the latest marker but in fact all of the markers received by the secondary storage systems 5400 (provided that the marker numbers are in a range of consecutive sequence numbers, as mentioned above) are collected in the master secondary storage system 5500. The master secondary storage system 5500, of the common marker numbers, transmits to all of the secondary storage systems 5400, 5500 the data storage instructions specified by the maximum marker number. In this way, it is guaranteed that the marker number included in the storage instruction is received by all of the secondary storage systems 5400, 5500. In this way, even if asynchronous remote copying is continued in a condition with some of the markers missing, consistency can be guaranteed.

While a suitable embodiment of the present invention has been described above, this is merely given by way of example for purposes of description of the present invention and it is not intended that the scope of the present invention should be restricted solely to this embodiment. The present invention could be put into practice in various other modes. For example, the storage systems could be connected by another method instead of the storage network 5900.

What is claimed is:

1. A remote copy system comprising:
   a plurality of primary storage systems that receive write commands from a computer;
   a first control section that controls the plurality of primary storage systems;
   a plurality of secondary storage systems that are respectively connected with the plurality of primary storage systems; and
   a second control section that controls the plurality of secondary storage systems, wherein
   the first control section transmits to the plurality of primary storage systems a marker creation instruction including a marker sequence representing the sequence of marker creation;
   the plurality of respective primary storage systems comprise:
      a primary memory device;
      a write processing section that writes to the primary memory device the data that is to be written in accordance with a write command from the computer;
      a journal creation section that creates a journal of writing of the data to be written; and
      a journal transmission section that transmits the journal to a secondary storage system,
      wherein the journal creation section, when receiving a marker creation instruction from the first control section, creates markers including a marker sequence included in the marker creation instruction;
   each of the plurality of secondary storage systems comprises:
      a secondary memory device;
      a marker sequence transmission section that transmits to the second control section a marker sequence group including a marker sequence included in the marker received from the primary storage system, in response to a marker sequence request from the second control section; and
      a data storage section that stores in the secondary memory device, based on the journal received from the primary storage system, in accordance with a data storage instruction from the second control section, data that is to be written corresponding to the journal; and
   the second control section comprises:
      a marker sequence request section that respectively transmits to the plurality of secondary storage systems the marker sequence request which is a request for the marker sequence information;
      a marker sequence selection section that selects a common marker sequence contained in all of the plurality of marker sequence groups on receipt of the plurality of respective marker sequence groups from the plurality of secondary storage systems; and
      a data storage instruction section that transmits to the plurality of secondary storage systems a data storage instruction that performs data storage as far as the selected marker sequence.

2. The remote copy system according to claim 1 wherein, if a plurality of the common marker sequences are present, the marker sequence selection section selects the maximum marker sequence of the plurality of common marker sequences.

3. The remote copy system according to claim 1, wherein the first control section transmits a write disable request to the plurality of primary storage systems, and when receiving a notice of completion of write disabling from the plurality of primary storage systems in respect of the write disabling request, transmits the marker creation instruction to the plurality of primary storage systems; and in each of the plurality of primary storage systems, the write processing section, when receiving the write disabling request, assumes a write disabling state and transmits to the first control section a notice of completion of write disabling and, in the write disabling condition, even if a write command is received, the notice of completion of writing is not returned to the computer.

4. The remote copy system according to claim 3, wherein, the first control section, when receiving a notice of marker creation completion from a primary storage system, transmits a write disabling cancellation request to the primary storage system; and in each of the plurality of primary storage systems, the journal creation section, when creating a marker in response to the marker creation instruction, transmits a notice of marker creation completion to the first control section, and the write processing section, on receiving the write disabling cancellation request from the first control section, cancels a write disabling condition.

5. The remote copy system according to claim 4 wherein, if a fixed time has elapsed since the write disabling condition has been brought about, the write processing section cancels the write disabling condition even without receiving the write disabling cancellation request.

6. The remote copy system according to claim 1, wherein the marker sequence transmission section controls one or more marker sequences contained in the group of transmitted marker sequences to a marker sequence of markers up to a point where journal numbers in respect of the data to be written are consecutive.

7. The remote copy system according to claim 1, wherein the first control section is present in a single primary storage system of the plurality of primary storage systems and the primary storage system where the first control section is present acts as a master primary storage system in respect of other primary storage systems.

8. The remote copy system according to claim 1, wherein the second control section is present in one secondary storage system of the plurality of secondary storage systems and the secondary storage system where the second control section is present acts as a master secondary storage system in respect of other secondary storage systems.

9. The remote copy system according to claim 1, wherein the first control section is present in a single primary storage system of the plurality of primary storage systems and the primary storage system where the first control section is present acts as a master primary storage system in respect of other primary storage systems;

the second control section is present in one secondary storage system of the plurality of secondary storage systems and the secondary storage system where the second control section is present acts as a master secondary storage system in respect of other secondary storage systems;

if a plurality of the common marker sequences are present, the marker sequence selection section selects the maximum marker sequence of a plurality of the common marker sequences;

the master primary storage system transmits a write disabling request to the other primary storage systems; when receiving a notice of completion of write disabling in response to the write disabling request from the other primary storage systems, the master primary storage system transmits the marker creation instruction to the other primary storage systems and, when receiving a notice of marker creation completion from the other primary storage systems, transmits a write disabling cancellation request to the other primary storage systems;

in the other primary storage systems, when receiving the write disabling request, the write processing section assumes a write disabled condition and sends a notice of completion of write disabling to the first control section; in this write disabled condition, even if a write command is received, no notice of write completion is returned to the computer, and the journal creation section, when creating a marker in response to the marker creation instruction, transmits a notice of marker creation completion to the first control section; if a write disabling cancellation request is received from the first control section, the write processing section cancels the write disabling condition, or, if a fixed time has elapsed since the write disabling condition is produced, the write disabling condition is cancelled even if no such the write disabling cancellation request is received.

10. A remote copying control method realized by a remote copying system comprising: a plurality of primary storage systems that receive write commands from a computer; and a plurality of secondary storage systems that are respectively connected with the plurality of primary storage systems, the method comprising:

(A) transmittings to the plurality of primary storage systems a marker creation instruction including a marker sequence representing a sequence of marker creation;

(B) the plurality of respective primary storage systems, when receiving a write command from a computer, writing to a primary memory device data to be written in accordance with the write command, creating a journal of writing of the data to be written, and, if the marker creation instruction is received then creating markers constituting a journal including a marker sequence included in the marker creation instruction;

(C) the plurality of respective primary storage systems transmitting the journal to a secondary storage system;

(D) transmitting to the plurality of secondary storage systems the marker sequence request;

(E) the plurality of respective secondary storage systems transmitting to the second control sections marker sequence groups including a marker sequence included in the marker received from the primary storage system, in response to a marker sequence request;

(F) receiving a plurality of respective marker sequence groups from the plurality of secondary storage systems;

(G) selecting a common marker sequence that is contained in all of the plurality of marker sequence groups;

(H) transmitting to the plurality of secondary storage systems a data storage instruction to perform data storage as far as the selected marker sequence; and (I) the plurality of respective secondary storage systems, in accordance with a data storage instruction from the second control section, based on the journal received from the primary storage system, storing in the secondary memory devices data to be written corresponding to the journal.

11. The remote copy method according to claim 10 wherein, in said step (G), if a plurality of the common marker sequences are present, then selecting the maximum marker sequence of the plurality of common marker sequences.

12. The remote copy method according to claim 10, further comprising:
transmitting a write disable request to the plurality of primary storage systems, and when receiving a notice of completion of write disabling from the plurality of primary storage systems in respect of the write disabling request, then transmitting the marker creation instruction to the plurality of primary storage systems; and
each of the plurality of primary storage systems, when receiving the write disabling request, assuming a write disabling state and transmitting a notice of completion of write disabling and, in the write disabling condition, even if a write command is received, the notice of completion of writing is not returned to the computer.

13. The remote copy method according to claim 12, wherein, when receiving a notice of marker creation completion from a primary storage system, then transmitting a write disabling cancellation request to the primary storage system; and
each of the plurality of primary storage systems, when creating a marker in response to the marker creation instruction, transmits a notice of marker creation completion, and, on receiving the write disabling cancellation request, cancels a write disabling condition.

14. The remote copy method according to claim 13 wherein, if a fixed time has elapsed since the write disabling condition has been brought about, then each of the plurality of primary storage systems cancels the write disabling condition even without receiving the write disabling cancellation request.

15. The remote copy method according to claim 10, wherein each of the plurality of secondary storage systems controls one or more marker sequences contained in the group of transmitted marker sequences to a marker sequence of markers up to a point where journal numbers in respect of the data to be written are consecutive.

16. The remote copy method according to claim 10, wherein,
in said step (G), if a plurality of the common marker sequences are present, selecting the maximum marker sequence of a plurality of the common marker sequences;
a master primary storage system transmits a write disabling request to the other primary storage systems; when receiving a notice of completion of write disabling in response to the write disabling request from the other primary storage systems, the master primary storage system transmits the marker creation instruction to the other primary storage systems and, when receiving a notice of marker creation completion from the other primary storage systems, transmits a write disabling cancellation request to the other primary storage systems;
the other primary storage systems, when receiving the write disabling request, assumes a write disabled condition and sends a notice of completion of write disabling; in this write disabled condition, even if a write command is received, no notice of write completion is returned to the computer, and, when creating a marker in response to the marker creation instruction, transmits a notice of marker creation completion; if a write disabling cancellation request is received, cancels the write disabling condition, or, if a fixed time has elapsed since the write disabling condition is produced, the write disabling condition is cancelled even if no such the write disabling cancellation request is received.

17. The remote copy system according to claim 1, wherein, the markers constitute a journal of a different type from the write journal of the data to be written.

18. The remote copy system according to claim 17, wherein the journal creation section contains a journal sequence expressing a creation sequence of the journal in a journal to be created.

19. The remote copy method according to claim 10, wherein, the markers constitute a journal of a different type from the write journal of the data to be written.

20. The remote copy system according to claim 19, wherein
containing a journal sequence expressing a creation sequence of the journal in a journal to be created.

* * * * *